(12) United States Patent
Nakagami

(10) Patent No.: US 10,623,752 B2
(45) Date of Patent: Apr. 14, 2020

(54) IMAGE PROCESSING APPARATUS AND METHOD

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 312 days.

(21) Appl. No.: 15/034,753

(22) PCT Filed: Dec. 12, 2014

(86) PCT No.: PCT/JP2014/082923
§ 371 (c)(1),
(2) Date: May 5, 2016

(87) PCT Pub. No.: WO2015/098562
PCT Pub. Date: Jul. 2, 2015

(65) Prior Publication Data
US 2016/0261876 A1    Sep. 8, 2016

(30) Foreign Application Priority Data

Dec. 27, 2013  (JP) .................................. 2013-272941

(51) Int. Cl.
*H04N 19/146* (2014.01)
*H04N 19/186* (2014.01)
(Continued)

(52) U.S. Cl.
CPC ......... *H04N 19/186* (2014.11); *H04N 19/105* (2014.11); *H04N 19/136* (2014.11);
(Continued)

(58) Field of Classification Search
CPC .......................... H04N 19/186; H04N 19/146
See application file for complete search history.

(56) References Cited

U.S. PATENT DOCUMENTS

2005/0259730 A1   11/2005  Sun
2012/0224774 A1*  9/2012   Lim ..................... H04N 19/426
                                                     382/233

(Continued)

FOREIGN PATENT DOCUMENTS

CN     105637866 A   6/2016
EP       3063939 A1   9/2016
(Continued)

OTHER PUBLICATIONS

Pu, et al., "Non-RCE:1 Inter Color Component residual Prediction", Joint Collaborative Team on Video Coding (JCT-VC) of ITU-T SG16 WP3 and ISO/IEC JTC1/SC29/WG11, Jul. 25-Aug. 2, 2013, pp. 1-7, 14$^{th}$ Meeting: Vienna, AT.

(Continued)

*Primary Examiner* — Rowina J Cattungal
(74) *Attorney, Agent, or Firm* — Paratus Law Group, PLLC

(57) ABSTRACT

The present disclosure relates to an image processing apparatus and method capable of suppressing a decrease in the coding efficiency. A residual predicting unit that performs a prediction with bit depths of residual data arranged to be uniform among components when the prediction is performed among the components for the residual data between an input image configured by a plurality of the components and a predicted image and a coding unit that codes predicted residual data generated through the prediction performed by the residual predicting unit are included. The present disclosure, for example, may be applied to an image processing apparatus such as an image coding apparatus that codes image data or an image decoding apparatus that decodes coded data acquired by performing coding of the image data.

15 Claims, 53 Drawing Sheets

(51) Int. Cl.
*H04N 19/105* (2014.01)
*H04N 19/70* (2014.01)
*H04N 19/136* (2014.01)
*H04N 19/184* (2014.01)
*H04N 19/172* (2014.01)
*H04N 19/119* (2014.01)

(52) U.S. Cl.
CPC ......... *H04N 19/146* (2014.11); *H04N 19/172* (2014.11); *H04N 19/184* (2014.11); *H04N 19/70* (2014.11); *H04N 19/119* (2014.11)

(56) References Cited

U.S. PATENT DOCUMENTS

| | | | | |
|---|---|---|---|---|
| 2015/0016512 A1* | 1/2015 | Pu | ................. | H04N 19/176 375/240.03 |
| 2015/0117519 A1* | 4/2015 | Kim | ................. | H04N 19/136 375/240.02 |
| 2015/0124865 A1* | 5/2015 | Kim | ................. | H04N 19/103 375/240.02 |

FOREIGN PATENT DOCUMENTS

| | | |
|---|---|---|
| JP | 2006-086793 | 3/2006 |
| JP | 2012-074918 | 4/2012 |
| JP | 2013-223035 A | 10/2013 |
| JP | 2013-258651 | 12/2013 |
| JP | 2016-535490 A | 11/2016 |
| WO | WO2013/153761 A1 | 10/2013 |
| WO | WO2013/160700 A1 | 10/2013 |
| WO | WO 2015/065979 A1 | 5/2015 |

OTHER PUBLICATIONS

Pu, et al., "RCE1: Descriptions and Results for Experiments 1, 2, 3, and 4", Joint Collaborative Team on Video Coding (JCT-VC) of ITU-T SG16 WP3 and ISO/IEC JTC1/SC29/WG11, Oct. 25-Nov. 1, 2013, pp. 1-10, 15$^{th}$ Meeting: Geneva, CH.

Pu, et al., "RCE1: Descriptions and Results for Experiments 1, 2, 3, and 4", Joint Collaborative Team on Video Coding (JCT-VC) of ITU-T SG16 WP3 and ISO/IEC JTC1/SC29/WG11, Oct. 25-Nov. 1, 2013, pp. 1-12, 15$^{th}$ Meeting: Geneva, CH.

Feb. 20, 2017, EP communication issued for related EP application No. 14874039.2.

Sep. 25, 2018, Japanese Office Action issued for related JP Application No. 2015-554739.

Sep. 3, 2018, Chinese Office Action issued for related CN Application No. 201480069944.2.

Jul. 24, 2018, Japanese Office Action issued for related JP Application No. 2015-554739.

Nakagami et al., AHG5: Luma-chroma prediction for different bitdepth, Joint Collaborative Team on Video Coding (JCT-VC) of ITU-T SG 16 WP 3 and ISO/IEC JTC 1/SC 29/WG 11, 16$^{th}$ Meeting, Jan. 9-17, 2014, pp. 1-7, San Jose, US.

Nguyen et al., Non-RCE1/Non-RCE2/AHG5/AHG8: Adaptive Inter-Plane Prediction for RGB Content, Joint Collaborative Team on Video Coding (JCT-VC) of ITU-T SG 16 WP 3 and ISO/IEC JTC 1/SC 29/WG 11, 13$^{th}$ Meeting, Apr. 18-26, 2013, pp. 1-6, Incheon, KR.

Kawamura et al., Non-RCE1: Inter colour-component residual coefficients prediction, Joint Collaborative Team on Video Coding (JCT-VC) of ITU-T SG 16 WP 3 and ISO/IEC JTC 1/SC 29/WG 11, 15$^{th}$ Meeting, Oct. 23-Nov. 1, 2013, pp. 1-5, Geneva, CH.

Apr. 25, 2019, European Summons issued for related EP Application No. 14874039.2.

\* cited by examiner

FIG. 2

Residual modification process for transform blocks using luma-chroma prediction

This process is only invoked when ChromaArrayType is equal to 3.

Inputs to this process are:
- a luma location(xTbY, yTbY) specifying the top-left sample of the current luma transform block relative to the top-left luma sample of the current picture.
- a variable nTbS specifying the transform block size.
- a variable cIdx specifying the colour component of the current block.
- an (nTbS)x(nTbS) array of luma residual samples rY with elements rY[x][y].
- an (nTbS)x(nTbS) array of residual samples r with elements r[x][y].

Output of this process is the modified (nTbS)x(nTbS) array r of residual samples.

The (nTbS)x(nTbS) array of residual samples r with x=0..nTbS-1, y=0..nTbS-1 is modified as follows:

If $BitDepth_Y$ is larger than or equal to $BitDepth_C$, $r[x][y] \mathrel{+}= (ResScaleVal[cIdx][xTbY][yTbY] * (rY[x][y] >> (BitDepth_Y - BitDepth_C))) >> 3$ Otherwise ($BitDepth_Y$ is less than $BitDepth_C$), $r[x][y] \mathrel{+}= (ResScaleVal[cIdx][xTbY][yTbY] * (rY[x][y] << (BitDepth_C - BitDepth_Y))) >> 3$

FIG. 17 luma_chroma_prediction_enabled_flag equal to 1 specifies that log2_res_scale_abs_plus1 and res_scale_sign_flag may be present in the transform unit syntax for pictures referring to the PPS. luma_chroma_prediction_enabled_flag equal to 0 specifies that log2_res_scale_abs_plus1 and res_scale_sign_flag are not present for pictures referring to the PPS. When not present, the value of luma_chroma_prediction_enabled_flag is inferred to be equal to 0. When ChromaArrayType is not equal to 3, it is a requirement of bitstream conformance that the value of luma_chroma_prediction_enabled_flag shall be equal to 0. When BitDepth$_C$ is not equal to BitDepth$_Y$, it is a requirement of bitstream conformance that the value of luma_chroma_prediction_enabled_flag shall be equal to 0.

FIG. 22 luma_chroma_prediction_enabled_flag equal to 1 specifies that log2_res_scale_abs_plus1 and res_scale_sign_flag may be present in the transform unit syntax for pictures referring to the PPS. luma_chroma_prediction_enabled_flag equal to 0 specifies that log2_res_scale_abs_plus1 and res_scale_sign_flag are not present for pictures referring to the PPS. When not present, the value of luma_chroma_prediction_enabled_flag is inferred to be equal to 0. When ChromaArrayType is not equal to 3, it is a requirement of bitstream conformance that the value of luma_chroma_prediction_enabled_flag shall be equal to 0. When BitDepth$_C$ is smaller than BitDepth$_Y$, it is a requirement of bitstream conformance that the value of luma_chroma_prediction_enabled_flag shall be equal to 0.

FIG. 27 luma_chroma_prediction_enabled_flag equal to 1 specifies that log2_res_scale_abs_plus1 and res_scale_sign_flag may be present in the transform unit syntax for pictures referring to the PPS. luma_chroma_prediction_enabled_flag equal to 0 specifies that log2_res_scale_abs_plus1 and res_scale_sign_flag are not present for pictures referring to the PPS. When not present, the value of luma_chroma_prediction_enabled_flag is inferred to be equal to 0. When ChromaArrayType is not equal to 3, it is a requirement of bitstream conformance that the value of luma_chroma_prediction_enabled_flag shall be equal to 0. When BitDepth$_Y$ is not equal to BitDepth$_C$ and matrix_coeffs is equal to 0, it is a requirement of bitstream conformance that the value of luma_chroma_prediction_enabled_flag shall be equal to 0.

FIG. 32

| Transform unit syntax | |
|---|---|
| transform_unit(x0, y0, xBase, yBase, log2TrafoSize, trafoDepth, blkIdx) { | Descriptor |
|   log2TrafoSizeC = log2TrafoSize-(ChromaArrayType == 3 ? 0 : 1) | |
|   cbfLuma = cbf_luma[x0][y0][trafoDepth] | |
|   cbfChroma = | |
|     cbf_cb[x0][y0][trafoDepth] \|\| | |
|     cbf_cr[x0][y0][trafoDepth] \|\| | |
|     (ChromaArrayType == 2 && | |
|       (cbf_cb[x0][y0 + (1<<log2TrafoSizeC)][trafoDepth] \|\| | |
|       cbf_cr[x0][y0 + (1<<log2TrafoSizeC)][trafoDepth])) | |
|   if(cbfLuma \|\| cbfChroma ) { | |
|     if(cu_qp_delta_enabled_flag && !IsCuQpDeltaCoded) { | |
|       cu_qp_delta_abs | ae(v) |
|       if(cu_qp_delta_abs) | |
|         cu_qp_delta_sign_flag | ae(v) |
|     } | |
|     if(slice_chroma_qp_adjustment_enabled_flag && cbfChroma && | |
|       !cu_transquant_bypass_flag && !IsCuChromaQpAdjustmentCoded) { | |
|       cu_chroma_qp_adjustment_flag | ae(v) |
|       if(cu_chroma_qp_adjustment_flag && | |
|         chroma_qp_adjustment_table_size_minus1 > 0) | |
|         cu_chroma_qp_adjustment_idc | ae(v) |
|     } | |
|     if(cbfLuma) | |
|       residual_coding(x0, y0, log2TrafoSize, 0) | |
|     if(log2TrafoSize > 2 \|\| ChromaArrayType == 3) { | |
|       *if(luma_chroma_prediction_enabled_flag && cbfLuma &&* | |
|       *(CuPredMode[x0][y0] == MODE_INTER \|\| intra_bc_flag[x0][y0] \|\|* | |
|       *intra_chroma_pred_mode[x0][y0] == 4))* | |
|       *luma_chroma_pred(x0, y0, 0)* | |
|       for(tIdx = 0; tIdx < (ChromaArrayType == 2 ? 2 : 1); tIdx++) | |
|         if(cbf_cb[x0][y0 + (tIdx << log2TrafoSizeC)][trafoDepth]) | |
|           residual_coding( x0, y0 + (tIdx << log2TrafoSizeC), log2TrafoSizeC, 1) | |
|       *if(luma_chroma_prediction_enabled_flag && cbfLuma &&* | |
|       *(CuPredMode[x0][y0] == MODE_INTER \|\| intra_bc_flag[x0][y0] \|\|* | |
|       *intra_chroma_pred_mode[x0][y0] == 4))* | |
|       *luma_chroma_pred(x0, y0, 1)* | |
|       for(tIdx = 0; tIdx < (ChromaArrayType == 2 ? 2 : 1); tIdx++) | |
|         if(cbf_cr[x0][y0 + (tIdx << log2TrafoSizeC )][ trafoDepth]) | |
|           residual_coding(x0, y0 + (tIdx << log2TrafoSizeC), log2TrafoSizeC, 2) | |
|     } else if( blkIdx == 3 ) { | |
|       for(tIdx = 0; tIdx < (ChromaArrayType == 2 ? 2 : 1); tIdx++) | |
|         if(cbf_cb[xBase][yBase][trafoDepth]) | |
|           residual_coding(xBase, yBase + (tIdx << log2TrafoSize), log2TrafoSize, 1) | |
|       for(tIdx = 0; tIdx < (ChromaArrayType == 2 ? 2 : 1); tIdx++) | |
|         if(cbf_cr[xBase][yBase][trafoDepth]) | |
|           residual_coding(xBase, yBase + (tIdx << log2TrafoSize), log2TrafoSize, 2) | |
|     } | |
|   } | |
| } | |

FIG. 33

| Luma-chroma prediction syntax | Descriptor |
|---|---|
| luma_chroma_pred(x0, y0, c) { | |
|   log2_res_scale_abs_plus1[c] | ae(v) |
|   if(log2_res_scale_abs_plus1[c] != 0) | |
|     res_scale_sign_flag[c] | ae(v) |
| } | |

FIG. 34

Luma-chroma prediction semantics log2_res_scale_abs_plus1[c] minus 1 specifies the base 2 logarithm of the magnitude of the scaling factor ResScaleVal used in luma-chroma residual prediction. When not present, log2_res_scale_abs_plus1 is inferred equal to 0.

res_scale_sign_flag[c] specifies the sign of the scaling factor used in luma-chroma residual prediction as follows:

- If res_scale_sign_flag[c] is equal to 0, the corresponding ResScaleVal has a positive value.
- Otherwise (res_scale_sign_flag[c] is equal to 1), the corresponding ResScaleVal has a negative value.

The variable ResScaleVal[cIdx][x0][y0] specifies the scaling factor used in luma-chroma residual prediction. The array indices x0, y0 specify the location (x0, y0) of the top-left luma sample of the considered transform block relative to the top-left luma sample of the picture. The array index cIdx specifies an indicator for the colour component; it is equal to 1 for Cb, and equal to 2 for Cr.

The variable ResScaleVal[cIdx][x0][y0] is derived as follows:

- If log2_res_scale_abs_plus1[cIdx − 1] is equal to 0, the following applies:

ResScaleVal[cIdx][x0][y0] = 0

- Otherwise (log2_res_scale_abs_plus1[cIdx − 1] is not equal to 0), the following applies:

ResScaleVal[cIdx][x0][y0] = (1 << (log2_res_scale_abs_plus1[cIdx − 1] − 1)) *
  (1 − 2*res_scale_sign_flag[cIdx − 1])

FIG. 35

Residual modification process for transform blocks using luma-chroma prediction

This process is only invoked when ChromaArrayType is equal to 3.

Inputs to this process are:
- a luma location ( xTbY, yTbY ) specifying the top-left sample of the current luma transform block relative to the top left luma sample of the current picture,
- a variable nTbS specifying the transform block size,
- a variable cIdx specifying the colour component of the current block,
- an (nTbS)x(nTbS) array of luma residual samples $r_Y$ with elements $r_Y[x][y]$,
- an (nTbS)x(nTbS) array of residual samples r with elements r[x][y].

Output of this process is the modified (nTbS)x(nTbS) array r of residual samples.

The (nTbS)x(nTbS) array of residual samples r with x = 0..nTbS − 1, y = 0..nTbS − 1 is modified as follows:

r[x][y] += (ResScaleVal[cIdx][xTbY][yTbY]*$r_Y$[x][y]) >> 3

FIG. 36

```
Transform unit syntax                                                          | Descriptor
transform_unit(x0, y0, xBase, yBase, log2TrafoSize, trafoDepth, blkIdx) {      |
   log2TrafoSizeC = log2TrafoSize - (ChromaArrayType == 3 ? 0 : 1)             |
   cbfLuma = cbf_luma[x0][y0][trafoDepth]                                       |
   cbfChroma =                                                                  |
      cbf_cb[x0][y0][trafoDepth] ||                                             |
      cbf_cr[x0][y0][trafoDepth] ||                                             |
      (ChromaArrayType == 2 &&                                                  |
         (cbf_cb[x0][y0 + (1 << log2TrafoSizeC)][trafoDepth] ||                 |
          cbf_cr[x0][y0 + (1 << log2TrafoSizeC)][trafoDepth]))                  |
   if(cbfLuma || cbfChroma) {                                                   |
      if(cu_qp_delta_enabled_flag && !IsCuQpDeltaCoded) {                       |
         cu_qp_delta_abs                                                        | ae(v)
         if(cu_qp_delta_abs)                                                    |
            cu_qp_delta_sign_flag                                               | ae(v)
      }                                                                         |
      if(slice_chroma_qp_adjustment_enabled_flag && cbfChroma &&                |
         !cu_transquant_bypass_flag && !IsCuChromaQpAdjustmentCoded) {          |
         cu_chroma_qp_adjustment_flag                                           | ae(v)
         if(cu_chroma_qp_adjustment_flag &&                                     |
            chroma_qp_adjustment_table_size_minus1 > 0)                         |
            cu_chroma_qp_adjustment_idc                                         | ae(v)
      }                                                                         |
      if(cbfLuma)                                                               |
         residual_coding(x0, y0, log2TrafoSize, 0)                              |
      if(log2TrafoSize > 2 || ChromaArrayType == 3) {                           |
         if(luma_chroma_prediction_enabled_flag && cbfLuma &&                   |
            (CuPredMode[x0][y0] == MODE_INTER || intra_bc_flag[x0][y0] ||       |
             intra_chroma_pred_mode[x0][y0] == 4))                              |
            luma_chroma_pred(x0, y0)                                            |
         for(tIdx = 0; tIdx < (ChromaArrayType == 2 ? 2 : 1); tIdx++)           |
            if(cbf_cb[x0][y0 + (tIdx << log2TrafoSizeC)][trafoDepth])           |
               residual_coding(x0, y0 + (tIdx << log2TrafoSizeC), log2TrafoSizeC, 1) |
         for(tIdx = 0; tIdx < (ChromaArrayType == 2 ? 2 : 1); tIdx++)           |
            if(cbf_cr[x0][y0 + (tIdx << log2TrafoSizeC)][trafoDepth])           |
               residual_coding(x0, y0 + (tIdx << log2TrafoSizeC), log2TrafoSizeC, 2) |
      } else if(blkIdx == 3) {                                                  |
         for(tIdx = 0; tIdx < (ChromaArrayType == 2 ? 2 : 1); tIdx++)           |
            if(cbf_cb[xBase][yBase][trafoDepth])                                |
               residual_coding(xBase, yBase + (tIdx << log2TrafoSize), log2TrafoSize, 1) |
         for(tIdx = 0; tIdx < (ChromaArrayType == 2 ? 2 : 1); tIdx++)           |
            if(cbf_cr[xBase][yBase][trafoDepth])                                |
               residual_coding(xBase, yBase + (tIdx << log2TrafoSize), log2TrafoSize, 2) |
      }                                                                         |
   }                                                                            |
}                                                                               |
```

*FIG. 37*

| Luma-chroma prediction syntax | |
|---|---|
| luma_chroma_pred(x0, y0) { | Descriptor |
| log2_res_scale_abs_plus1 | ae(v) |
| if(log2_res_scale_abs_plus1 != 0) | |
| res_scale_sign_flag | ae(v) |
| } | |

FIG. 38

Luma-chroma prediction semantics log2_res_scale_abs_plus1 minus 1 specifies the base 2 logarithm of the magnitude of the scaling factor ResScaleVal used in luma-chroma residual prediction. When not present, log2_res_scale_abs_plus1 is inferred equal to 0.

res_scale_sign_flag specifies the sign of the scaling factor used in luma-chroma residual prediction as follows:

- If res_scale_sign_flag is equal to 0, the corresponding ResScaleVal has a positive value.

- Otherwise (res_scale_sign_flag is equal to 1), the corresponding ResScaleVal has a negative value.

The variable ResScaleVal[ x0 ][ y0 ] specifies the scaling factor used in luma-chroma residual prediction. The array indices x0, y0 specify the location( x0, y0 ) of the top-left luma sample of the considered transform block relative to the top-left luma sample of the picture.

The variable ResScaleVal[x0][y0] is derived as follows:

- If log2_res_scale_abs_plus1 is equal to 0, the following applies:

ResScaleVal[x0][y0] = 0

- Otherwise (log2_res_scale_abs_plus1[cIdx − 1] is not equal to 0), the following applies:

ResScaleVal[x0][y0] = (1 << (log2_res_scale_abs_plus1[cIdx − 1] − 1))*
    (1 − 2*res_scale_sign_flag)

FIG. 39

Residual modification process for transform blocks using luma-chroma prediction

This process is only invoked when ChromaArrayType is equal to 3.

Inputs to this process are:

- a luma location ( xTbY, yTbY ) specifying the top-left sample of the current luma transform block relative to the top left luma sample of the current picture,
- a variable nTbS specifying the transform block size,
- an (nTbS)x(nTbS) array of luma residual samples $r_Y$ with elements $r_Y[x][y]$,
- an (nTbS)x(nTbS) array of residual samples r with elements r[x][y].

Output of this process is the modified (nTbS)x(nTbS) array r of residual samples.

The (nTbS)x(nTbS) array of residual samples r with x = 0..nTbS − 1, y = 0..nTbS − 1 is modified as follows:

r[x][y] += (ResScaleVal[xTbY][yTbY] * $r_Y[x][y]$) >> 3

IMAGE PROCESSING APPARATUS AND METHOD

CROSS REFERENCE TO PRIOR APPLICATION

This application is a National Stage Patent Application of PCT International Patent Application No. PCT/JP2014/082923 (filed on Dec. 12, 2014) under 35 U.S.C. § 371, which claims priority to Japanese Patent Application No. 2013-272941 (filed on Dec. 27, 2013), which are all hereby incorporated by reference in their entirety.

TECHNICAL FIELD

The present disclosure relates to an image processing apparatus and method, and more particularly, to an image processing apparatus and method capable of suppressing a decrease in the coding efficiency.

BACKGROUND ART

Recently, the number of requests for the compression of raw data that is generated by an image sensor or the like and is image data before the execution of a demosaic process and the like has been increased.

As a coding system of image data, there is MPEG-4 Part 10 (Advanced Video Coding, hereinafter, referred to as AVC). Recently, in order to improve the coding efficiency, standardization or an coding system, called High Efficiency Video Coding (HEVC) has been progressed by Joint Collaboration Team—Video Coding (JCTVC) chat is a joint standards organization of International Telecommunication Union Telecommunication Standardization Sector (ITU-T) and International Organization for Standardization/International Electrotechnical Commission (ISO/IEC) (for example, see Patent Document 1).

In such a coding system, a method for snaking a prediction of a residual signal between components has been considered (for example, see Non-patent Document 2).

CITATION LIST

Non-Patent Document

Non-Patent Document 1: Benjamin Bross, Woo-Jin Han, Jens-Rainer Ohm, Gary J. Sullivan, Ye-Kui Wang, Thomas Wiegand, "High Efficiency video Coding (HEVC) text specification draft 10 (for FDIS & Last Call)", JCTVC-L1003_version 34, Mar. 19, 2003

Non-Patent Document 2: Wei Pip Woo-Shik Kim, Jianie Chen, Joel Sole, Marts Karczewicz, "RCE1: Descriptions and Results for Experiments 1, 2, 3, and 4", JCTVC-00202, Nov. 11, 2011

SUMMARY OF THE INVENTION

Problems to be Solved by the Invention

However, generally, the bit depths of data of components are independent from each other, and accordingly, there is a possibility that mutually-different values are set thereto. However, in a method disclosed in Non-patent Document 2, a prediction of a bit depth between mutually-different components is not considered, and there is concern that a prediction is not correctly made, and the coding efficiency is lowered.

The present disclosure is made in consideration of such a situation and is for suppressing a decrease in the coding efficiency.

Solutions to Problems

According to one embodiment of the present technology, there is provided an image processing apparatus including: a residual predicting unit than performs a prediction with bit depths of residual data arranged to be uniform among components when the prediction is performed among the components for the residual data between an input image configured by a plurality of the components and a predicted image; and a coding unit that codes predicted residual data generated through the prediction performed by the residual predicting unit.

The residual predicting unit may arrange the bit depths of the residual data to be uniform through a bit shift.

The residual predicting unit may perform the prediction with the bit depths of the residual, data arranged to be uniform among the components through the bit shift, in a case where a difference between the bit depths of two components for which the prediction is performed is not zero.

The residual predicting unit may perform the prediction with the bit depths of the residual data arranged to be uniform among the components through the bit shift in a case where the difference between the bit depths is positive and omit the prediction in a case where the difference between the bit depths is negative.

The residual predicting unit, may perform the prediction with the bit depths of the residual data arranged to be uniform among the components through the bit shift in a case where a color space of the input image is not an RGB space and omit, the prediction in a case where the color space of the input image is the RGB space.

A color space of the input image may be a YUV space, and the residual predicting unit may perform the prediction with the bit depths of the residual data arranged to be uniform through the bit shift between a luminance component and a color difference component.

A color space of the input image may be an RGB space, and the residual predicting unit may perform the prediction with the bit depths of the residual data arranged to be uniform through the bit shift, between a G component and an R component or a B component.

The residual predicting unit may perform the prediction by acquiring a difference between the bit depths of two components for which the prediction is performed, performing the bit shift of the residual data of one component, out of the two components that corresponds to the difference between the bit depths, multiplying the bit-shifted residual data by a predetermined, weighting coefficient, performing a bit shift of a result of the multiplication that corresponds to a predetermined number of bits, and acquiring a difference between the residual data of the other component and the bit-shifted result of the multiplication.

The residual predicting unit may set the weighting coefficient that is common to a plurality of components.

According to one embodiment of the present, technology, there is provided an image processing method including: performing a prediction with bit depths of residual data arranged to be uniform among components when the prediction is performed among the components for the residual data between an input image configured by a plurality of the components and a predicted image; and coding predicted residual data generated through the prediction.

According to another embodiment of the present technology, there is provided an image processing apparatus including: a decoding unit that decodes coded data in which predicted residual data, which is a result of a prediction of residual data between an image configured by a plurality of components and a predicted image thereof among the components, is coded; and a residual restoring unit that performs restoration with bit depths of the residual data arranged to be uniform among the components when the restoration of the residual data is performed using the predicted residual data acquired by the decoding unit by decoding the coded data.

The residual restoring unit may arrange the bit depths of the residual data to be uniform through a bit shift.

A reception unit that receives information relating to the bit depths may be further included, and the residual restoring unit may arrange the bit depths of the residual data to be uniform by acquiring a difference between the bit depths of two components for which the prediction is performed based on information relating to the bit depths received by the reception unit and performing the bit shift based on the acquired difference between the bit depths.

The residual restoring unit, in a case where the acquired difference between the bit depths is not zero, may arrange the bit depths of the residual data to be uniform through the bit shift.

The residual restoring unit may perform restoration with the bit depths of the residual data arranged to be uniform through the bit shift in a case where the acquired difference between the bit depths is positive and omit the restoration in a case where the difference between the bit depths is negative.

The reception unit may further receive information relating to a color space of the image, and the residual restoring unit may perform the restoration with the bit depths of the residual data arranged to be uniform among the components through the bit shift in a case where the color space of the image is not an RGB space based, on the information relating to the color space of the image received by the reception unit and omit the restoration in a case where the color space of the image is the RGB space.

A color space of the image may be a YUV space, and the residual restoring unit may perform the restoration with the bit depths of the residual data arranged to be uniform between a luminance component, and a color difference component through the bit shift.

A color space of the image may be an RGB space, and the residual restoring unit may perform, the restoration with the bit depths of the residual data arranged to be uniform through the bit shift between a G component and an R component or a B component.

The residual restoring unit, by acquiring a difference between the bit depths of two components for which the restoration is performed, performing the bit shift of the restored residual data of one component out of the two components that corresponds to the difference between the bit depths, multiplying the bit-shifted residual data by a predetermined weighting coefficient, performing a bit shift of a result of the multiplication that corresponds to a predetermined number of bits, and adding the bit-shifted result of the multiplication and the predicted residual data, may perform the restoration of the residual data of the other component.

According to another embodiment of the present technology, there is provided an image processing method including: decoding coded data in which predicted residual data, which is a result of a prediction of residual data between an image configured by a plurality of components and a predicted image thereof among the components, is coded; and performing restoration with bit depths of the residual data arranged, to be uniform among the components when the restoration of the residual data is performed using the predicted residual data, acquired by decoding the coded data.

According to one embodiment of the present technology, a prediction is performed with bit depths of residual data arranged to be uniform among components when the prediction is performed among the components for the residua1 data between an input image configured, by a plurality of the components and a predicted image, and predicted residual data generated through the prediction is coded.

According to another embodiment of the present technology, coded data is decoded in which predicted residual data, which is a result of a prediction of residual data between an image configured by a plurality of components and a predicted image thereof among the components, is coded, and restoration is performed with bit depths of the residual data arranged to be uniform among the components when the restoration of the residual data is performed using the predicted residual data acquired by decoding the coded data.

Effects of the Invention

According to the present disclosure, an image can be coded and decoded. Particularly, a decrease in the coding efficiency can be suppressed.

BRIEF DESCRIPTION OF DRAWINGS

FIG. 2 is a diagram that illustrates an example of semantics.

FIG. 17 is a diagram that illustrates an example of semantics.

FIG. 22 is si diagram that illustrates an example of semantics.

FIG. 27 is a diagram that illustrates an example of semantics.

FIG. 32 is a diagram that illustrates an example of syntax.

FIG. 33 is a diagram that, illustrates an example of semantics.

FIG. 34 is a diagram that illustrates an example of semantics.

FIG. 35 is a diagram that illustrates an example of semantics.

FIG. 36 is a diagram that illustrates an example of syntax.

FIG. 37 is a diagram that illustrates an example of semantics.

FIG. 38 is a diagram that illustrates an example of semantics.

FIG. 39 is a diagram that illustrates an example of semantics.

MODE FOR CARRYING OUT THE INVENTION

Figure 1:
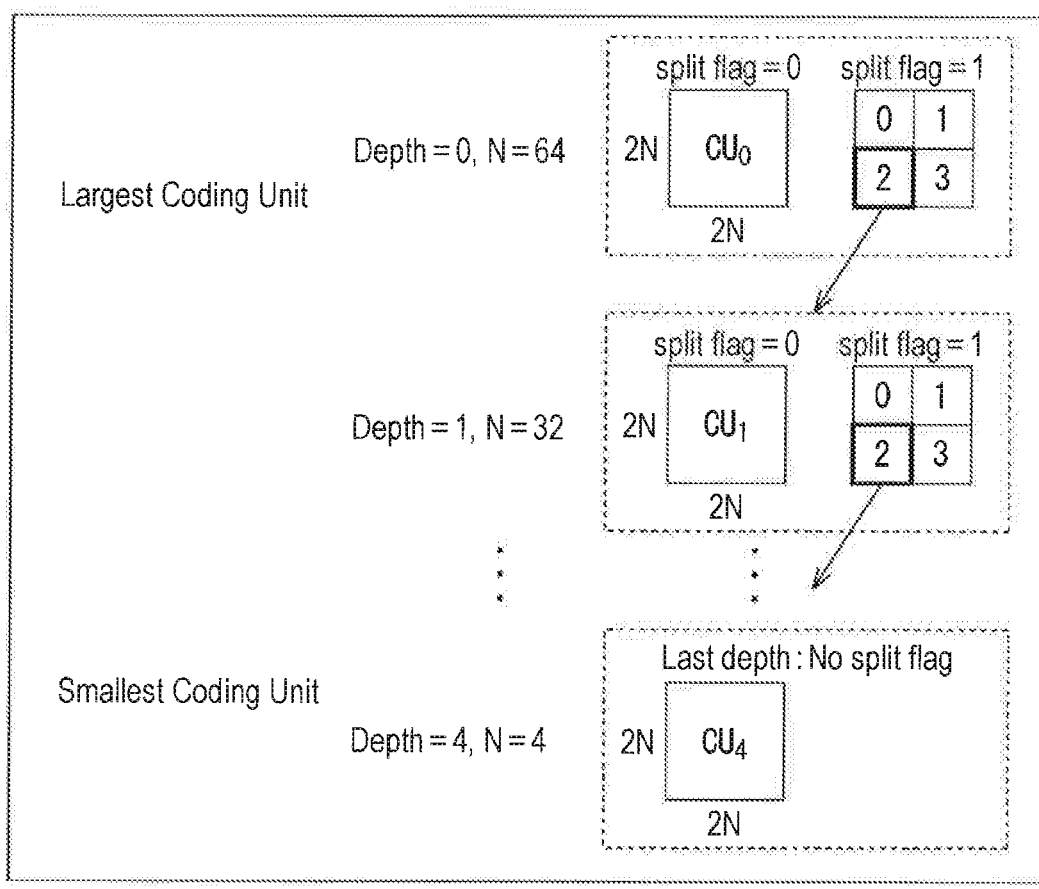
FIG. 1 is a diagram that illustrates a configuration example of a coding unit.

Hereinafter, embodiments (hereinafter, referred to as embodiments) for performing the present disclosure will be described. The description will be presented in the following order.

1. First Embodiment (Image Coding Apparatus/Image Decoding Apparatus)
2. Second Embodiment (Image Coding Apparatus/Image Decoding Apparatus)
3. Third Embodiment (Image Coding Apparatus/Image Decoding Apparatus)
4. Fourth Embodiment (Image Coding Apparatus/Image Decoding Apparatus)
5. Fifth Embodiment (Commonization of Weighting Coefficient)
6. Sixth Embodiment (Multiple Viewpoint Image Coding Apparatus/Multiple Viewpoint Image Decoding Apparatus
7. Seventh Embodiment (Hierarchical Image Coding Apparatus/Hierarchical Image Decoding Apparatus)
8. Eighth Embodiment (Computer)
9. Ninth Embodiment (Application Example)
10. Tenth Embodiment (Set/Unit/Module/Processor)

1. First Embodiment

Plow of Standardization of Image Coding

Recently, image information is handled as digital data, and, at that time, for the purpose of transmitting and accumulating information with high efficiency, devices are widely used which compress and code an image by employing a coding system compressing data through an orthogonal transform such as a discrete cosine transform and a motion compensation by using redundancy that, is specific to the image information. Examples of such, a coding system include Moving Picture Experts Group (MPEG) and the like.

Particularly, MPEG2 (ISO/IEC 13818-2) is defined as a general-purpose image coding system and is a standard covering both an interlaced scanning image and a sequential scanning image and a standard resolution image and a high definition image. For example, currently, MPEG2 is widely used for a broad range of applications for professional uses and consumer uses. By using the MPEG2 compression system, for example, in the case of an interlaced scanning image of the standard resolution having 720×480 pixels, a code amount (bit rate) of 1 to 8 Mbps is assigned. In addition, by using the MPEG2 compression system, for example, in the case of an interlaced scanning image of high resolution having 1920×1088 pixels, a code amount (bit rate) of 18 to 32 Mbps is assigned. Accordingly, a high compress ion rate and a satisfactory picture quality can be realized.

The MPEG2 is mainly targeted for high image quality cooing that is mainly appropriate for a broadcast but does not comply with a coding system having a code amount (bit rate) lower than that of MPEG1, in other words, having a compression, rate higher than that of MPEG1. However, it is considered, that the number of such requests will be increased in the future in accordance with the wide use of portable terminals, and standardization of an MPEG4 coding system was made in accordance therewith. Its standard relating to an image coding system was approved on December, 1998 as ISO/IEC Furthermore, in recent years, for the initial purpose of image coding for television conferences, H.26L international Telecommunication Union Telecommunication Standardization Sector (ITU-T) Q6/16 Video Coding Expert Group (VCEG)) has been standardized. It is known chat H.26L requires a more calculation amount due to the coding process and the decoding process thereof than chat of a conventional cooing system seen as MPEG2 or MPEG4, and realizes higher coding efficiency. In addition, currently, as part of activities of MPEG4, a standard realizing higher coding efficiency by introducing functions not supported according to H.26L based on H.26L has been made as Joint Model of Enhanced-Compression Video Coding.

As a schedule of the standardization thereof, in March, 2003, an international standard was made based on names of H.264 and MPEG-4 Part 10 (Advanced video Coding; hereinafter, referred to as AVC).

In addition, as an extension of H.264/AVC, standardization of Fidelity Range Extension (FREzt) inducting coding tools required for a business use and 8×8 DOT and a quantization matrix defined in MPEG-2, which are called RGB, 4:2:2, and 4:4:4, has been completed in February, 2005. In this way, a coding system capable of representing a film noise included in a movie is formed by using H.264/AvC, and H.264/AvC is on a stage of being used in a broad range of applications of Bin-Ray Disc (trademark) and the like.

However, recently, the number of requests for coding having a further higher compression rate such as a request for compressing an image of about 4000×2000 pixels than, are four times the number of pixels of a high definition image and a request for delivering a high definition image in an environment having a limited transmission capacity such as the Internet has been increased. For this reason, reviews for improving the coding efficiency have been continuously made by the VCEG affiliated with, the ITU-T described above.

Thus, currently, for the purpose of further improving the coding efficiency to be higher than that of the AVC, standardization of a coding system called high Efficiency Video Coding (HEVC) has been progressed by a Joint Collaboration Team—Video Coding (JCTVC) that is a joint standardization organization of the ITU-T and the International Organisation for Standardization/International Electrotechnical Commission (ISO/IEC). Regarding the HEVC standard, a committee draft that is a draft-edition specification was issued in January, 2013 f or example, see Non-Patent Document 1).

<Coding System>

Hereinafter, the present technology will be described in the case of being applied to image coding/decoding of the high Efficiency Video Coding (HEVC) system as an example.

<Coding Unit>

In the Advanced Video Coding (AVC) system, a hierarchical structure configured, by a macro block and a sub macro block is defined. However, a macro block of 16×16 pixels is not optimal for a large image frame called Ultra high Definition (UHD; 4000 pixels×2000 pixels) that becomes a target for a next-generation coding system.

In contrast to this, in the HEVC system, as illustrated in FIG. 1, a coding unit (CU) is defined.

A Co is also called a Coding Tree Block (CTB) and is a partial area of a picture unit that achieves a role similar to that of the macro block in the AVC system. While the macro block is fixed to the size of 16×16 pixels, the size of the CU is not fixed but is designated in image compression information in each sequence.

For example, in the sequence parameter set (SPS) included in coded data that is an output, a maximum size (Largest Coding Unit (LCU)) and a minimum size (Smallest Coding Unit (SCU)) of the CU are defined.

Within each LCU, by setting split-flag=1 in a range not under the size of the SCU, the LCU can be split into CUs having a smaller size. In the example illustrated, in FIG. 1, the size or the LCU is 128, and a largest hierarchical depth is 5. When the value of split flag is "1", the CU having a size of 2N×2N is split into CUs each having at size of N×N at a hierarchy one level below.

Furthermore, the CU is split into prediction units (PUs) that are areas (partial areas of an image in units of pictures) that are processing units of an intra prediction or an infer prediction and is spilt into transform units (TUs) that tire areas (partial areas of an image in units of pictures) that are processing units of an orthogonal transform. At present, in the HEVC system, 16×15 and 32×32 orthogonal transforms can be used in addition to 4×4 and 8×8 orthogonal transforms.

As in the HEVC system described above, in the case of a coding system in which, a CU is defined, and various processes are performed in units of CUs, it may be considered that a macro block of the AVC system corresponds to an LCU, and a block (sub block) corresponds to a CU. In addition, a motion compensation block of the AvC system may be considered to correspond to a PU. However, since the CU has a hierarchical structure, generally, the size of the LCU of the highest hierarchy is set to be larger than that of the macro block of the AVC system such as 128×128 pixels.

Thus, hereinafter, an LCU is assumed to include a macro block of the AvC system as well, and a CU is assumed to include a block (sub block) of the AVC system as well. In other words, a "block" used in the description presented, below represents an arbitrary partial area within the picture, and the size, the shape, the characteristic, and the like thereof are not specifically limited. In other words, a "block", for example, includes arbitrary areas suet as a TU, a PU, an SCU, a CU, an LCU, a sub block, a macro block, and a slice. If is apparent, that a partial area (processing unit) other than those is also included therein. In addition, a case where the size, the processing unit, or the like needs to be limited will be appropriately described.

In this specification, a Coding Tree Unit (CTU) is assumed to be a unit that includes s. Coding Tree Block (CTB) of a CU of a largest number (LCU) and a parameter at the time of processing at the ECU base (level) thereof. In addition, a Chiding Unit (CU) configuring the CTU is assumed to be a unit: that includes a Coding Block (CB) and a parameter at the time of processing at the CU base (level) thereof.

<Mode Selection>

In the AVC and HEVC coding systems, in order to attain higher coding efficiency, selection of an appropriate prediction mode is significant.

As an example of such a selection system, there is a method in which the selection system is embedded in reference software (published at http://iphome.bhi.de/suehring/tml/index.htm) of H.264/MPEG-4AVC called a JM (Joint Model).

In the JM, a mode determination method for determining two modes including a high complexity mode and a low complexity mode to be described below can be selected. In any one of the modes, a cost function value relating to each prediction mode Mode is calculated, and a prediction mode having a smallest cost function value is selected as an optimal mode for the block or the macro block.

The cost function in the high complexity mode is represented below as in Equation (1).

[Mathematical Formula 1]

$$\text{Cost(Mode } \epsilon\Omega)=D+\lambda*R \qquad (1)$$

Here, $\Omega$ is a universal set of candidate modes used for coding the block or the macro block, D is differential energy between a decoded image and an input image in a case where coding is performed in the prediction mode. In addition, A is a Lagrange undefined multiplier given as a function of a quantization parameter. R is a total code amount of a case where coding is performed in the mode that includes the orthogonal transform coefficient.

In other words, when coding is performed in the high complexity mode, in order to calculate the above-described parameters D and P, a provisional encoding process needs to be performed once for all the candidate modes, and accordingly, a larger calculation amount is necessary.

A cost, function in the low complexity mode is represented below as in Equation 2).

[Mathematical Formula 2]

$$\text{Cost(Mode } \epsilon\Omega)=D+QP2\text{Quant}(QP)*\text{HeaderBit} \qquad (2)$$

Here, D, different from that one case of the high complexity mode, is differential energy between a predicted, image and an input image. In addition, QP2Quant (QP) is given as a function of a quantization parameter OP, and HeaderBit is a code amount relating to information belonging to a header such as a motion vector and a mode that does not include an orthogonal transform coefficient.

In other words, in the low complexity mode, while a prediction process needs to be performed for each candidate mode, a decoded image is not necessary, tuna the coding process does not need to be performed. For this reason, the low complexity mode can realize a calculation amount lower than that of the high complexity mode.

<Residual Prediction>

Meanwhile, in the HEVC, a method for making a prediction (also referred to as a residual prediction) of a residual signal between components at the time of 444 coding has been considered (for example, see Non-patent Document 2).

In a method disclosed in this Non-patent Document 2, a color difference component (Cb/Cr) (or an R component or a B component) is predicted using a luminance component (Y) (or a G component) as in the following Equation (3).

[Mathematical formula 3]

$$\Delta r_c(x,y)=r_c(x,y)-(\alpha*r_L(x,y))>>3 \qquad (3)$$

Here, $r_c(x, y)$ represents residual data (a difference between an input image and a predicted image) of a color difference component (Cb or Cr). In addition, $r_L(x, y)$ represents residual data (a difference between an input image and a predicted image) of a luminance component (Y). Furthermore, $\Delta r_c(x, y)$ represents a prediction result (the residual data of the color difference component (Cb or Cr) is predicted, using residual data of the luminance component (Y)) of a residual prediction (also referred to as predicted residual data). In these, "x, y" represents a position (coordinates) within an image.

In addition, $\alpha$ represents a weighting coefficient and takes a value of one of ±(0, 1, 2, 4, 8). This value is set in units of TUs (in other words, the value is transmitted to the decoding side in units of TUs). Here, ">>" represents a bit shift to the right side (right shift). For example, ">>n" represents a right shift corresponding to n bits.

Whether or not such a residual prediction is made is controlled in units of picture parameter sets (PPS). In other words, in a PPS, an on/off flag controlling whether or net such a residual prediction is made is transmitted to the decoding side.

Meanwhile, generally, the bit depths of data of components are independent from each other, and thus, there is a possibility that mutually-different values are set. However, as illustrated in Equation (3) described above, in the predict ion method disclosed in Non-patent. Document 2, there is a premise that the bit depths of the residual data, (luminance components or color difference components) of the components are the same, and a case where the bit depths of the residual data are different between the components is not considered. In other words, in a prediction as represented in Equation (3), in a case where the bit depths of the residual data are different from each other between the components, a correct prediction is not made, and there is concern that the coding efficiency is lowered.

<Scaling Bit Depth>

Thus, when a prediction (residual prediction) among components is made for residual data between an input image configured by a plurality of the components and a predicted image, the bit depths of the residual data are arranged to be uniform (scaling is performed) among the components. By arranging as such, also in a case where the bit depths of residual data are different among the components, a prediction can be made with the bit depths of the residual data of the components being uniform, and accordingly, the residual prediction can be correctly made. Accordingly, a decrease in the coding efficiency can be suppressed.

While a method for arranging the bit depths of the residual data to be uniform among the components is arbitrary, for example, the bit depths of the residual data may be arranged to be uniform among the components by performing a bit shift of the residual data. By configuring as such, the bit depths of the residual data can be easily arranged to be uniform among the components. In other words, the processing load and the processing rime can be decreased.

Here, the color space of the input image in which the bit depths of the residual data are arranged to be uniform is arbitrary. For example, the color space may be a YUV space (YUV444 or the like) or an RGB space (RGB444 or the like), For example, in a case where the color space of an input image is the YUV space, the prediction may be made with the bit depths of residual data being arranged to be uniform between a luminance component, and a color difference component through a bit shift. More specifically, for example, the prediction may be made after the bit depth of the luminance component is arranged to be uniform with respect, to the bit depth of the color difference component through a bit shift. In addition, for example, in a case where the color space of the input image is the RGB space, the prediction may be performed with the bit depths of the residual data being arranged to be uniform, between a G component and an R component or a B component through a bit shift. More specifically, for example, the prediction may be made after the bit depth of the G component is arranged to be uniform with respect, to the bit depth of the R component or the B component through, a bit shift.

<Shift Operation>

A specific example of the bit shift (shift operation) for arranging the bit depths to be uniform as described above will be described, A method for the shift operation is arbitrary. For example, in a case where a bit depth difference between two components to be predicted is not zero, a prediction may be made with the bit depths of residual data being arranged to be uniform between the components through a bit shift. For example, as represented in the following Equation (4), it may be configured such that a difference (bit depth difference) of bit depths of residual data between the components is acquired, and, as represented in Equations (5) to (8), a bit shift corresponding to the bit depth difference is made. At that time, the bit shift corresponding to the absolute value of the bit depth difference, as represented in Equation (6) or (8), may be made. In such a case, for example, a shift direction may be determined as represented in Equation (6) and Equation (8) based on whether or not the conditions of Equation (5) and Equation (7) are satisfied.

[Mathematical Formula 4]

$$\Delta bitdepth = BitDepth_Y - BitDepth_C \quad (4)$$

$$\text{if } (\Delta bitdepth \geq 0) \quad (5)$$

$$\Delta r_c(x,y) = r_c(x,y) - (\alpha \times (r_L(x,y) >> \Delta bitdepth)) >> 3 \quad (6)$$

$$\text{else} \quad (7)$$

$$\Delta r_c(x,y) = r_c(x,y) - (\alpha \times (r_L(x,y) << -\Delta bitdepth)) >> 3 \quad (8)$$

In Equation (4) to Equation (8), $BitDepth_Y$ represents the bit depth of the residual data of the luminance component (Y), and $BitDepth_C$ represents the bit depth of the residual data of the color difference component (Cb or Cr). In addition, $\Delta bitdepth$ represents a bit depth difference (a difference between the bit depth ($BitDepth_Y$) of the residual data of the luminance component (Y) and the bit depth ($BitDepth_C$) of the residual data of the color difference component (Cb or Cr)) between components.

In addition, $r_c(x, y)$ represents the residual data, of the color difference component (Cb or Cr). Furthermore, $r_L(x, y)$ represents the residual data of the luminance component (Y). In addition, $\Delta r_c(x, y)$ represents a predicted residual data (the residual data of the color difference component (Cb or Cr) is predicted using the residual data of the luminance component (Y); between components. In these, "x, y" represents a position (coordinates) within an image.

In addition, a represents a weighting coefficient. The value of a is arbitrary and, for example, is set to a value of one of ±(0,1,2,4,8). This value is set in units of TUs (in other words, the value is transmitted to the decoding side in units of TUs). Here, ">>" represents a bit shift to the right side (right shift), and "<<" represents a bit shift to the left side (left shift). For example, ">>n" represents a right shift corresponding to n bits, and "<<m" represents a left shift corresponding to m bits.

In case of this example, as represented in Equation (4) to Equation (8), a bit depth difference ($\Delta bitdepth$) between, components is calculated using Equation (4). Then, in a case where this value satisfies the condition of Equation (5), in other words, in a case where $\Delta bitdepth$ is zero or more, predicted, residual data ($\Delta r_c(x, y)$) is calculated as in Equation (6). As represented in Equation (6), although a calculation method of this case is basically the same as Equation (3), the predicted residual data ($\Delta r_c(x, y)$) is calculated by shifting the residual data ($r_L(x, y)$) of the luminance component (Y) to the right side in correspondence with the bit depth difference ($\Delta bitdepth$).

On the other hand, in a case where the bit depth difference ($\Delta bitdepth$) between the components has a negative value (a value less than zero) and does not satisfy the condition of Equation (5) (the condition of Equation (7) is satisfied), predicted residual data ($\Delta r_c(x, y)$) is calculated as in Equation (3). As represented in Equation (8), although a calculation method of this case is basically the same as Equation (3), the predicted residual data ($\Delta r_c(x, y)$) is calculated by shifting the residual data ($r_L(x, y)$) of the luminance component (Y) to left right side in correspondence with the bit depth difference ($-\Delta bitdepth$).

In other words, in such a case, the bit depth ($BitDepth_Y$) of the residual data ($r_L(x, y)$) of the luminance component (Y) can be arranged to be uniform for the bit depth ($BitDepth_C$) of the residual data ($r_c(x, y)$) of the color difference component (Cb or Cr), and predicted residual data ($\Delta r_c(x, y)$) is calculated. More specifically, a difference between the bit depths of two components used for a residual prediction is acquired, a bit shift (scaling) corresponding to a difference between the bit depths is made for the residual data of one component of the two components, the residual data that is bit-shifted is multiplied by a predetermined weighting coefficient, a bit shift corresponding to a predetermined number of bits is made for a result of the multiplication, and a difference between the residual data of the other component and the result of the multiplication that has been bit-shifted is acquired, A prediction may be made as above.

In a case where $\Delta bitdepth$ is zero, the bit shift amount of the residual data ($r_L(x, y)$) of the luminance component (Y) is zero, and thus, the predicted residual data ($\Delta r_c(x, y)$) can be regarded as being calculated as in Equation (3).

By calculating as described above, also in a case where the bit depths of the residual data are different between components, predicted residual data ($\Delta r_c(x, y)$) can be correctly calculated. Accordingly, a decrease in the coding efficiency can be suppressed.

<Semantics>

In order to perform scaling of the bit depth as described above, semantics may be described as an example illustrated in FIG. 2. A portion of the semantics illustrated in FIG. 2 to which an underline is applied is a description corresponding to the scaling (for example, Equation (5) to Equation (8)) described, above.

<Image Coding Apparatus>

Figure 3:
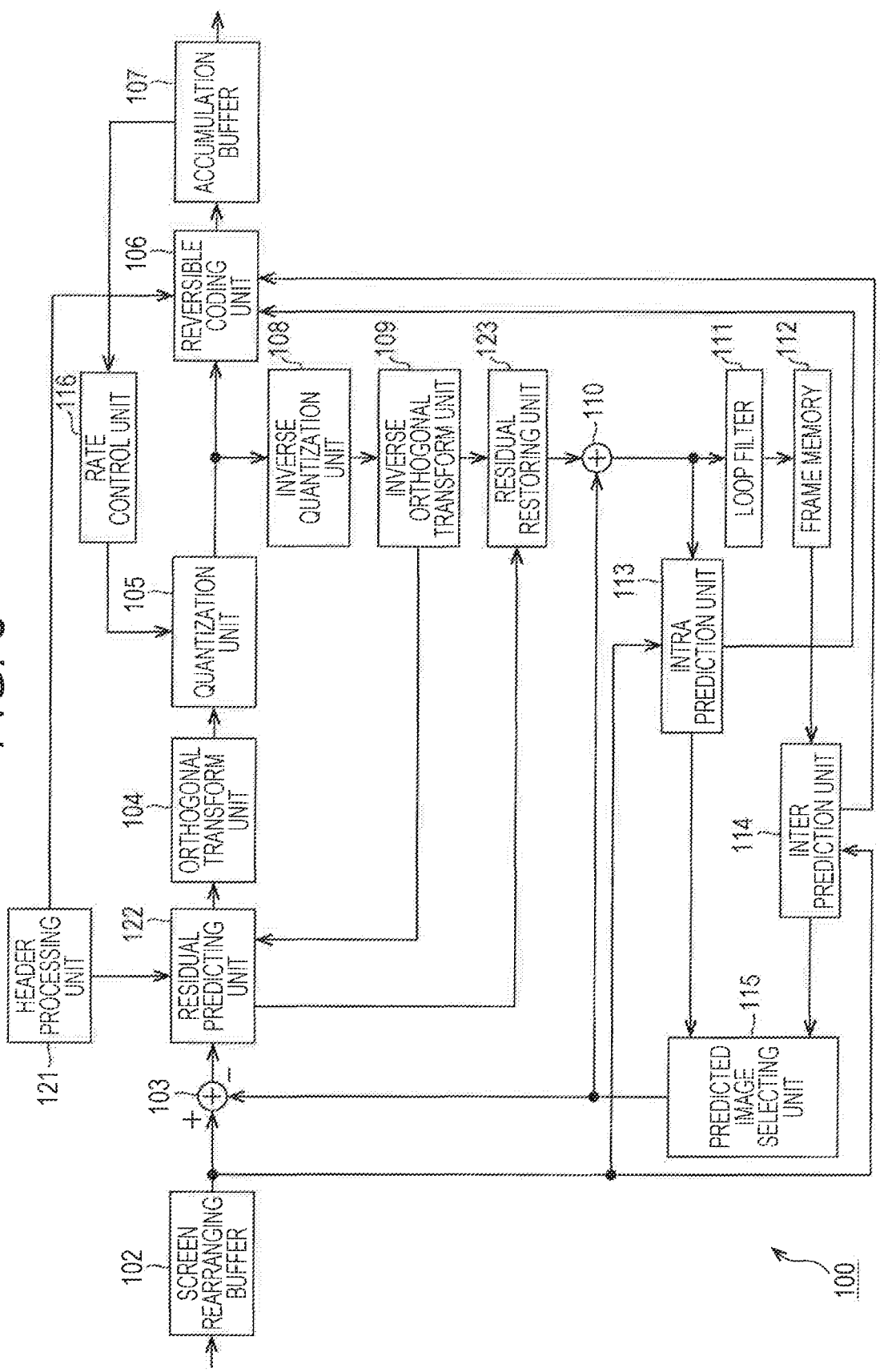
FIG. 3 is a block diagram that illustrates an example of the main configuration of an image coding apparatus.

FIG. 3 is a block diagram that illustrates an example of the configuration of an image coding apparatus that is one aspect of an image processing apparatus according to the present, technology. The image coding apparatus 100 illustrated in FIG. 3 codes image data of a moving image, for example, by using a prediction process of the HEVC or a prediction process of a system that is compliant therewith.

Hereinafter, a case will be described as an example in which the color space of an input image is YUV444.

As illustrated in FIG. 3, the image coding apparatus 100 includes: a screen rearranging buffer 102; a calculation unit 103; an orthogonal transform unit 104; a quantization unit 105; a reversible coding unit 106; an accumulation buffer 107; an inverse quantization unit 108; and an inverse orthogonal transform unit 109. In addition, the image coding apparatus 100 includes: a calculation unit 110; a loop filter 111; a frame memory 112; an intra prediction unit 113; an inter prediction unit 114; a predicted image selecting unit 115; and a rate control unit 116. Furthermore, the image, coding apparatus 100 includes: a header processing unit 121; a residual predicting unit 122; and a residual restoring unit 123.

The screen rearranging buffer 102 stores images of frames of input image data in order of display, rearranges the stored images of the frames in order for coding in accordance with a Group Of Picture (GOP), and supplies the images acquired by rearranging the order of frames to the calculation unit 103. In addition, the screen rearranging buffer 102 supplies the images acquired by rearranging the order of frames also to the intra prediction unit 113 and the inter prediction, unit 114.

The calculation unit 103 subtracts a predicted image supplied from the intra prediction unit 113 or the inter prediction unit 114 through the predicted image selecting unit 115 from an image read from the screen rearranging buffer 102 and supplies difference information (residual data) thereof to the residual predicting unit 122. For example, in the case of an image for which intra coding is performed, the calculation unit 103 subtracts a predicted image supplied from the intra prediction unit 113 from an image read from the screen rearranging buffer 102. On the other hand, for example, in the case of an image for which inter coding is performed, the calculation unit 103 subtracts a predicted image supplied from the inter prediction unit 114 from an image read from the screen rearranging buffer 102.

The orthogonal transform unit 104 performs an orthogonal transform such as a discrete cosine transform or a Karhuren-Loeve transform, for the residual data of the luminance component or the predicted residual data of the color difference component supplied from the residual predicting unit 122. The orthogonal transform unit 104 supplies transform coefficients acquired through the orthogonal transform to the quantization unit 105.

The quantization unit 105 quantizes the transform coefficients supplied from the orthogonal transform unit 104, The quantization unit 105 sets quantization parameters based on information relating to a target value of a coding amount that is supplied from the rate control unit 116 and performs the quantization thereof. The quantization unit 105 supplies the quantized transform coefficients to the reversible coding unit 106.

The reversible coding unit 106 codes the quantized transform coefficients quantized by the quantization unit 105 using an arbitrary coding system. Since the coefficient data is quantized under the control of the rate control unit 116, the coding amount becomes the target value (or a value close to the target value) set by the rate control unit 116.

In addition, the reversible coding unit 106 acquires information representing the mode of the intra prediction and the like from, the intra prediction unit 113 and acquires the information representing the mode of the inter prediction, differential motion vector information, and the like from the inter prediction unit 114.

The reversible coding unit 106 codes such various information items using an arbitrary coding system and configures the coded information as a part of header information of coded data (also referred to as a coded stream) (multiplexed). The reversible coding unit 106 supplies the coded data acquired by the coding process to the accumulation buffer 107, thereby accumulating the coded data therein.

Examples of the coding system of the reversible, coding unit 106 include, a variable length coding, arithmetic coding, and the like. As examples of the variable length coding, there are Context-Adaptive Variable Length Coding (CAVLC) defined in the H.264/AVC system and the like. As examples of the arithmetic coding, there is Context-Adaptive Binary Arithmetic Coding (CABAC) or the like.

The accumulation buffer 107 temporarily maintains the coded data supplied from the reversible coding unit 106. In addition, the accumulation buffer 107 outputs the maintained coded data to the outside of the image coding apparatus 100 at predetermined timing. In other words, the accumulation buffer 107 is a transmission unit that transmits the coded data as well.

In addition, the transform coefficients quantized by the quantization unit 105 are supplied also to the inverse quantization unit 108, The inverse quantization unit 108 performs inverse quantization of the quantized transform coefficients by using a method corresponding to the quantization process performed by the quantization unit 105, The inverse quantization unit 108 supplies the transform coefficients acquired by the inverse quantization process to the inverse orthogonal transform unit 109.

The inverse orthogonal transform unit 109 performs an inverse orthogonal transform of the transform coefficients supplied from the inverse quantization unit 108 by using a method corresponding to the orthogonal transform process performed by the orthogonal transform unit 104, The inverse orthogonal transform unit 109 supplies output (the residual data of the restored luminance component and the predicted residual data of the color difference component) for which the inverse orthogonal transform is performed to the residual restoring unit 123. In addition, the inverse orthogonal transform unit 109 supplies the residual data of the restored luminance component to the residual predicting unit 122 as well.

The calculation unit HQ adds a predicted image supplied from the intra prediction unit 113 or the inter prediction unit 114 through the predicted image selecting unit 115 to the restored residual data of each component supplied from the residual restoring unit 123, thereby acquiring an image (hereinafter, referred to as a reconstruction image) that is locally reconstructed. The restored image is supplied to the loop filter 111 or the intra prediction unit 113.

The loop filter 111 includes a de-blocking filter, an adaptive loop filter, or the like and appropriately performs a filter process for a reconstruction image supplied from the calculation unit 110. For example, the loop filter 111 removes a block distortion of the reconstruction image by performing a de-blocking filter process for the reconstruction image. In addition, for example, the loop filter 111 performs a loop filter process using a Wiener filter for a result (a reconstruction image from which the block distortion has been removed) of the de-blocking filter process, thereby improving the image quality.

Furthermore, the loop filter 111 may be configured to perform any other additional arbitrary filter process for the reconstruction image. In addition, the loop filter 111, as is necessary, may be configured to supply information such as filter coefficients used for the filter process and the like, to the reversible coding unit 106 so as to code the information.

The loop filter 111 supplies a filter process result (hereinafter, referred to as a decoded image) to the frame memory 112.

The frame memory 112 stores the supplied decoded image and supplies the stored decoded image to the inter prediction unit 114 at predetermined timing as a reference image.

The intra, prediction unit 113 performs an intra prediction (infra-screen prediction) in which a predicted image is generated by using pixel values within a processing target picture that is a reconstruction image supplied from the calculation unit 110 as a reference image. The intra prediction unit 113 performs the intra prediction using a plurality of intra prediction modes prepared in advance.

The intra prediction unit 113 generates predicted images in all the intra prediction modes that are candidates, evaluates a cost function value of each predicted image by using an input image supplied from the screen rearranging buffer 102, and selects an optimal mode. When the optimal intra prediction mode is selected, the intra prediction unit 113 supplies the predicted image generated in the optimal mode to the predicted image selecting unit 115.

In addition, as described above, the intra prediction unit 113 appropriately supplies intra prediction mode information representing the employed intra prediction mode and the like to the reversible coding unit 106 so as to code them.

The inter prediction unit 114 performs an inter prediction process (a motion prediction process and a compensation process) by using an input image supplied from the screen rearranging buffer 102 and a reference image supplied from the frame memory 112, More specifically, the inter prediction unit 114 performs a motion compensation process in accordance with a motion vector detected by performing a motion prediction as an inter prediction process, thereby generating a predicted image (inter prediction image information). The inter prediction unit 114 performs such an inter prediction in a plurality of inter prediction modes prepared in advance.

The inter prediction unit 114 generates prediction images in all the inter prediction modes that are candidates. The inter prediction unit 114 evaluates a cost function value of each predicted image by using the input image supplied from the screen rearranging buffer 102 and information of the generated difference motion vector and the like and selects an optimal mode. When the optimal inter prediction mode is selected, the inter prediction unit 114 supplies the predicted image generated in the optimal mode to the predicted image selecting unit 115.

The inter prediction unit 114 supplies information representing an employed inter prediction mode, information required for performing the process in the inter prediction mode at the time of decoding the coded data, and the like to the reversible coding unit 106 so as to code the information. As the required information, for example, there are information of the generated difference motion vector, a flag representing an index of a predicted motion vector as predicted mot ion vector information, and the like.

The predicted image selecting unit 115 selects a supply source of a predicted image to be supplied to the calculation unit 103 and the calculation unit 110, For example, in the case of the intra coding, the predicted image selecting unit 115 selects the intra prediction unit 113 as a supply source of a predicted image and supplies the predicted image supplied from the intra prediction unit 113 to the calculation unit 103 and the calculation unit 110. On the other hand, for example, in the case of the inter coding, the predicted image selecting unit 115 selects the inter prediction unit 114 as a supply source, of a predicted image and supplies the predicted image supplied from the inter prediction unit 114 to the calculation unit 103 and the calculation unit 110.

The rate control unit 116 controls of the rare of the quantization operation performed by the quantization unit 105 based on the coding amount of the coded data accumulated in the accumulation buffer 107 such that an overflow or an underflow does not occur.

The header processing unit 121, for example, generates additional information (also referred to as header information) such as a video parameter set (VPS), a sequence parameter set (SPS), a picture parameter set (PPS), supplemental enhancement information (SEI), and a slice header other than the image information. The header processing unit 121 supplies the generated header information to the reversible coding unit 106 and transmits the header information with being included in a bit stream to the decoding side. In addition, the header processing unit 121 supplies necessary information among the generated header information to the residual predicting unit 122. Details thereof will be described later.

The residual predicting unit 122 performs a residual prediction by using the residual data of a color difference component supplied from the calculation unit 103 and the residual data of a restored luminance component supplied from the inverse orthogonal transform unit 109. More specifically, the residual predicting unit 122 performs a prediction of the residual data of the color difference component by using the residual data of the restored luminance component, thereby-generating predicted residual data. At that time, the residual predicting unit 122 performs a prediction with the bit depths of the residual data arranged to be uniform between the components. Details thereof will be described later. The residual predicting unit 122 supplies the predicted residual data of the color difference component acquired through such a residual prediction and the residual data of the luminance component supplied from the calculation unit 103 to the orthogonal transform unit 104. On the other hand, in a case where the residual prediction is not perforated, the residual predicting unit 122 supplies the residual data of each component supplied from, the calculation unit 103 to the orthogonal transform unit 104.

The residual restoring unit 123 restores the residual data of the color difference component by using the residual data of the luminance component and the predicted residual data of the color difference component supplied from the inverse orthogonal transform unit 109 (also referred to as residual restoration). At that time, the residual restoring unit 123 performs restoration by arranging the bit depths of the residual data to be uniform between the components. The process of the residual restoration is basically similar to the process of the residual restoration performed, on the decoding side, and thus, when the decoding side is described, the description of the process of the residual restoration will be presented by using the description for the decoding side. The residual restoring unit 123 supplies the residual data of each component, that has been restored to the calculation unit 110.

<Header Processing Unit and Residual Predicting Unit>

Figure 4:
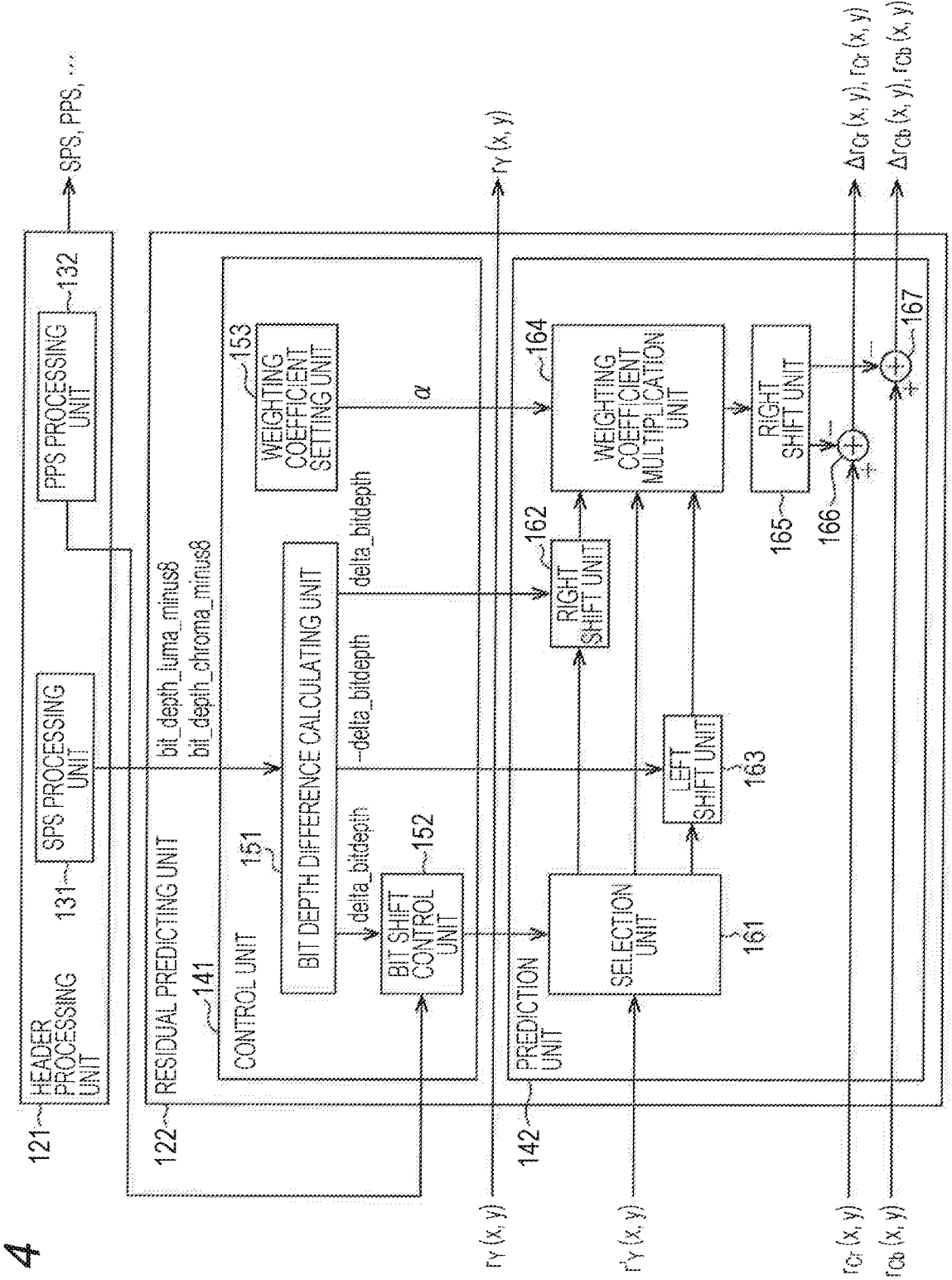
FIG. 4 is a block diagram that illustrates an example of the main configurations of a header processing unit and a residual prediction unit.

FIG. 4 is a block diagram, that illustrates an example of the main configurations of the header processing unit 121 and the residual predicting unit 122 illustrated in FIG. 3. As illustrated, in FIG. 4, the header processing unit 121 includes: an SPS processing unit 131; and a PPS processing unit 132.

The SPS processing unit 131, for example, performs a process relating to the generation of a sequence parameter set (SPS). In addition, the SPS processing unit 131, for example, supplies information including information (for example, bit_depth_luma_minus8), which is included in the sequence parameter set (SPS), representing the bit depth of the luminance component or information including the information representing the bit depth of the luminance component and information (for example, bit_depth_chroma_minus8) representing the bit depth of the color difference component (Cb/Cr) or information including the information representing the bit depth of the color difference component to the residual predicting unit 122 (a bit depth difference calculating unit 151 to be described later).

The PPS processing unit 132, for example, performs a process relating to the generation of a picture parameter set (PPS). In addition, the PPS processing unit 132, for example, supplies information (for example luma_chroma_prediction_enabled_flag), which is included in the picture parameter set (PPS), used for controlling whether or not a residual prediction is performed to the residual predicting unit 122 (a bit shift control unit 152 to be described later).

The residual predicting unit 122 supplies the residual data ($r_Y(x, y)$) of the luminance component supplied from the calculation unit 103 to the orthogonal transform unit 104. The residual predicting unit 122 includes a control unit 141 and a prediction unit 142. The control unit 141 performs a process relating to the control of calculation of a residual prediction. The prediction unit 142 is controlled by the control unit 141 and performs calculation relating to the prediction thereof. For example, the prediction unit 142, under the control of the control unit 141, generates predicted residual data ($\Delta r_{Cr}(x, y)$ and $\Delta r_{Cb}(x, y)$) by making a prediction (residual prediction) of the residual data ($r_{Cr}(x, y)$ and $r_{Cb}(x, y)$) of the color difference component, which is acquired, from the calculation unit 103, by using the restored residual component ($r'_Y(x, y)$) of the luminance component, which is acquired from the inverse orthogonal transform unit 109, and supplies the generated predicted residual data to the orthogonal transform unit 104. In addition, the prediction unit 142, under the control of the control unit 141, supplies the residual data ($r_{Cr}(x, y)$ and $r_{Cb}(x, y)$) of the color difference component acquired from the calculation unit 103 to the orthogonal transform unit 104 without making a residual prediction.

The control unit 141 includes; a bit depth difference calculating unit 151; a bit shift control unit 152; and a weighting coefficient setting unit 153.

The bit depth difference calculating unit 151 calculates a bit depth difference between the residual data of components used for a residual prediction. For example, the bit depth difference calculating unit 151 acquires the information (for example, bit_depth_luma_minus8) representing the bit depth of the luminance component or information including the information representing the bit depth of the luminance component and the information (for example, bit_depth_chroma_minus8) representing the bit depth of the color difference component (Cb/Cr) or information including the information representing the bit depth of the color difference component from the SPS processing unit 131 and calculates a bit depth difference (delta_bitdepth) between the components by performing calculation represented in Equation (4) by using such information. The bit depth difference calculating unit 151 supplies the calculated bit depth difference (delta_bitdepth) to the bit shift control unit 152.

In addition, the bit depth difference calculating unit 151, under the control of the bit shift control unit 152, supplies the calculated bit depth difference (delta_bitdepth) to the prediction unit 142. For example, in a case where a right shift of the residual data is performed at the rime of scaling the bit depth, the bit depth difference calculating unit 151 supplies the calculated bit depth difference (delta_bitdepth) to the right shift unit 162. On the other hand, in a case where a left shift of the residual data is performed at the time of scaling the bit depth, the bit depth difference calculating unit 151 supplies the calculated bit depth difference (−delta_bitdepth) to the left shift unit 163.

The bit shift control unit 152 controls the calculation performed by the prediction unit 142 based on the value of the bit depth difference (delta_bitdepth) between the components supplied from the bit depth difference calculating unit 151. For example, in a case where the bit depth difference (delta_bitdepth) is zero, the bit shift control unit 152 performs control of the prediction unit 142 (the selection unit 161 thereof) such that a bit shift (the scaling of the bit depth) of the residual data is not performed. In addition, at that time, the bit shift control unit 152 also performs control of the bit depth difference calculating unit 151 such that, the bit depth difference (delta_bitdepth) is not supplied to the prediction unit 142.

In addition, for example. In a case where the bit depth difference (delta_bitdepth) has a positive value (>0), the bit shift control unit 152 performs control of the prediction unit 142 (the selection unit 161 thereof) such that the residual data is shifted to the right side (the scaling of the bit depth is performed). In addition, at that time, the bit shift control unit 152 also performs control of the bit depth difference calculating unit 151 such that the bit depth difference (delta_bitdepth) is supplied to the prediction unit 142 (the right shift unit 162).

On the other hand, for example, in a case where the bit depth difference (delta_bitdepth) has a negative value (<0), the bit shift, control unit 152 performs control of the prediction unit 142 (the selection unit 161 thereof; such that the residual data is shifted to the left side (the scaling of the bit depth is performed). In addition, at that time, the bit shift, control unit 152 also performs control of the bit depth difference calculating unit 151 such that the bit depth difference (−delta_bitdepth) is supplied, to the prediction unit 142 (the left shift unit 163).

In addition, the bit shift control unit 152, for example, acquires information (for example, luma_chroma_prediction_enabled_flag) used for controlling whether or not a residual prediction is performed from the PPS processing unit 132 and controls whether or not a residual prediction is performed based, on the value thereof. For example, in a case where it is represented that a residual prediction is not performed based on the information used for controlling whether or not a residual prediction is performed, the bit shift control unit 152 performs control of the prediction unit 142 such that calculation relating to the prediction is not perforated, in addition, in such a case, the bit shift control unit 152 performs control of the bit depth difference calculating unit 151 such that the supply of the bit depth difference (delta_bitdepth or −delta_bitdepth) is stopped. Furthermore, the bit shift control unit 152, in such a case, performs control of the weighting coefficient setting unit 153 such that, the weighting coefficient α is not set.

On the other hand, for example, in a case where it is represented that a residual prediction is performed based on the information used for controlling whether or not a residual prediction is performed, the bit shift control unit 152 performs control of the prediction unit 142 such that calculation relating to the prediction is performed. In addition, in such a case, the bit shift control unit 152 performs control of the bit depth difference calculating unit 151 such that the bit depth difference (delta_bitdepth or −delta_bitdepth) is supplied to the prediction unit 142. Furthermore, in such a case, the bit shift control unit 152 performs control of the weighting coefficient setting unit 153 to set the weighting coefficient α and supplies the weighting coefficient, to the prediction unit 142 (weighting coefficient multiplication unit 164).

The weighting coefficient setting unit 153 sets the weighting coefficient α under the control of the bit shift control unit 152. A method of setting the weighting coefficient α and the value thereof is arbitrary. For example the weighting coefficient, setting unit 153 may be configured to independently set the weighting coefficient α for each component. In addition, in a case where the weighting coefficient α is set, the weighting coefficient setting unit 153 supplies the weighting coefficient α to the prediction unit 142 (the weighting coefficient multiplication unit 164). This weighting coefficient α is used also for residual restoration and thus, is provided for the decoding side with being included in a bit stream.

The prediction unit 142 includes: a selection unit 161; a right shift unit 162; a left shift unit 163; a weighting coefficient multiplication unit 164; a right shift unit 165; a calculation unit 166; and a calculation unit 167.

The selection unit 161 selects a supply destination of the residual data ($r'_Y(x, y)$) of the luminance component, which has been restored, supplied from the inverse orthogonal transform unit 109 under the control of the bit shift control unit 152. For example, in case of performing scaling (right shift) of the bit depth, the selection unit 161 supplies the residual data ($r'_Y(x, y)$) of the luminance component, which has been restored, to the right shift unit 162. In this case, calculation, represented in Equation (6) is performed. In addition, in case of performing scaling (left shift) of the bit depth, the selection unit 161 supplies the residual data ($r'_Y(x, y)$) of the luminance component, which has been restored, to the left shift unit 163. In this case, calculation represented in Equation (8) is performed. On the other hand, for example, in a case where the scaling of the bit depth is not performed, the selection unit 161 supplies the residual data ($r'_Y(x, y)$) of the luminance component, which has been restored, to the weighting coefficient multiplication unit 164. In this case, calculation represented in Equation (3) is performed.

The right shift, unit 162 performs scaling of the bit depth by shifting the residual data ($r'_Y(x, y)$) of the luminance component, which has been restored, acquired from the selection unit 161 to the right, side in correspondence with a bit depth difference (delta_bitdepth) acquired from the bit depth difference calculating unit 151. The right shift, unit 162 supplies a result ($r'_Y(x, y)$>>delta_bitdepth) of the right shift of the residual data of the luminance component to the weighting coefficient multiplication unit 164.

The left shift unit 163 performs scaling of the bit depth by shifting the residual data ($r'_Y(x, y)$) of the luminance component, which has been restored, acquired from the selection unit 161 to the left side in correspondence with a bit depth difference (−delta_bitdepth) acquired from the bit depth difference calculating unit 151. The left shift unit 163 supplies a result ($r'_Y(x, y)$<<−delta_bitdepth) of the left shift of the residual data of the luminance component to the weighting coefficient multiplication unit 164.

The weighting coefficient multiplication unit 164 acquires the residual data of the luminance component that has been restored from one of the selection unit 161 to the left shift unit 163. For example, the weighting coefficient multiplication unit 164 acquires the restored residual data ($r'_Y(x, y)$) of the luminance component that has not been bit-shifted from, the selection unit 161. In addition, for example, the weighting coefficient multiplication unit 164 acquires the restored residual data ($r'_Y(x, y)$>>delta_bitdepth) of the luminance component that has been shifted to the right side from the right shift unit 162. In addition, for example, the weighting coefficient multiplication unit 164 acquires the restored residual data ($r'_Y(x, y)$<<−delta_bitdepth) of the luminance component that has been shifted to the left side from the left shift unit 163.

In addition, the weighting coefficient multiplication unit 164 acquires the weighting coefficient α from the weighting coefficient setting unit 153. The weighting coefficient multiplication unit 164 multiplies the restored residual data of the luminance component that has been acquired by the weighting coefficient α and supplies a result ($α×(r'_Y(x, y))$, $α×(r'_Y(x, y)$>>delta_bitdepth) or $α×(r'_Y(x, y)$<<−delta_bitdepth)) of the multiplication to the right shift unit 165.

The right shift unit 165 shifts the restored residual data ($α×(r'_Y(x, y))$, $α×(r'_Y(x, y)$>>delta_bitdepth) or $α×(r'_Y(x, y)$<<−delta_bitdepth)) of the luminance component, which, has been supplied from the weighting coefficient multiplication unit 164, to the right side by predetermined bits. While the bit shift amount is arbitrary, for example, in case of Equation (3), Equation (6), and Equation (8), the right shift unit 165 shifts the residual data to the right side by three bits. The right shift unit 165 supplies a result ($α×(r'_Y(x, y))$>>3, $α×(r'_Y(x, y)$>>delta_bitdepth)>>3, or $α×(r'_Y(x, y)$<<−delta_bitdepth)>>3) of the right shift to the calculation unit 166 or the calculation unit 167.

The calculation unit 166 generates predicted residual data ($Δr_{Cr}(x, y)$) of the color difference component (Cr) by subtracting the restored residual data ($α×(r'_Y(x, y))$>>3, $α×(r'_Y(x, y)$>>−delta_bitdepth)>>3 or, $α×(r'_Y(x, y)$<<−delta_bitdepth)>>3) of the luminance component, which is supplied from the right, shift unit 165, from, the residual data ($r_{Cr}(x, y)$) of the color difference component (Cr) supplied from, the calculation unit 103 and supplies the generated predicted, residual, data to the orthogonal transform unit 104. On the other hand, in a case where such calculation is not performed, the calculation unit 166 supplies the residual data ($r_{Cr}(x, y)$) of the color difference component (Cr) supplied from the calculation unit 103 to the orthogonal transform unit 104.

The calculation unit 167 generates predicted residual data ($Δr_{Cb}(x, y)$) of the color difference component (Cb) by subtracting the restored residual data ($α×(r'_Y(x, y))$>>3, $α×(r'_Y(x, y)$>>delta_bitdepth)>>3, or, $α×(r'_Y(x, y)$<<−delta_bitdepth)>>3) of the luminance component, which is supplied from the right shift unit 165 from the residual data ($r_{Cb}(x, y)$) of the color difference component (Cb) supplied from the calculation unit 103 and supplies the generated predicted residual data to the orthogonal transform unit 104. On the other hand, in a case where such calculation is not performed, the calculation unit 167 supplies the residual data ($r_{Cb}(x, y)$) of the color difference component (Cb) supplied from the calculation unit 103 to the orthogonal transform unit 104.

As described above, in a residual prediction, the residual predicting unit 122 performs the prediction by performing scaling of the bit depths of the restored residual data of the luminance components. Accordingly, also in a case where the bit depths of the residual data are different between the components, the residual predicting unit 122 can correctly calculate the predicted residual data. Therefore, according to the image coding apparatus 100, a decrease in the coding efficiency can be suppressed.

<Flow of Coding Process>

Next, an example of the flow of each process executed by the image coding apparatus 100 will be described. First, an example of the flow of the coding process will be described with reference to a flowchart, represented in FIG. 5.

When the coding process is started, the header processing unit 121, for example, generates header information such as a sequence parameter set (SPS) or a picture parameter set (PPS) in Step S101.

In Step S102, the screen rearranging buffer 102 stores images of frames (pictures) of an input moving image in display-order and rearranges the images from the display order of the pictures to the coding order.

In Step S103, the intra, prediction unit 113 performs an intra prediction process of an intra prediction mode.

In Step S104, the inter prediction unit 114 performs an inter prediction process in which a motion prediction, motion compensation, and the like are performed in the inter prediction mode.

In Step S105, the predicted image selecting unit 115 selects one of the predicted image generated, according to the intra prediction of Step S103 and a predicted image generated according to the inter prediction of Step S104 based on a cost, function value or the like.

In Step S106, the calculation unit 103 calculates a difference between an input image in which the frame order is rearranged by the process of Step S102 and a predicted image selected by the process of Step S105. In other words, the calculation unit 103 generates residual data between an input image and a predetermined image. The data amount of the residual data acquired in this way is smaller than that of original image data. Accordingly, the data amount can be compressed more than in a case where an image is directly coded. Such a process is performed for each of the components (Y, Or, and Cb).

In Step S107, the residual predicting unit 122 performs a residual prediction by using residual data of the luminance component for the residual data of the color difference component acquired by the process of Step S106. At that time, the residual predicting unit 122 performs a prediction with bit depths of the residual data being uniform among the components. This process will be described later in detail.

In Step S108, the orthogonal transform unit 104 performs an orthogonal transform for the residual data of the luminance component generated by the process of Step S106 and the predicted residual data of the color difference component generated, by the process of Step S107.

In Step S109, the quantization unit 105 quantizes orthogonal transform coefficients acquired by the process of Step S108 by using the quantization parameters calculated by the rate control unit 116.

In Step S110, the inverse quantization unit 108 performs inverse quantization of the quantized coefficients (also referred to as quantization coefficients) generated by the process of Step S109 by using characteristics corresponding to the characteristics of the quantization.

In Step S111, the inverse orthogonal transform unit 109 performs an inverse orthogonal transform of the orthogonal, transform coefficients acquired by the process of Step S108.

In Step S112, the residual restoring unit 123 restores the residual data of the color difference component by using the residual data of the luminance component restored by the process of Step S111 and the predicted residual data of the color difference component. At that time, the residual restoring unit 123 performs restoration with the bit depths of the residual data being uniform among the components. This process will be described later in detail.

In Step S113, the calculation unit 110 generates the image data of a reconstruction image by adding the predicted image selected by the process of Step S105 to the residual data of each component, restored by the process of Step S111 and Step S112.

In Step S114, the loop filter 111 performs a loop filter process for the image data of the reconstruction image generated by the process of Step S113, Accordingly, a block distortion and the like of the reconstruction image are eliminated.

In Step S115, the frame memory 112 stores a decoded image, which is locally decoded, acquired by the process of Step S114.

In Step S116, the reversible coding unit 106 codes the quantized coefficients acquired by the process of Step S109. In other words, for data corresponding to the residual data, reversible coding such as variable-length coding or arithmetic coding is performed.

In addition, at this time, the reversible coding unit 106 codes information relating to the prediction mode of the predicted image selected by the process of Step S105 and adds the coded information to coded data acquired by coding a differential image. In other words, the reversible coding unit 106 codes optimal intra prediction mode information supplied from the intra prediction unit 113 or information corresponding to the optimal inter prediction mode supplied from the inter prediction unit 114, and the like and adds the coded information to the coded data.

In Step S117, the accumulation buffer 107 stores the coded data and the like acquired by the process of Step S116. The coded data and the like stored in the accumulation buffer 107 are appropriately read as a bit stream and are transmitted to the decoding side through a transmission line or a recording medium.

In Step S118, the rate control unit 116 controls the rate of the quantization process of Step S109 based on the coding amount (generated coding amount) of the coded data and the like stored in the accumulation buffer 107 by the process of Step S117 such that an overflow or an underflow does not occur.

When the process of Step S118 ends, the coding process ends.

<Flow of Residual Predicting Process>

Next, an example of the flow of the residual predicting process performed in Step S107 of such a coding process will be described with reference to a flowchart illustrated in FIG. 6.

When the residual predicting process is started, in Step S121, the bit depth difference calculating unit 151 calculates a bit depth difference between components for which the residual prediction is performed. In other words, the bit depth difference calculating unit 151 performs calculation represented in Equation (4) and calculates a bit depth difference (delta_bitdepth) between the luminance component (Y) and the color difference component (Cr or Cb). In a case where bit depth differences are different between the color-difference component (Cr) and the color difference component (Cb), the bit depth differences (delta_bitdepth) are calculated.

In Step S122, the bit shift control unit 152 determines whether or not the bit depth difference (delta_bitdepth) calculated in Step S121 is zero. In a case where zero is determined, the process proceeds to Step S123 In such a case, a bit shift is not performed, but the residual prediction is performed as represented in Equation (3).

In Step S123, the bit shift, control unit 152 determines whether or not a residual prediction is performed based on information (for example, luma_chroma_prediction_enabled_flag), which is included in the picture parameter set (PPS), used, for controlling whether or not the residual prediction is performed or the like. For example, in a case where the value of luma_chroma_prediction_enabled, flag is "1", and the residual prediction is determined to be performed, the process proceeds to Step S124.

In Step S124, the weighting coefficient setting unit 153 sets a weighting coefficient α for each TU.

In Step S125, the prediction unit 142 performs a prediction (residual prediction) of residual data between components without performing scaling of the bit depths. Details of this process will be described later.

Figure 5:
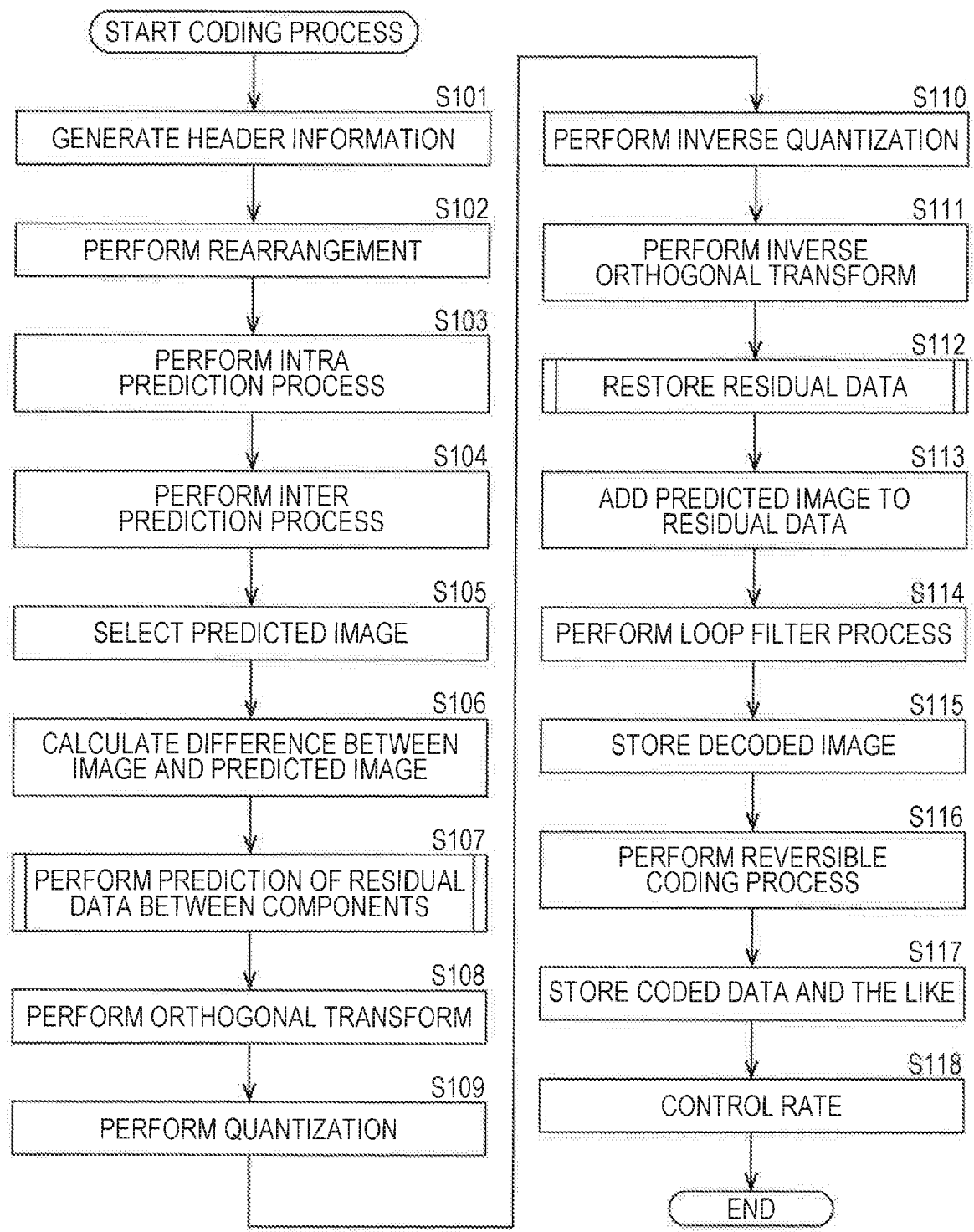
FIG. 5 is a flowchart that illustrates an example of the flow of a coding process.

In Step S125, when the residual prediction ends, the residual predicting process ends, and the process is returned to the process illustrated in FIG. 5.

On the other hand, for example, in Step S123, in a case where the value of luma_chroma_prediction_enabled_flag is "0", and the residual prediction is determined not to be performed, the process of Step S124 and Step S125 is omitted, the residual predicting process ends, and the process is returned to the process illustrated in FIG. 5.

In addition, in Step S122, in a case where the bit depth difference (delta_bitdepth) is determined not to be zero, the process proceeds to Step S126.

In Step S126, the bit shift control unit 152 determines whether or not the bit depth difference (delta_bitdepth) calculated in Step S121 is positive. In a case where being positive is determined, the process proceeds to Step S127. In such a case, a residual prediction is performed as represented in Equation (6) (scaling through a right shift is performed).

In Step S127, the bit shift control unit 152 determines whether or not a residual, prediction is performed based on information (for example, luma_chroma_prediction_enabled_flag) used for controlling whether or not the residual prediction is performed, which is included in the picture parameter set (PPS) or the like. For example, in a case where the value of luma_chroma_prediction_enabled_f lag is "1", and the residual prediction is determined to be performed, the process proceeds to Step S128.

In Step S128, the weighting coefficient setting unit 153 sets a weighting coefficient α for each TU.

In Step S129, the prediction unit 142 performs a prediction (residual prediction) of the residual data between components by performing scaling of the bit depths by using a right shift. Details of this process will be described later.

When the residual prediction performed in Step S129 ends, the residual predicting process ends, and the process is returned to the process illustrated in FIG. 5.

On the other hand, for example, in Step S127, in a case where the value of luma_chroma_prediction_enabled_f lag is "0", and the residual prediction is determined not to be performed, the process of Step S128 and Step S129 is omitted, the residual predicting process ends, and the process is returned to the process illustrated in FIG. 5.

In addition, in Step S126, in a case where the bit depth difference (delta_bitdepth) is determined not to be positive (determined to be negative), the process proceeds to Step S130. In such a case, the residual prediction is performed as represented in Equation (8) (scaling using a left shift is performed).

In Step S130, the bit shift control unit 152 determines whether or not a residual prediction is performed based on information (for example, luma_chroma_prediction_enabled_flag) used for controlling whether or not the residual prediction is performed, which is included in the picture parameter set (PPS) or the like. For example, in a case where the value of luma_chroma_prediction_enabled_flag is "1", and the residual prediction Is determined to be performed, the process proceeds to Step S131.

In Step S131, the weighting coefficient setting unit 153 sets a weighting coefficient α for each TU.

In Step S132, the prediction unit 142 performs a prediction (residual prediction) of the residual delta between components by performing scaling of the bit depths according to a left shift, Details of this process will be described, later.

When the residual prediction performed in Step S132 ends, the residual predicting process ends, and the process is returned to the process illustrated, in FIG. 5.

On the other hand, for example, in Step S130, in a case where the value of luma_chroma_prediction_enabled_flag is "0", and the residual prediction is determined not to be performed, the process of Step S131 and Step S132 is omitted, the residual predicting process ends, and the process is returned to the process illustrated in FIG. 5.

<Flow of Predicted Residual Data Generating Process>

Figure 7:
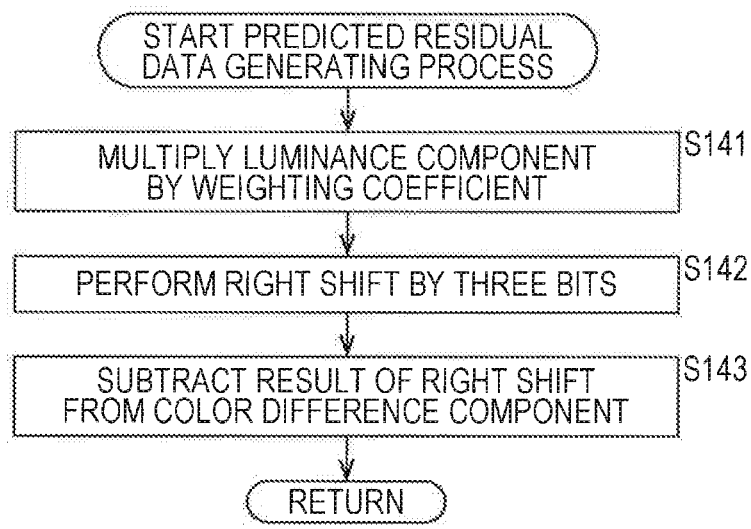
FIG. 7 is a flowchart that illustrates an example of the flow of a predicted residual data generating process.

Next, an example of the flow of the predicted residual data generating process performed in Step S125 of the residual predicting process will be described with reference to a flowchart illustrated in FIG. 7.

Figure 6:
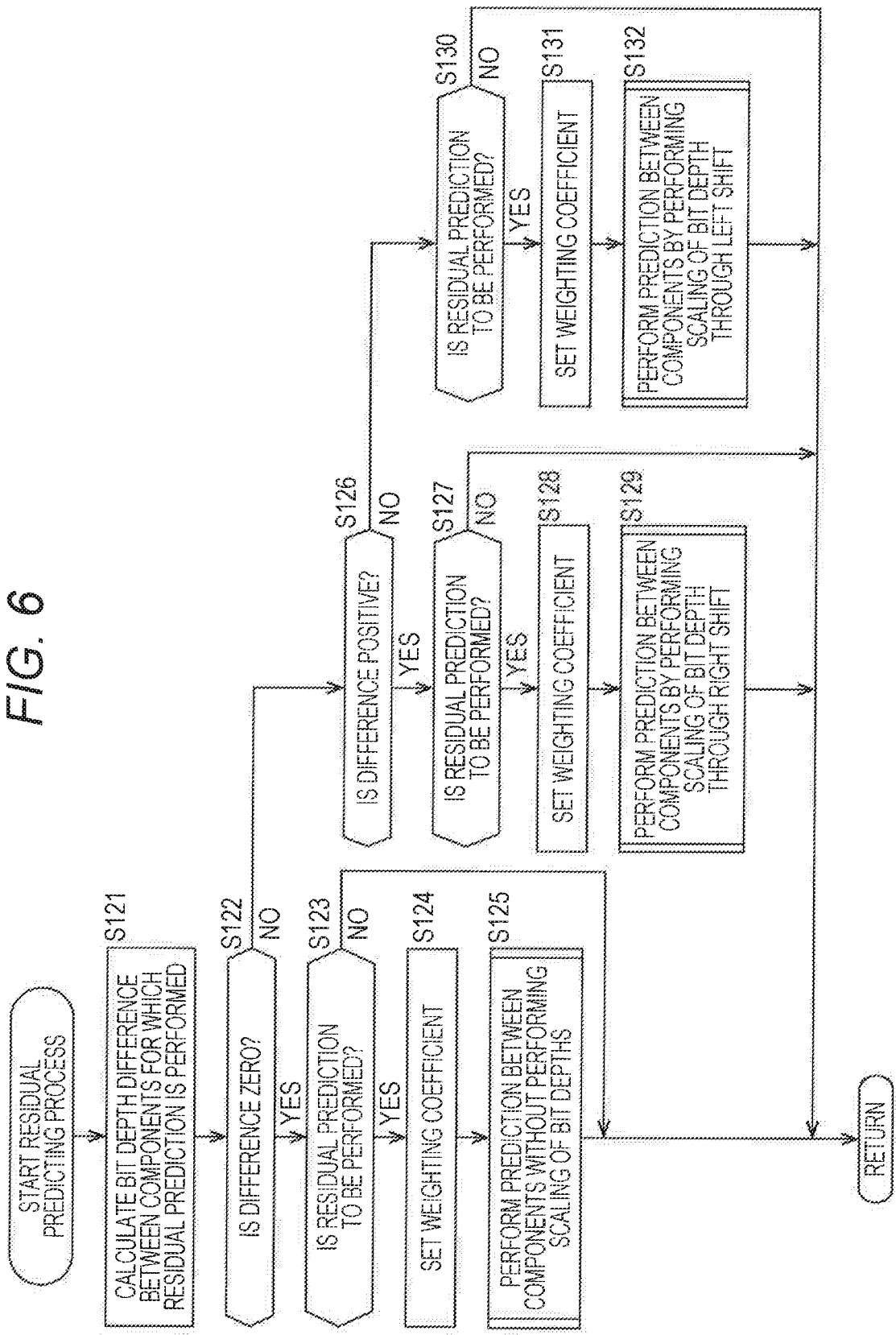
FIG. 6 is a flowchart that, illustrates an example of the flow of a residual predicting process.

When the predicted residual data generating process is started, in Step S141, the weighting coefficient multiplication unit 164 of the prediction unit 142 multiplies the restored residual data ($r'_Y(x, y)$) of the luminance component by the weighting coefficient α set by the process of Step S124 illustrated in FIG. 6 ($\alpha \times r'_Y(x, y)$).

In Step S142, the right shift unit 165 shifts a multiplication result ($\alpha \times r'_Y(x, y)$) calculated in Step S141 to the right side by three bits (($\alpha \times r'_Y(x, y)$)>>3).

In Step S143, the calculation unit 166 generates predicted residual data ($\Delta r_{Cr}(x, y)$) by subtracting the right-shift result (($\alpha \times r'_Y(x, y)$)>>3) calculated in Step S142 from the residual data ($r_{Cr}(x, y)$) of the luminance component Cr ($r_{Cr}(x, y) - (\alpha \times r'_Y(x, y))>>3$). In addition, the calculation unit 167 generates predicted residual data ($\Delta r_{Cb}(x, y)$) by subtracting the right shift result (($\alpha \times r'_Y(x, y)$)>>3) calculated in Step S142 from the residual data ($r_{Cb}(x, y)$) of the luminance component Cb ($r_{Cb}(x, y) - (\alpha \times r'_Y(x, y))>>3$).

When the predicted residual data ($\Delta r_{Cr}(x, y)$ and $\Delta r_{Cb}(x, y)$) is generated as above, the predicted residual data generating process ends, and the process is returned to the process illustrated in FIG. 6.

<Flow of Predicted Residual Data Generating Process>

Figure 8:
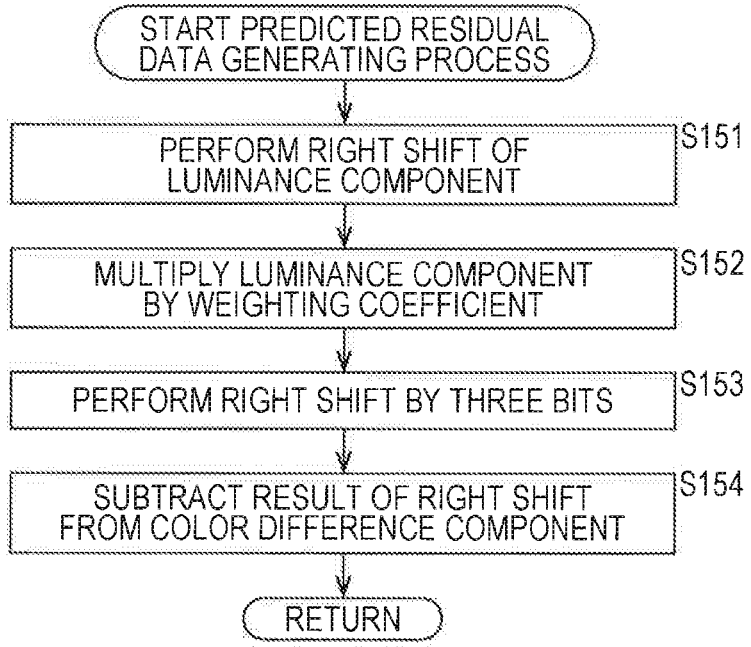
FIG. 8 is a flowchart that illustrates an example of the flow of a predicted residual data generating process.

Next, an example of the flow of the predicted residual data generating process performed in Step S123 of the residual predicting process will be described with reference to a flowchart illustrated in FIG. 8.

When the predicted residual data generating process is started, in Step S151, the right shift unit 162 of the prediction unit 142 shifts the restored residual data ($r'_Y(x, y)$) of the luminance component to the right side in correspondence with the bit depth difference (delta_bitdepth) of the residual data calculated by the process of Step S121 illustrated in FIG. 6 (($r'_Y(x, y)$>>delta_bitdepth)).

In Step S152, the weighting coefficient multiplication unit 164 multiplies a result ($r'_Y(x, y)$>>delta_bitdepth) of the right shift calculated in Step S151 by the weighting coefficient α set by the process of Step S128 illustrated in FIG. 6 ($\alpha \times (r'_Y(x, y)$>>delta_bitdepth)).

In Step S153, the right shift unit 165 shifts a multiplication result ($\alpha \times (r'_Y(x, y) \gg \text{delta\_bitdepth})$) calculated in Step S152 to the right side by three bits ($\alpha \times (r'_Y(x, y) \gg \text{delta\_bitdepth}) \gg 3$).

In Step S154, the calculation unit 166 generates predicted residual data ($\Delta r_{Cr}(x, y)$) by subtracting the result ($\alpha \times (r'_Y(x, y) \gg \text{delta\_bitdepth}) \gg 3$) of the right shift calculated in Step S153 from the residual data ($r_{Cr}(x, y)$) of the luminance component Cr ($r_{Cr}(x, y) - \alpha \times (r'(x, y) \gg \text{delta\_bitdepth}) \gg 3$). In addition, the calculation unit 167 generates predicted residual data ($\Delta r_{Cb}(x, y)$) by subtracting the result ($\alpha \times (r'_Y(x, y) \gg \text{delta\_bitdepth}) \gg 3$) of the right shift calculated in Step S153 from the residual data ($r_{Cb}(x, y)$) of the luminance component Cb ($r_{Cb}(x, y) - \alpha \times (r'_Y(x, y) \gg \text{delta\_bitdepth}) \gg 3$).

When the predicted residual data ($r_{Cr}(x, y) - \alpha \times (x, y)$) is generated as above, the predicted residual data generating process ends, and the process is returned to the process illustrated in FIG. 6.

<Flow of Predicted Residual Data Generating Process>

Figure 9:
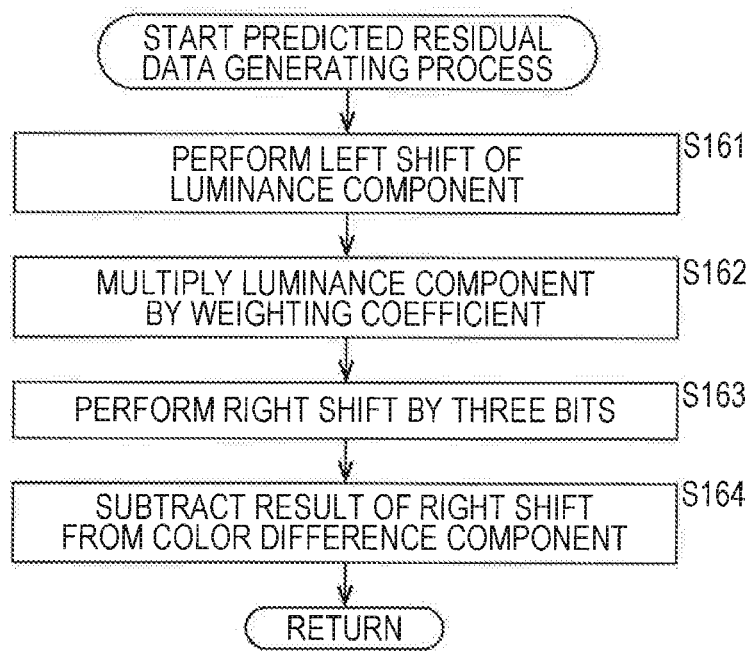
FIG. 9 is a flowchart that illustrates an example of the flow of a predicted residual data generating process.

Next, an example of the flow of the predicted residual data generating process performed in Step S132 of the residual predicting process will be described with reference to a flowchart illustrated in FIG. 9.

When the predicted residual data generating process is started, in Step S161, the left shift unit 163 of the prediction unit 142 shifts the restored residual data ($r'_Y(x, y)$) of the luminance component to the left side in correspondence with the bit depth difference ($-\text{delta\_bitdepth}$) of the residual data calculated by the process of Step S121 illustrated in FIG. 6 ($r'_Y(x, y) \ll -\text{delta\_bitdepth}$).

In Step S162, the weighting coefficient multiplication unit 164 multiplies a result ($r'_Y(x, y) \ll -\text{delta\_bitdepth}$) of the left shift calculated in Step S161 by the weighting coefficient $\alpha$ set by the process of Step S131 illustrated in FIG. 6 ($\alpha \times (r'_Y(x, y) \ll -\text{delta\_bitdepth})$).

In Step S163, the right shift unit 165 shifts the multiplication result ($\alpha \times (r'_Y(x, y) \ll -\text{delta\_bitdepth})$) calculated in Step S162 to the right, side by three bits $\alpha \times (r'_Y(x, y) \ll -\text{delta\_bitdepth}) \gg 3$).

In Step S164, the calculation unit 166 generates predicted residual data ($\Delta r_{Cr}(x, y)$) by subtracting the result ($\alpha \times (r'_Y(x, y) \ll -\text{delta\_bitdepth}) \gg 3$) of the right shift calculated in Step S153 from the residual data ($r_{Cr}(x, y)$) of the luminance component Cr ($r_{Cr}(x, y) - \alpha \times (r'_Y(x, y) \ll -\text{delta\_bitdepth}) \gg 3$). In addition, the calculation unit 167 generates predicted residual data ($\Delta r_{Cb}(x, y)$) by subtracting the result ($\alpha \times (r'_Y(x, y) \ll -\text{delta\_bitdepth}) \gg 3$) of the right shift calculated in Step S163 from the residual data ($r_{Cb}(x, y)$) of the luminance component Cb ($r_{Cb}(x, y) - \alpha \times (r'_Y(x, y) \ll -\text{delta\_bitdepth}) \gg 3$).

When the predicted residual data ($\Delta r_{Cr}(x, y)$ and $\Delta r_{Cb}(x, y)$) is generated as above, the predicted residual data generating process ends, and the process is returned to the process illustrated in FIG. 6.

By performing each process as above, the residual predicting unit 122 can correctly calculate the predicted residual data also in a case where the bit depths of the residual data are different from each other among components. Accordingly, the image coding apparatus 100 can suppress a decrease in the coding efficiency.

<Residual Restoration>

Next, the decoding of the coded data (bit stream) coded as above will be described. In order to realize residual restoration corresponding to the residual prediction (in other-words, restore the residual data of the color difference component), as is apparent from Equation (3) to Equation (8), in the residual restoration, the restored residual data of the luminance component used for the residual prediction may be added to the predicted residual data of the color difference component generated by the residual prediction.

In other words, as in the examples represented, in Equation (6) and Equation (8), in a case where the bit depths are arranged, to be uniform among component at the time of performing a residual prediction, also in residual restoration corresponding to the residual prediction, the residual data of the color difference components may be restored with the bit depths being arranged to be uniform among the components. By configuring as such, also in a case where the bit depths of the residual data are different from each other among the components, restoration can be performed with the bit depths of the residual data of the components being arranged to be uniform, and accordingly, the residual restoration can be correctly performed. Accordingly, a decrease in the coding efficiency can be suppressed.

While a method for arranging the bit depths of the residual data to be uniform among the components is arbitrary, the arrangement, may be performed in a manner similar to that sit the time of preforming the residual prediction. For example, the bit depths of the residual data may be arranged to be uniform among the components by performing a bit shift of the residual data. By configuring as such, the bit depths of the residual data can be easily arranged to be uniform among the components. In other words, the processing load and the processing time can be decreased.

Naturally, also in case of the residual restoration, similarly to the case of the residual decoding, the color space of an image in which the bit depths of the residual data are arranged to be uniform is arbitrary. For example, the color space may be a YUV space (YUV444 or the like) or an RGB space (RGB444 or the like). For example, in a case where the color space of the image is the YUV space, the restoration may be performed with the bit depths of residual data being arranged to be uniform between a luminance component and a color difference component through a bit shift. More specifically, for example, the restoration may be performed after the bit depth of the luminance component is arranged to be uniform with respect to the bit depth of the color difference component-through a bit shift. In addition, for example, in a case where the color space of the image is the RGB space, the restoration may be performed with the bit depths of the residual data being arranged, to be uniform between a G component and an R component or a B component through a bit shift, More specifically, for example, the restoration may be performed after the bit depth of the G component is arranged to be uniform with respect to the bit depth of the R component or the B component through a bit shift.

<Calculation of Residual Restoration>

A specific example of the calculation of the residual restoration as above will be described. For example, as in Equation (3), in a case where the scaling of the bit depths is not performed in the residual prediction, also in the residual restoration, as in the following Equation (9), the scaling of the bit depths may not be performed. Similarly, in the residual prediction, for example, in a case where the scaling of the bit depths is performed as in Equation (4) to Equation (6), also in the residual restoration, as in the following Equation (10) to Equation (14), the scaling of bit depths may be performed.

[Mathematical Formula 5]

$$r'_c(x,y) = \Delta r'_c(x,y) + (\alpha \times r_L(x,y)) \gg 3 \qquad (9)$$

$$\Delta\text{bitdepth}=\text{BitDepth}_Y-\text{BitDepth}_C \quad (10)$$

$$\text{if } (\Delta\text{bitdepth}\geq 0) \quad (11)$$

$$r'_c(x,y)=\Delta r'_c(x,y)+(\alpha\times(r_L(x,y)>>\Delta\text{bitdepth}))>>3 \quad (12)$$

else (13)

$$r'_c(x,y)\Delta r'_c(x,y)+(\alpha\times(r_L(x,y)<<-\Delta\text{bitdepth}))>>3 \quad (14)$$

A shift calculation method for arranging the bit depths to be uniform as above is arbitrary. The bit depths of the residual data may be arranged to be uniform by transmitting information relating to the bit depth of the residual data of each component from the coding side, acquiring a difference between the bit depths of two components for which a prediction is performed based, on the information relating to the bit depth of the residual data of each component transmitted from, the coding side, and performing a bit shift based on the acquired, difference between the bit depths. Then, in a case where the bit depth difference between the two components is not zero, the restoration may be performed, with the bit depths of the residual data being arranged to be uniform between the components through a bit shift. For example, as in Equation (10) described above, it may be configured such that a difference (bit depth difference) of the bit depths of the residual data between the components is acquired, and, as represented in Equation (11) to Equation (14), a bit shift is performed in correspondence with the bit depth difference. At that time, the bit shift, as in Equation (12) and Equation 14), may be performed in correspondence with the absolute value of the bit depth difference. In such a case, for example, the shift direction may be determined as represented in Equation (12) and Equation (14) based on whether or not the conditions of Equation (11) and Equation (13) are satisfied.

In other words, in such a case, the restoration is performed with the bit depth (BitDepthY) of the residual data ($r_L$(x, y)) of the luminance component (Y) being arranged to be uniform with respect to the bit depth (BitDepthC) of the residual data ($r_c$(x, y)) of the color difference component (Cb or Cr). More specifically, a bit depth difference between two component for which the restoration is performed is acquired, a bit shift corresponding to the bit depth difference is performed for the restored residual data of one component out of the two components, the bit-shifted residual data is multiplied by a predetermined weighting coefficient α bit shift corresponding to a predetermined number of bits is performed for the multiplication result, and the bit-shifted multiplication result and the predicted residual data are added together, whereby the residual data of the other component is restored. The restoration may be performed as above.

In a case where Δbitdepth is zero, the bit shift amount of the residual data ($r_L$(x, y)) of the luminance component (Y) is zero, and accordingly, the residual data ($r'_c$(x, y)) can be regarded as being calculated as represented in Equation (9).

By calculating as described above, also in a case where the bit depths of the residual data are different between components, the residual data ($r'_c$(x, y)) can be correctly restored. Accordingly, a decrease in the coding efficiency can be suppressed.

<Image Decoding Apparatus>

Figure 10:
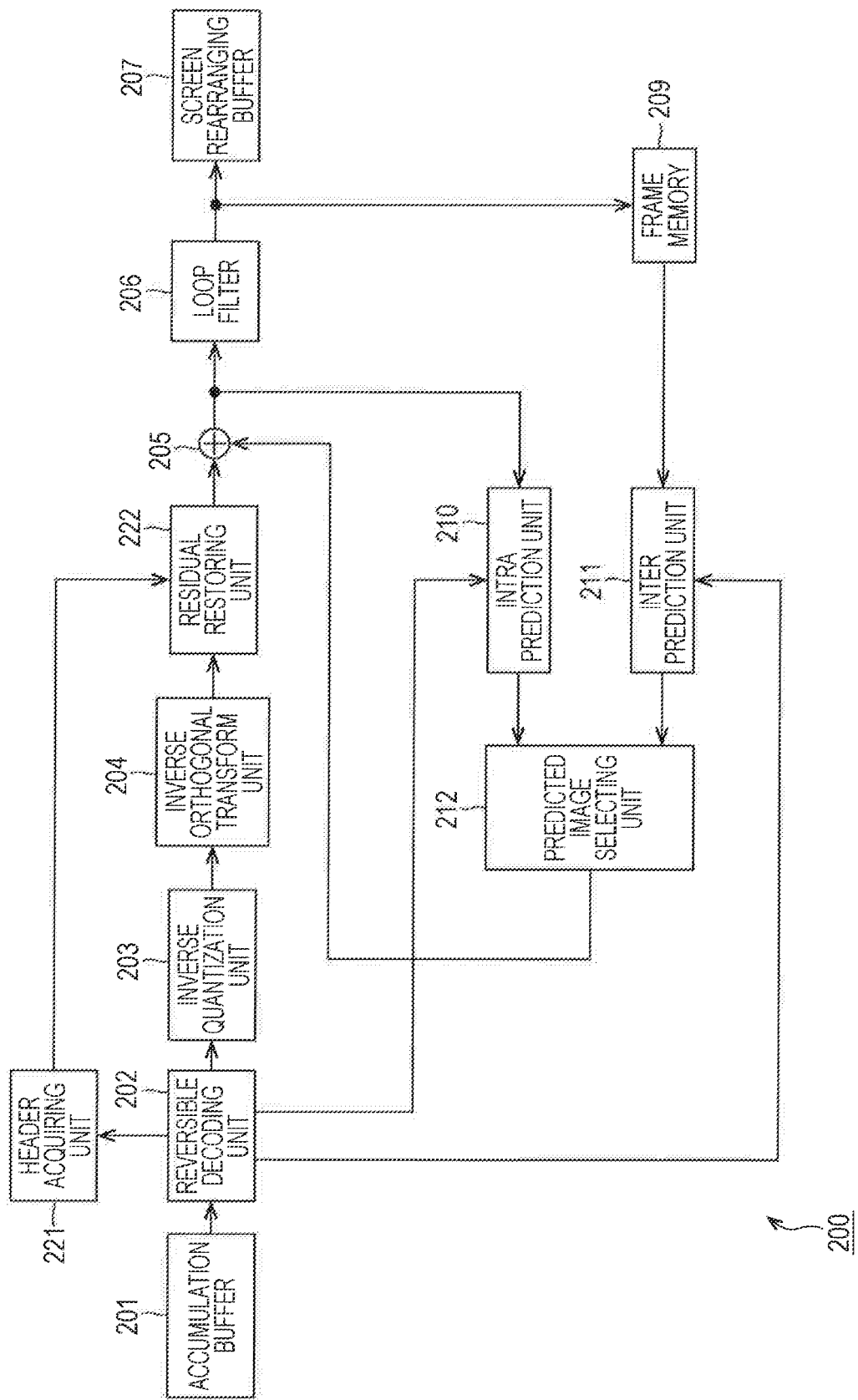
FIG. 10 is a block diagram, that illustrates an example of the main configuration of an image decoding apparatus.

FIG. 10 is a block diagram that illustrates an example of the main configuration of an image decoding apparatus corresponding to the image coding apparatus 100 illustrated in FIG. 3 that is one aspect of the image processing apparatus according to the present technology.

The image decoding apparatus 200 illustrated in FIG. 10 decodes the coded data generated by the image coding apparatus 100 using a decoding method corresponding to the coding method.

As illustrated in FIG. 10, the image decoding apparatus 200 includes: an accumulation buffer 201; a reversible decoding unit 202; an inverse quantization unit 203; an inverse orthogonal transform unit 204; a calculation unit 205; a loop filter 206; and a screen rearranging buffer 207. In addition, the image decoding apparatus 200 includes: a frame memory 209; an intra prediction unit 210; an inter prediction unit 211; and a predicted image selecting unit 212. Furthermore, the image decoding apparatus 200 includes: a header acquiring unit 221; and a residual restoring unit 222.

The accumulation buffer 201 also serves as a reception unit that receives a coded data transmitted from the coding side (for example, the image coding apparatus 100), The accumulation buffer 201 receives and accumulates the transmitted coded data and supplies the coded data to the reversible decoding unit 202 at predetermined timing. Here, information required for a decoding process such as prediction mode information and the like is added to the coded data. The reversible decoding unit 202 decodes the information, which is supplied from the accumulation buffer 201, coded by the reversible coding unit 106 using a decoding system corresponding to the coding system. The reversible decoding unit 202 supplies quantized coefficient data that is acquired by the decoding process to the inverse quantization unit 203.

In addition, the reversible decoding unit 202 determines whether the intra prediction mode or the inter prediction mode is selected as an optimal prediction mode and supplies information relating to the optimal prediction mode to the one mode of the intra prediction unit 210 and the inter prediction unit 211 that is determined to be selected. In other word's, for example, in a case where the intra prediction mode is selected as the optimal prediction mode in the image coding apparatus 100, information relating to the optimal prediction mode is supplied to the intra prediction unit 210, On the other hand, for example, in a case where the inter prediction mode is selected as the optimal prediction, mode in the image coding apparatus 100, information relating to the optimal prediction mode is supplied to the inter prediction unit 211.

In addition, the reversible decoding unit 202 supplies information required for inverse quantization such as a quantization matrix and quantization parameters to the inverse quantization unit 203.

Furthermore, the reversible decoding unit 202 supplies header information such as a sequence parameter set (SPS), a picture parameter set (PPS), or a slice header to the header acquiring unit 221.

The inverse quantization unit 203 performs inverse quantization of the quantized coefficient data acquired through the decoding process performed by the reversible decoding unit 202 using a system that corresponds to the quantization system of the quantization unit 105. Here, this inverse quantization unit 203 is a processing unit similar to the inverse quantization unit 108. In other words, the description of the inverse quantization unit 203 may be also applied to the inverse quantization unit 108. However, the input/output destinations of data and the like need to be rephrased appropriately in accordance with the apparatus.

The inverse quantization unit 203 supplies the acquired coefficient data to the inverse orthogonal transform unit 204.

The inverse orthogonal transform unit 204 performs an inverse orthogonal transform of orthogonal transform coefficients supplied from the inverse quantization unit 203 by using a method corresponding to the orthogonal transferal process performed by the orthogonal transform unit 104 as is necessary. Here, this inverse orthogonal transform unit 204 is a processing unit similar to the inverse orthogonal transform unit 109. In other words, the description of the inverse orthogonal transform unit 204 may be also applied to the inverse orthogonal transform unit 109. However, the input/output destinations of data and the like need to be rephrased appropriately in accordance with the apparatus.

The inverse orthogonal transform unit 204 acquires residual data and predicted residual data corresponding to a state before the orthogonal transform performed by the image coding apparatus 100 through the inverse orthogonal transform process. The residual data and the predicted residual data acquired through the inverse orthogonal transform are supplied to the residual restoring unit 222.

The calculation unit 205 acquires the residual data of each component, which is restored, from the residual restoring unit 222. In addition, the calculation unit 205 acquires a predicted image from the intra prediction unit 210 or the inter prediction unit 211 through the predicted image selecting unit 212, The calculation unit 205 acquires a reconstruction image corresponding to an image before the subtraction of the predicted image that is performed by the calculation unit 103 by adding a differential image and the predicted image together. The calculation unit 205 supplies the reconstruction image to the loop filter 206 and the Intra prediction unit 210.

The loop filter 206 generates a decoded image by appropriately performing a loop filter process including a de-blocking filter process, an adaptive loop filter, and the like for the supplied reconstruction image. For example, the loop filter 206 performs a de-blocking filter process for the reconstruction image, thereby removing a block distortion. In addition, for example, the loop filter 206 performs a loop filter process for a result (the reconstruction image from which the block distortion is removed) of the de-blocking filter process by using a Wiener filter, thereby improving the image quality.

Here, the type of the filter process performed by the loop filter 206 is arbitrary, and a filter process other than that described above may be performed. In addition, the loop filter 206 may be configured to perform the filter process using filter coefficients supplied from the image coding apparatus 100.

The loop filter 206 supplies a decoded image that is a result of the filter process to the screen rearranging buffer 207 and the frame memory 209.

The screen rearranging buffer 207 performs rearrangement of images. In other words, the order of frames arranged by the screen rearranging buffer 102 for the coding order is changed to the order of the original display. The screen rearranging buffer 207 outputs decoded image data in which the order of frames is rearranged to the outside of the image decoding apparatus 200.

The frame memory 209 stores the supplied decoded image and supplies the stored decoded image to the inter prediction unit 211 as a reference image at predetermined timing or based on a request from, the outside such as the inter prediction unit 211.

Information representing the intra prediction mode and the like acquired by decoding the header information and is appropriately supplied to the intra prediction unit 210 from the reversible decoding unit 202. The intra prediction unit. 210 performs an intra prediction by using the reference image acquired from the frame memory 209 in the intra prediction mode used by the intra prediction unit 113, thereby generating a predicted image. The intra prediction unit 210 supplies the generated, predicted image to the predicted image selecting unit 212.

The inter prediction unit 211 acquires information (the optimal prediction mode information, the reference image information, and the like) acquired by decoding the header information from the reversible decoding unit 202.

The inter prediction unit 211 performs an inter prediction by using the reference image acquired from the frame memory 209 in the inter prediction mode represented by the optimal prediction mode information acquired from the reversible decoding unit 202, thereby generating a predicted image.

The predicted image selecting unit 212 supplies a predicted image supplied from the intra prediction unit 210 or a predicted image supplied from the inter prediction unit 211 to the calculation unit 205. Then, the calculation unit 205 adds the predicted image generated using a motion vector and the decoded residual data (differential image information) supplied from the residual restoring unit 222, whereby an original image is decoded.

The header acquiring unit 221, for example, acquires the header information transmitted from the coding side such as a video parameter set (VPS), a sequence parameter set (SPS), and a pit cute parameter set (PPS), an SEI, and a slice header through the reversible decoding unit 202. The header acquiring unit 221 supplies necessary information included in the acquired header information to the residual restoring unit 222. Details thereof will be described later.

The residual restoring unit 222 restores the residual data of the color difference component (also referred to as residual restoration) by using the residual data of the luminance component and the predicted residual data of the color difference component supplied from the inverse orthogonal transform unit 204. At that time, the residual restoring unit 222 performs restoration with the bit depths of the residual data being arranged to be uniform among the components. Here, this residual restoring unit 222 is a processing unit that, is similar to the residual restoring unit 123. In other words, the description of the residual restoring unit 222 may be applied also to the residual restoring unit 123. However, the input/output, destinations of data and the like need to be rephrased appropriately in accordance with the apparatus.

<Header Acquiring Unit and Residual Restoring Unit>

Figure 11:
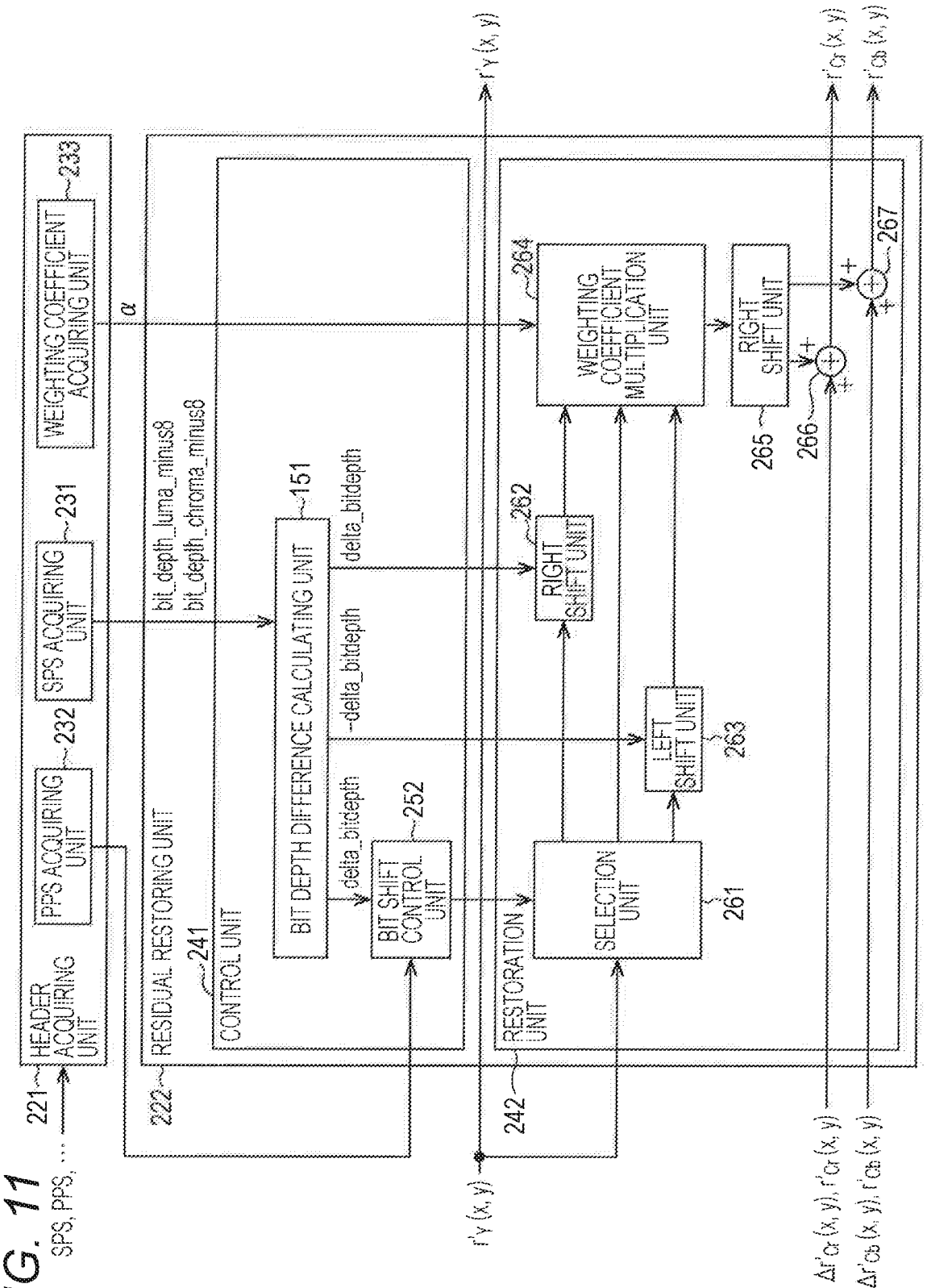
FIG. 11 is a block diagram that illustrates an example of the main configurations of a header acquiring unit and a residual restoring unit.

FIG. 11 is a block diagram that illustrates an example of the main configurations of the header acquiring unit 221 and the residual restoring unit 222 illustrated in FIG. 10, As illustrated in FIG. 11, the header acquiring unit. 221 includes: an SPS acquiring unit 231; a PPS acquiring unit. 232; and a weighting coefficient acquiring unit 233.

The SPS acquiring unit 231 acquires information (for example, bit_depth_luma_minus8) representing the bit depth of the luminance component or information including the information representing the bit depth of the luminance component, which is included in the sequence parameter set (SPS) supplied from the coding side, and information (for example, bit_depth_chroma_minus8) representing the bit depth of the color difference component (Cb/Cr) or information including the information representing the bit depth of the color difference component and supplies the acquired information to the residual restoring unit 222 (a bit depth difference calculating unit 251 to be described later).

The PPS acquiring unit 232 supplies information (for example, luma_chroma_prediction_enabled_flag), which is included in the picture parameter set (PPS) supplied from the coding side, used for controlling whether or not a residual prediction is performed to the residual restoring unit 222 a bit shift, control unit 252 to be described later).

The weighting coefficient acquiring unit 233 supplies the weighting coefficient α or information including the weighting coefficient α supplied, from the coding side to the residual restoring unit 222 (a weighting coefficient multiplication unit 264 to be described later).

The residual restoring unit 222 supplies the restored residual data, ($r'_Y(x, y)$) of the luminance component supplied from the inverse orthogonal transform unit 204 to the calculation unit 205. The residual restoring unit. 222 includes a control unit 241 and a restoration unit 242. The control unit 241 performs a process relating to the control of calculation relating to the residual restoration. The restoration unit 242 performs calculation relating to the residual restoration under the control of the control unit 241. For example, the restoration unit 242, by using the restored residual data ($r'_Y(x, y)$) of the luminance component acquired from the inverse orthogonal transform unit 204, restores the residual data ($r'_{Cr}(x, y)$ and $r'_{Cb}(x, y)$) of the color difference component from the restored predicted residual data ($\Delta r'_{Cr}(x, y)$ and $\Delta r'_{Cb}(x, y)$) of the color difference component, which is acquired, from the inverse orthogonal transform unit 204, under the control of the control unit 241. The restoration unit 242 supplies the restored residual data ($r'_{Cr}(x, y)$ and $r'_{Cb}(x, y)$) of the color difference component to the calculation unit 205. In addition, the residual restoring unit 222 supplies the restored residual data ($r'_{Cr}(x, y)$ and $r'_{Cb}(x, y)$) of the color difference component acquired from, the inverse orthogonal transform unit 204 to the calculation unit 205 without performing residual restoration under the control of the control unit 241.

The control unit 241 includes: a bit depth, difference calculating unit 251; and a bit shift control unit 252.

The bit depth difference calculating unit 251 calculates a bit depth difference between the residual data of components used for a residual prediction. For example, the bit depth difference calculating unit 251 acquires information (for example, bit_depth_luma_minus8) representing the bit depth of the luminance component or information including the information representing the bit depth of the luminance component and information (for example, bit_depth_chroma_minus8) representing the bit depth of the color difference component (Cb/Cr) or information including the information representing the bit depth of the color difference component from the SPS acquiring unit 231 and performs calculation represented in Equation (4) by using such information, thereby calculating a bit depth difference (delta_bitdepth) between the components. The bit depth difference calculating unit 251 supplies the calculated bit depth difference (delta_bitdepth) to the bit shift control unit 252.

In addition, the bit depth difference calculating unit 251 supplies the calculated bit depth difference (delta_bitdepth) to the restoration unit 242 under the control of the bit shift control unit 252. For example, in a case where a right shift of the residual data is performed at the time of scaling the bit depths, the bit depth difference calculating unit 251 supplies a calculated bit depth difference (delta_bitdepth) to the right shift unit 262. On the other hand, in a case where a left shift of the residual data is performed at the time of scaling the bit depths, the bit depth difference calculating unit 251 supplies a calculated bit depth difference (−delta_bitdepth) to the left shift unit 263.

The bit shift control unit 252 controls the calculation performed by the restoration unit 242 based on the value of the bit depth difference (delta_bitdepth) between the components supplied from the bit depth difference calculating unit 251, For example, in a case where the bit depth difference (delta_bitdepth) is zero, the bit shift control unit 252 performs control of the restoration unit 242 (the selection unit 261 thereof) such that a bit shift (the scaling of the bitdepth) of the residual data is not performed. In addition, at that time, the bit shift control unit 252 also performs control of the bit depth difference calculating unit 251 such that the bit depth difference (delta_bitdepth) is not supplied to the restoration unit 242.

In addition, for example, in a case where the bit depth difference (delta_bitdepth) has a positive value (>0), the bit shift control unit 252 performs control of the restoration unit 242 (the selection unit 261 thereof) such that the residual data is shifted to the right side (the scaling of the bit depth is performed). In addition, at that time, the bit shift control unit 252 also performs control of the bit depth difference calculating unit 251 such that the bit depth difference (delta_bitdepth) is supplied, to the restoration unit 242 (the right, shift unit 262).

On the other hand, for example, in a case where the bit depth difference (delta_bitdepth) has a negative value (<0), the bit shift control unit 252 performs control of the restoration unit 242 (the selection unit 261 thereof) such that the residual data is shifted to the left side (the scaling of the bit depth is performed). In addition, at that time, the bit shift control unit 252 also performs control of the bit depth difference calculating unit 251 such that the bit depth difference (−delta_bitdepth) is supplied to the restoration unit 242 (the left shift unit 263).

In addition, the bit shift control unit 252, for example, acquires information (for example, luma_chroma_prediction_enabled_flag), which is supplied from the coding side, used for controlling whether or not a residual prediction is performed from the FPS acquiring unit 232 and controls whether or not residual restoration is performed based on the value thereof. For example, in a case where it is represented that a residual prediction is not performed based on the information used for controlling whether or not a residual prediction is performed (in other words, it is also represented, that, residual restoration is not performed), the bit shift control unit 252 performs control of the restoration unit 242 such that calculation relating to the restoration is not performed. In addition, in such a case, the bit shift control unit 252 performs control of the bit depth difference calculating unit 251 such that the supply of the bit depth difference (delta_bitdepth or −delta_bitdepth) is stopped. Furthermore, the bit shift control unit 252, in such a case, performs control of the weighting coefficient acquiring unit 233 such that the weighting coefficient α is not acquired.

On the other hand, for example, in a case where it is represented that a residual prediction (in other words, also residual restoration) is performed based on the information used for controlling whether or not a residual prediction is performed, the bit shift control unit 252 performs control of the restoration unit 242 such that calculation relating to the restoration is performed. In addition, in such a case, the bit shift control unit 252 performs control of the bit depth difference calculating unit 251 such that, the bit depth difference (delta_bitdepth or −delta_bitdepth) is supplied to the restoration unit 242, Furthermore, in such a case, the bit shift control unit 252 performs control of the weighting coefficient acquiring unit 233 to acquire the weighting coefficient α and supplies the weighting coefficient to the restoration unit 242 (weighting coefficient multiplication unit 264).

The restoration unit 242 performs calculation that is basically the same as the calculation performed by the prediction unit 142 and thus, has a configuration that is basically the same as that of the prediction unit 142. In other words, the restoration unit 242 includes: a selection unit 261; a right shift unit. 262; a left shift unit 263; a weighting coefficient multiplication unit 264; a right shift unit 265; a calculation unit 266; and a calculation unit 267.

The selection unit 261, similarly to the selection unit 161, selects a supply destination of the residual data ($r'_Y(x, y)$) of the luminance component, which has been restored, supplied from the inverse orthogonal transform unit 204 under the control of the bit shift, control unit 252. For example, in case of performing scaling (right shift) of the bit depth, the selection unit 261 supplies the residual data ($r'_Y(X, Y)$) of the luminance component, which has been restored, to the right shift, unit 262. In this case, calculation corresponding to Equation (6) is performed. In addition, in case of performing scaling (left shift) of the bit depth, the selection unit 261 supplies the residual data ($r'_Y(x, y)$) of the luminance component, which has been restored, to the left shift unit 263. In this case, calculation corresponding to Equation (8) is performed. On the other hand, for example, in a case where the scaling of the bit depth is not performed, the selection unit 261 supplies the residual data ($r'_Y(x, y)$) of the luminance component, which has been restored, to the weighting coefficient multiplication unit 264. In this case, calculation corresponding to Equation (3) is performed.

The right shift unit 262 performs scaling of the bit depth by shifting the residual data ($r'_Y(x, y)$) of the luminance component, which has been restored, acquired from the selection unit 261 to the right side in correspondence with a bit depth difference (delta_bitdepth) acquired, from the bit depth, difference calculating unit 251. The right shift unit 262 supplies a result ($r'_Y(x, y)$>>delta_bitdepth) of the right shift of the residual data of the luminance component to the weighting coefficient multiplication unit 264.

The left shift unit 263 performs scaling of the bit depth by shifting the residual, data ($r'_Y(x, y)$) of the luminance component, which has been restored, acquired from the selection unit 261 to the left side in correspondence with a bit depth difference (−delta_bitdepth) acquired from the bit depth difference calculating unit 251. The left shift unit 263 supplies a result ($r'_Y(x, y)$<<−delta, bitdepth) of the left shift of the residual data of the luminance component to the weighting coefficient multiplication unit 264.

The weighting coefficient multiplication unit 264 acquires the residual data of the luminance component that has been restored from, one of the selection unit 261 to the left shift unit 263, For example, the weighting coefficient multiplication unit 264 acquires the restored residual, data ($r'_Y(x, y)$) of the luminance component that has not been bit-shifted from the selection unit 261. In addition, for example, the weighting coefficient multiplication unit 264 acquires the restored residual data ($r'_Y(x, y)$>>delta_bitdepth) of the luminance component that has been shifted to the right side from the right shift unit 262. In addition, for example, the weighting coefficient multiplication unit 264 acquires the restored, residual data ($r'_Y(x, y)$<<−delta_bitdepth) of the luminance component that has been shifted to the left side from the left shift unit 263.

In addition, the weighting coefficient multiplication unit 264 acquires the weighting coefficient α through the weighting coefficient acquiring unit 233. The weighting coefficient multiplication unit. 264 multiplies the restored residual data of the luminance component that has been acquired by the weighting coefficient α and supplies a result, ($α×(r'_Y(x, y))$, $α×(r'_Y(x, y)$>>delta_bitdepth) or $α×(r'_Y(x, y)$<<−delta_bitdepth)) of the multiplication to the right shift unit 265.

The right shift unit 265 shifts the restored residual data ($α×(r'_Y(x, y))$), $α×(r'_Y(x, y)$>>delta_bitdepth) or $α×(r'_Y(x, y)$<<−delta_bitdepth)) of the luminance component, which has been supplied from, the weighting coefficient multiplication unit 264, to the right side by predetermined bits. While the bit shift amount is arbitrary as long as it is the same as that of the coding side, for example, in case of Equation (3), Equation (6), and Equation (8), the right shift unit 265 shifts the residual data to the right side by three bits. The right shift unit 265 supplies a result ($α×(r'_Y(x, y))$>>3, $α×(r'_Y(x, y)$>>delta_bitdepth)>>3, or $α×(r'_Y(x, y)$<<−delta_bitdepth)>>3) of the right shift to the calculation unit 266 or the calculation unit 267.

The calculation unit. 266 restores the residual data of the color difference component (Cr) ($r'_{Cr}(x, y)$) by adding the restored residual data ($α×(r'_Y(x, y))$>>3, $α×(r'_Y(x, y)$>>delta_bitdepth)>>3, or $α×(r'_Y(x, y)$<<−delta_bitdepth)>>3) of the luminance component, which is supplied from the right shift unit 265, to the restored predicted residual data ($Δr'_{Cr}(x, y)$) of the color difference component (Cr) supplied from, the inverse orthogonal transform unit 204 and supplies the restored residual data to the calculation unit 205. On the other hand, in a case where such residual restoration is not performed, the calculation unit 266 supplies the restored residual data ($r'_{Cr}(x, y)$) of the color difference component (Cr) supplied from the inverse orthogonal transform unit 204 to the calculation unit 205.

The calculation unit 267 restores the residual data of the color difference component (Cb) ($r'_{Cb}(x, y)$) by adding the restored residual data ($α×(r'_Y(x, y))$>>3, $α×(r'_Y(x, y)$>>delta_bitdepth)>>3, or $α×(r'_Y(x, y)$<<−delta_bitdepth)>>3) of the luminance component, which is supplied from the right shift unit 265, to the restored predicted residual data ($Δr'_{Cb}(x, y)$) of the color difference component (Cb) supplied from the inverse orthogonal transform unit 204 and supplies the restored residual data to the calculation unit 205, On the other hand, in a case where such residual restoration is not performed, the calculation unit 267 supplies the restored residual data ($r'_{Cb}(x, y)$) of the color difference component (Cb) supplied from the inverse orthogonal transform unit. 204 to the calculation unit 205.

As described above, in residual restoration, the residual restoring unit 222 performs the restoration by performing scaling of the bit depths of the restored residual data of the luminance components. Accordingly, also in a case where the bit depths of the residual data are different between the components, the residual restoring unit 222 can correctly restore the residual data. Therefore, according to the image decoding apparatus 200, a decrease in the coding efficiency can be suppressed.

<Flow of Decoding Process>

Next, an example of the flow of each process executed by the image decoding apparatus 200 will be described. First, an example of the flow of a decoding process will be described with reference to a flowchart represented in FIG. 12.

When the decoding process is started, in Step S201, the accumulation buffer 201 stores a transmitted bit stream that has been received. In Step S202, the reversible decoding unit 202 decodes a bit stream supplied from the accumulation buffer 201. In other words, an I picture, a P picture, and a B picture coded by the reversible coding unit 106 are decoded. At this time, various kinds of information other than image information included in the bit stream such as header information are decoded, as well.

In Step S203, the inverse quantization unit 203 performs inverse quantization of the quantized coefficients acquired by the process of Step S202.

In Step S204, the inverse orthogonal transform, unit 204 performs an inverse orthogonal transform of the orthogonal transform coefficients acquired by the process of Step S203. According to this process, the residual data of the luminance component and the predicted residual data of the color difference component are restored.

In Step S205, the residual restoring unit 222 performs a residual restoring process for restoring the residual data of the color difference component by using the restored residual data of the luminance component, and the restored predicted residual data of the color difference component. Details of this process will be described later.

In Step S206, the intra prediction unit 210 or the inter prediction unit 211 performs a prediction process, thereby generating a predicted image. In other words, a prediction process is performed in a prediction mode applied at the time of the coding process that is determined by the reversible decoding unit 202. More specifically, for example, in a case where an intra prediction is applied at the time of the coding process, the intra prediction unit 210 generates a predicted image in the intra prediction mode that is regarded to be optimal at the time of the coding process. On the other hand, for example, in a case where an inter prediction is applied at the time of the coding process, the inter prediction unit 211 generates a predicted image in the inter prediction mode that is regarded to be optimal at the time of the coding process.

In Step S207, the calculation unit 205 adds the predicted image generated in Step S206 to the residual, data restored by the process of Step S204 and Step S205. Accordingly, a reconstruction image is acquired.

In Step S208, the loop filter 206 appropriately performs a loop filter process including a de-blocking filter process, an adaptive loop filter process, or the like for the reconstruction image acquired by the process of Step S207.

In Step S209, the screen rearranging buffer 207 rearranges frames of decoded images acquired by the process of Step S208. In other words, the order of frames rearranged at the time of the coding process is changed to the order of the original display. The decoded images in which the frames are rearranged are output to the outside of the image decoding apparatus 200.

In Step S210, the frame memory 203 stores the decoded images acquired by the process of Step S208.

When the process of Step S210 ends, the decoding process ends.

<Flow of Residual Restoring Process>

Next, an example of the flow of the residual restoring process performed in Step S205 of such a decoding process will be described with reference to FIG. 13.

When the residual restoring process is started, in Step S221, the bit depth difference calculating unit 251 acquires information (for example, bit_depth_luma_minus8) representing the bit depth of the luminance component and information (for example, bit_depth_chroma_minus8) representing the bit depth of the color difference component (Cb/Cr), which are included in the sequence parameter set transmitted from the coding side, through the SPS acquiring unit 231 and calculates a bit depth difference between components for which a residual prediction is performed by using such information. In other words, the bit depth difference calculating unit 151 performs calculation of Equation (10) and calculates a bit depth difference (delta_bitdepth) between the luminance component (Y) and the color difference component (Cr or Cb). In a case where the bit depth differences are different between the color difference component (Cr) and the color difference component (Cb), the bit depth differences (delta_bitdepth) are calculated.

In Step S222, the bit shift control unit 252 determines whether or not the bit depth difference (delta_bitdepth) calculated in Step S221 is zero. In a case where the bit depth difference is determined to be zero, the process proceeds to Step S223. In such a case, a bit shift is not performed, and the residual restoration is performed as represented in Equation (9).

In Step S223, the bit shift control unit. 252 determines whether or not the residual prediction has been performed on the coding side based on information (for example, luma_chroma_prediction_enabled_flag), which is included in the picture, parameter set (PPS), used for controlling whether or not the residual prediction is performed. For example, in a case where it is determined that the value of luma_chroma_prediction_enabled_flag is "1", and the residual prediction has been performed, the process proceeds to Step S224.

In Step S224, the weighting coefficient acquiring unit 233 acquires a weighting coefficient α for each TU.

In Step S225, the restoration unit 242 performs restoration (residual restoration) of the residual data of the color difference component, without performing scaling of the bit depths. Details of this process will be described later.

Figure 12:
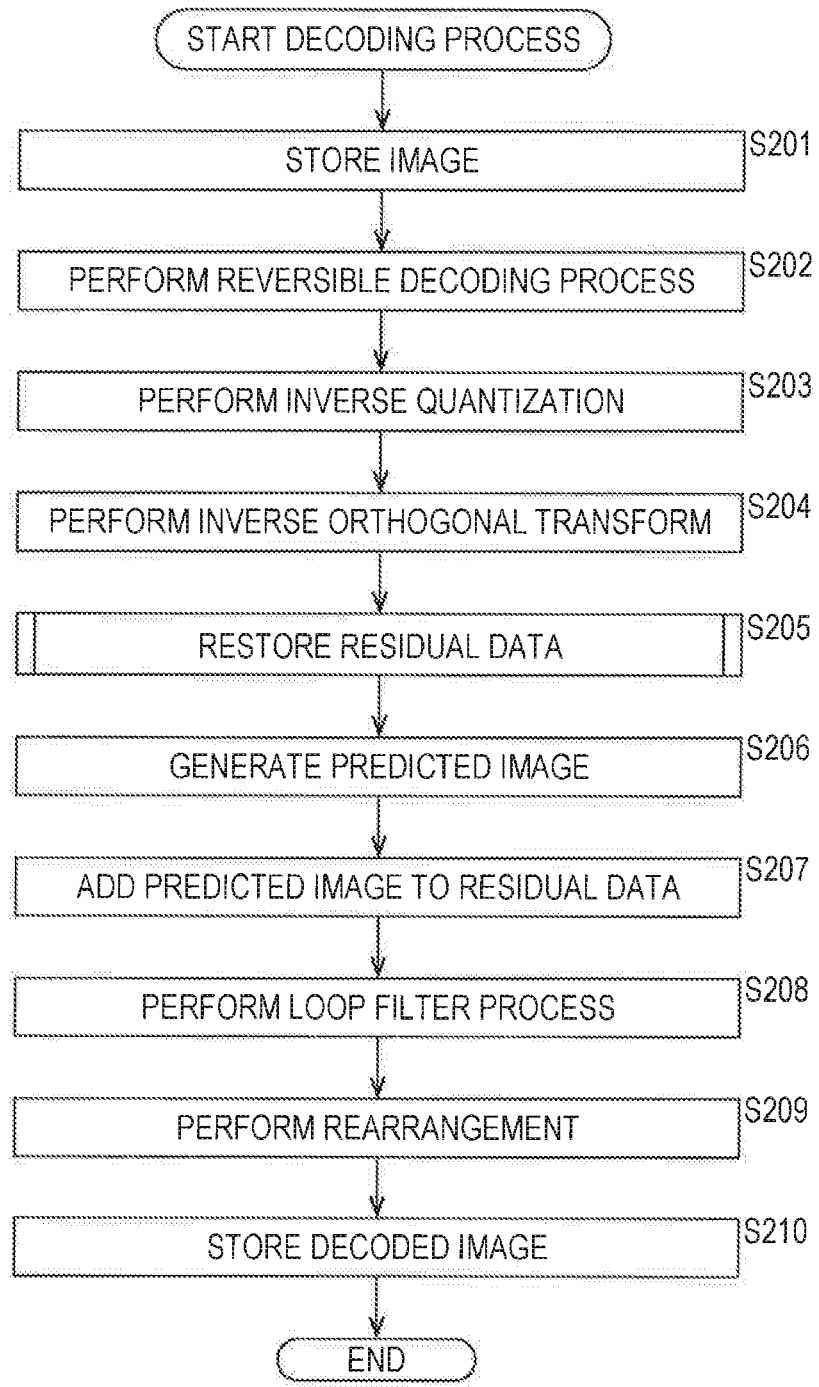
FIG. 12 is a flowchart that illustrates an example of the flow of a decoding process.

In Step S225, when the residual restoration ends, the residual restoring process ends, and the process is returned to the process illustrated in FIG. 12.

On the other hand, for example, in Step S223, in a case where it is determined that the value of luma_chroma_prediction_enabled_flag is "0", and the residual prediction has not been performed, the process of Step S224 and Step S225 is omitted, the residual restoring process ends, and the process is returned to the process illustrated in FIG. 12.

In addition, in Step S222, in a case where the bit depth difference (delta_bitdepth) is determined not to be zero, the process proceeds to Step S226.

In Step S226, the bit shift control unit 252 determines whether or not the bit depth difference (delta_bitdepth) calculated in Step S221 is positive. In a case where being positive is determined, the process proceeds to Step S227. In such a case, a residual restoration is performed as represented, in Equation (12) (scaling through a right shift is performed).

In Step S227, the bit shift control unit 252 determines whether or not a residual restoration is performed based on information (for example, luma_chroma_prediction_enabled_flag) used for controlling whether or not the residual restoration is performed, which is included in the picture parameter set (PPS) or the like. For example, in a case where the value of luma_chroma_prediction_enabled_flag is "1", and the residual restoration, is determined to have been performed, the process proceeds to Step S228.

In Step S228, the weighting coefficient acquiring unit 233 sets a weighting coefficient α for each TU.

In Step S229, the restoration unit 242 performs restoration (residual restoration) of the residual data of the color difference component by performing scaling of the bit depths by using a right shift, Details of this process will be described later.

When the residual restoration performed in Step S229 ends, the residual restoring process ends, and the process is returned to the process illustrated in FIG. 12.

On the other hand, for example, in Step S227, in a case where it is determined that the value of luma_chroma_prediction_enabled_flag is "0", and the residual restoration has not been performed on the coding side, the process of Step S228 and Step S229 is omitted, the residual restoring process ends, and the process is returned, to the process illustrated in FIG. 12.

In addition, in Step S226, in a case where the bit depth difference (delta_bitdepth) is determined not to be positive (determined to be negative), the process proceeds to Step S230. In such a case, the residual prediction is performed as represented in Equation (14) (scaling using a left, shift is performed).

In Step S230, the bit shift control unit 252 determines whether or not a residual prediction has been performed on the coding side based on information (for example, luma_chroma_prediction_enabled_flag) used for controlling whether or not the residual prediction is performed, which is included in the picture parameter set (PPS) or the like. For example, in a case where it is determined that the value of luma_chroma_prediction_enabled_flag is "1", and the residual prediction has been performed, the process proceeds to Step S231.

In Step S231, the weighting coefficient acquiring unit. 233 acquires a weighting coefficient α for each TU.

In Step S232, the restoration unit 242 performs restoration (residual restoration) of the residual data of the color difference signal by performing scaling of the bit depths using a left shift. Details of this process will be described later.

When the residual restoration performed in Step S232 ends, the residual restoring process ends, and the process is returned to the process illustrated in FIG. 12.

On the other hand, for example, in Step S230, in a case where it is determined that the value of luma_chroma_prediction_enabled_flag is "0", and the residual prediction has not been performed, on the coding side, the process of Step S231 and Step S232 is omitted, the residual restoring process ends, and the process is returned to the process illustrated, in FIG. 12.

<Flow of Residual Data Restoring Process>

Figure 14:
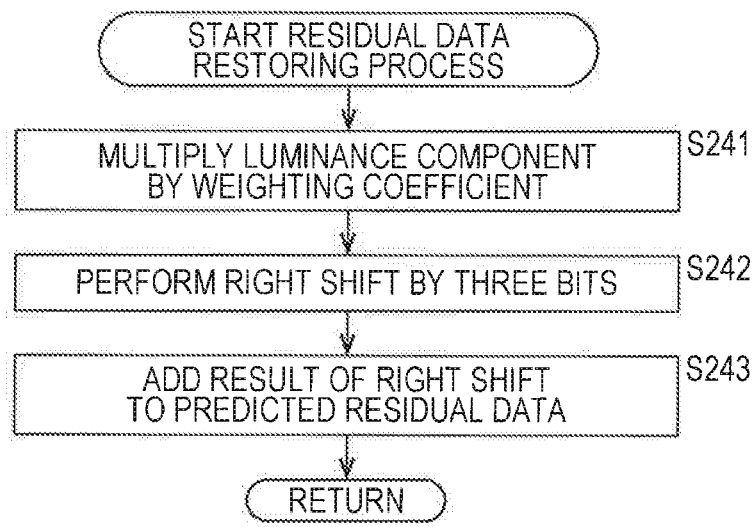
FIG. 14 is a flowchart that, illustrates an example of the flow of a residual data restoring process.

Next, an example of the flow of the residual data restoring process performed in Step S225 of the residual restoring process will be described with reference to a flowchart illustrated in FIG. 14.

Figure 13:
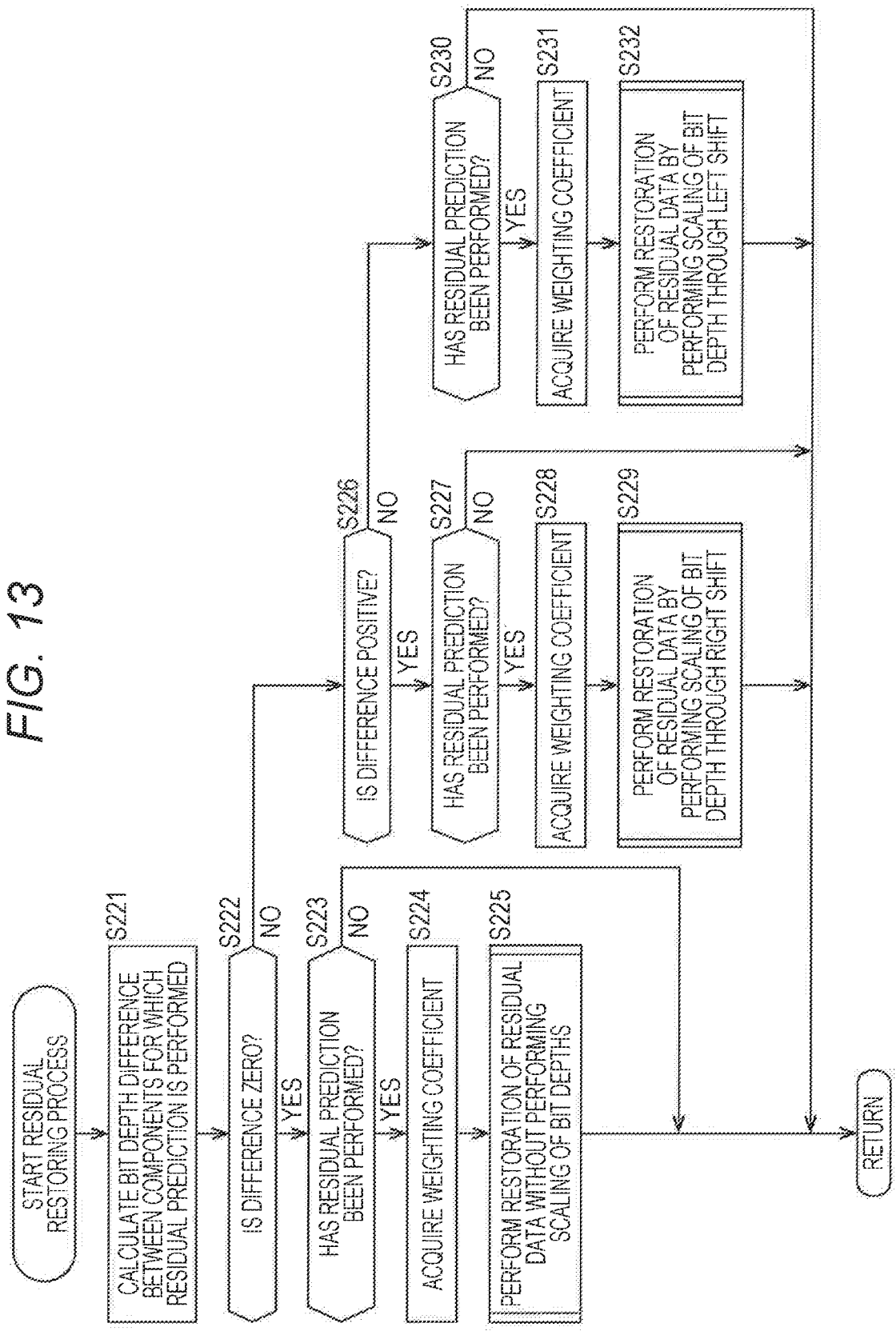
FIG. 13 is a flowchart that illustrates sin example of the flow of a residual restoring process.

When the residual data restoring process is started, in Step S241, the weighting coefficient multiplication unit 264 of the restoration unit 242 multiplies the restored residual data $(r'_Y(x, y))$ of the luminance component by the weighting coefficient α acquired by the process of Step S224 illustrated in FIG. 13 $(\alpha \times r'_Y(x, y))$.

In Step S242, the right shift unit 265 shifts a multiplication result $(\alpha \times r'_Y(x, y))$ calculated in Step S241 to the right side by three bits $((\alpha \times r'_Y(x, y)) >> 3)$.

In Step S243, the calculation unit 266 restores the residual data of the color difference component Cr $(r'_{Cr}(x, y))$ by adding the right shift result $((\alpha \times r'_Y(x, y)) >> 3)$ calculated in Step S242 to the restored predicted residual data $(\Delta r'_{Cr}(x, y))$ of the of the color difference component Cr $(\Delta r'_{Cr}(x, y) + (\alpha \times r'_Y(x, y)) >> 3)$. In addition, the calculation unit 267 restores the residual data of the color difference component Cb $(r'_{Cb}(x, y))$ by adding the right shift result $((\alpha \times r'_Y(x, y)) >> 3)$ calculated in Step S242 to the predicted residual data $(\Delta r'_{Cb}(x, y))$ of the color difference component Cb $(\Delta r'_{Cb}(x, y) + (\alpha \times r'_Y(x, y)) >> 3)$.

When the residual data of the color difference component is restored as above $(\Delta r'_{Cb}(x, y)$ and $r'_{Cb}(x, y))$, the residual data restoring process ends, and the process is returned to the process illustrated in FIG. 13.

<Flow of Residual Data Restoring Process>

Figure 15:
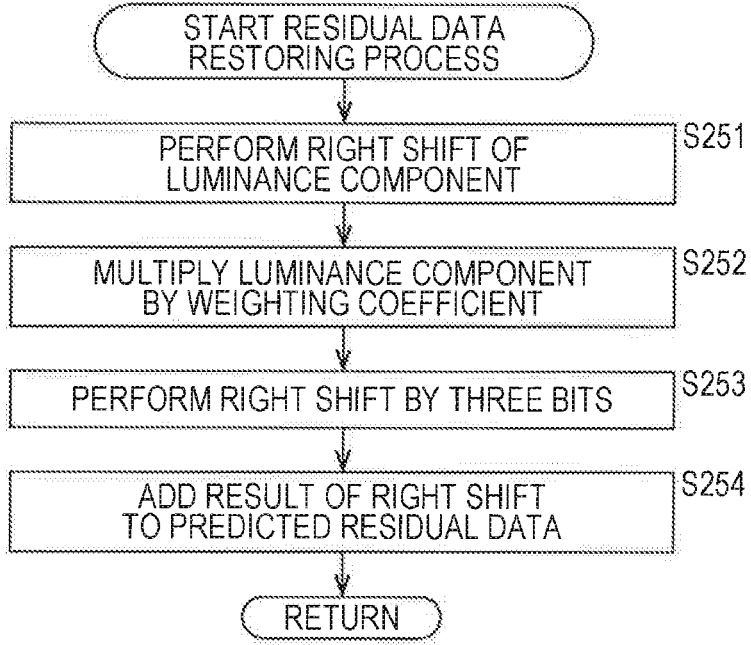
FIG. 15 is a flowchart that illustrates an example of the flow of a residual data restoring process.

Next, an example of the flow of the residual data restoring process performed in Step S229 of the residual restoring process will be described with reference to a flowchart illustrated in FIG. 15.

When the residual data restoring process is started, in Step S251, the right shift unit 262 of the restoration unit 242 shifts the restored residual data $(r'_Y(x, y))$ of the luminance component to the right, side in correspondence with the bit depth difference (delta_bitdepth) of the residual data calculated by the process of Step S221 illustrated in FIG. 13 $((r'_Y(x, y) >> delta\_bitdepth))$.

In Step S252, the weighting coefficient multiplication unit 264 multiplies a result $(r'_Y(x, y) >> delta\_bitdepth)$ of the right shift calculated in Step S251 by the weighting coefficient α acquired by the process of Step S228 illustrated in FIG. 13 $(\alpha \times (r'_Y(x, y) >> delta\_bitdepth))$.

In Step S253, the right, shift unit 265 shifts a multiplication result $(\alpha \times (r'_Y(x, y) >> delta\_bitdepth))$ calculated, in Step S252 to the right side by three bits $(\alpha \times (r'_Y(x, y) >> delta\_bitdepth) >> 3)$.

In Step S254, the calculation unit 266 restores the residual data of the color difference component Cr $(r'_{Cr}(x, y))$ by adding the result $(\alpha \times (r'_Y(x, y) >> delta\_bitdepth) >> 3)$ of the right shift calculated in Step S253 to the restored predicted residual data $(\Delta r'_{Cr}(x, y))$ of the color difference component Cr $(\Delta r'_{Cr}(x, y) + \alpha \times (r'_Y(x, y) >> delta\_bitdepth) >> 3)$. In addition, the calculation unit 267 restores the residual data of the color difference component Cb $(r'_{Cb}(x, y))$ by adding the result $(\alpha \times (r'_Y(x, y) >> delta\_bitdepth) >> 3)$ of the right shift calculated in Step S253 to the restored predicted residual data $(\Delta r'_{Cb}(x, y))$ of the color difference component Cb $(\Delta r'_{Cb}(x, y) + \alpha \times (r'_Y(x, y) >> delta\_bitdepth) >> 3)$.

When the residual data of the color difference components is restored as above $(r'_{Cr}(x, y)$ and $r'_{Cb}(x, y))$, the residual data restoring process ends, and the process is returned to the process illustrated in FIG. 13.

<Flow of Residual Data Restoring Process>

Figure 16:
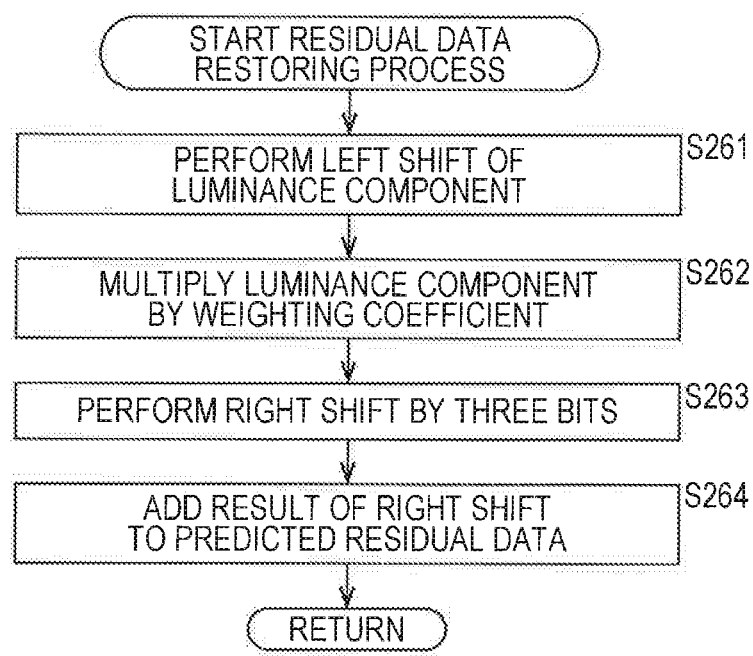
FIG. 16 is a flowchart that illustrates an example of the flow of a residual data restoring process.

Next, an example of the flow of the residual data restoring process performed in Step S232 of the residual restoring process will be described with reference to a flowchart illustrated in FIG. 16.

When the residual data restoring process is started, in Step S261, the left shift unit 263 of the restoration unit 242 shifts the restored residual data $(r'_Y(x, y))$ of the luminance component to the left side in correspondence with the bit depth difference (−delta_bitdepth) of the residual data calculated by the process of Step S221 illustrated in FIG. 13 $(r'_Y(x, y) << -delta\ pit-depth)$.

In Step S262, the weighting coefficient multiplication unit 264 multiplies a result $(r'_Y(x, y) << -delta\_bitdepth)$ of the left shift calculated in Step S261 by the weighting coefficient α acquired by the process of Step S231 illustrated in FIG. 13 $(\alpha \times (r'_Y(x, y) << -delta\_bitdepth))$.

In Step S263, the right shift unit 265 shifts a multiplication result $(\alpha \times (r'_Y(x, y) << -delta\_bitdepth))$ calculated in Step S262 to the right side by three bits $(\alpha \times (r'_Y(x, y) << -delta\_bitdepth) >> 3)$.

In Step S264, the calculation unit 266 restores the residual data of the color difference component Cr $(r'_{Cr}(x, y))$ by adding the result $(\alpha \times (r'_Y(x, y) << -delta\_bitdepth) >> 3)$ of the right shift calculated in Step S263 to the restored predicted residual data $(\Delta r'_{Cr}(x, y))$ of the color difference component Cr $(\Delta r'_{Cr}(x, y) + \alpha \times (r'_Y(x, y) << -delta\_bitdepth) >> 3)$. In addition, the calculation unit 267 restores the residual data of the color difference component Cb $(r'_{Cb}(x, y))$ by adding the result $(\alpha \times (r'_Y(x, y) << -delta\_bitdepth) >> 3)$ of the right shift calculated in Step S263 to the restored predicted residual data ($\Delta r'_{Cr}(x, y)$) of the color difference component Cb ($\Delta r'_{Cb}(x, y)+\alpha \times (r'_{Y}(x, y)<<-\text{delta\_bitdepth})>>3$).

When the residual data of the color difference components is restored as above ($r'_{Cr}(x, y)$ and $r'_{Cb}(x, y)$), the residual data restoring process ends, and the process is returned, to the process illustrated in FIG. 13.

By performing each process as described above, also in a case where the bit depths of the residual data are different between components, the residual restoring unit 222 can correctly restore the residual data. Accordingly, the image decoding apparatus 200 can suppress a decrease in the coding efficiency.

As above, while it has been described that, when the bit depths of the residual data are arranged to be uniform, the bit depth of the luminance component is arranged to be uniform with respect to the color difference component through a bit shift, in the scaling of such bit depths, a component that is used as the reference is arbitrary. For example, the bit depth of the color difference component may be configured to be scaled. However, generally, it is preferable to scale a component (having a deeper bit depth) having a more information amount for improving the prediction accuracy so as to improve the coding efficiency. In the case of the color space of the YUV as described above, generally, a luminance component is of significance and has a large information amount. Thus, it is preferable to scale the bit depth of the luminance component.

As above, while a case has been described in which an image of the YUV color space is coded and decoded, the color space of the image is arbitrary, and a prediction may be performed between arbitrary components. For example, also in a case where the color space of the image is the RGB, similarly to the case of the YUV described above, residual prediction/residual decoding can be performed using the scaling of the bit depth.

2. Second Embodiments

Prohibition of Residual Prediction

A method of controlling the residual prediction/residual decoding is not limited to that of the example described above. For example, in a case where the bit depths of the residual data are different between components, a residual prediction may be configured to be prohibited (predicted residual data is not calculated. More specifically, in a case where the bit depths of the residual data are different between components, a residual prediction may be controlled not to be performed by using information (for example, luma_chroma_prediction_enabled_flag), which is included in the picture parameter set (PPS), used for controlling whether or not the residual prediction is performed. For example, in such a case, the value of luma_chroma_prediction_enabled_flag may be configured to be zero. By configuring as such, for a picture corresponding to the information, a residual prediction is prohibited (naturally, residual restoration is not performed). Accordingly, an inaccurate residual prediction/residual restoration may be configured not to be performed. In other words, a decrease in the coding efficiency due to an inaccurate residual prediction/residual restoration can be suppressed. In addition, the process of the scaling of the bit depth and the like can be omitted, and accordingly, an increase in the processing load can be suppressed.

<Semantics>

In order to perform the control process as described above, the semantics may be described as in an example illustrated in FIG. 17. A port ion of the semantics illustrated in FIG. 17, to which an underline is attached is a description corresponding to the execution control of the residual prediction/residual decoding described, above.

<Header Processing Unit and Residual Predicting Unit>

Also in this case, the image coding apparatus 100 may have a configuration that is basically the same as that according to the first embodiment.

Figure 18:
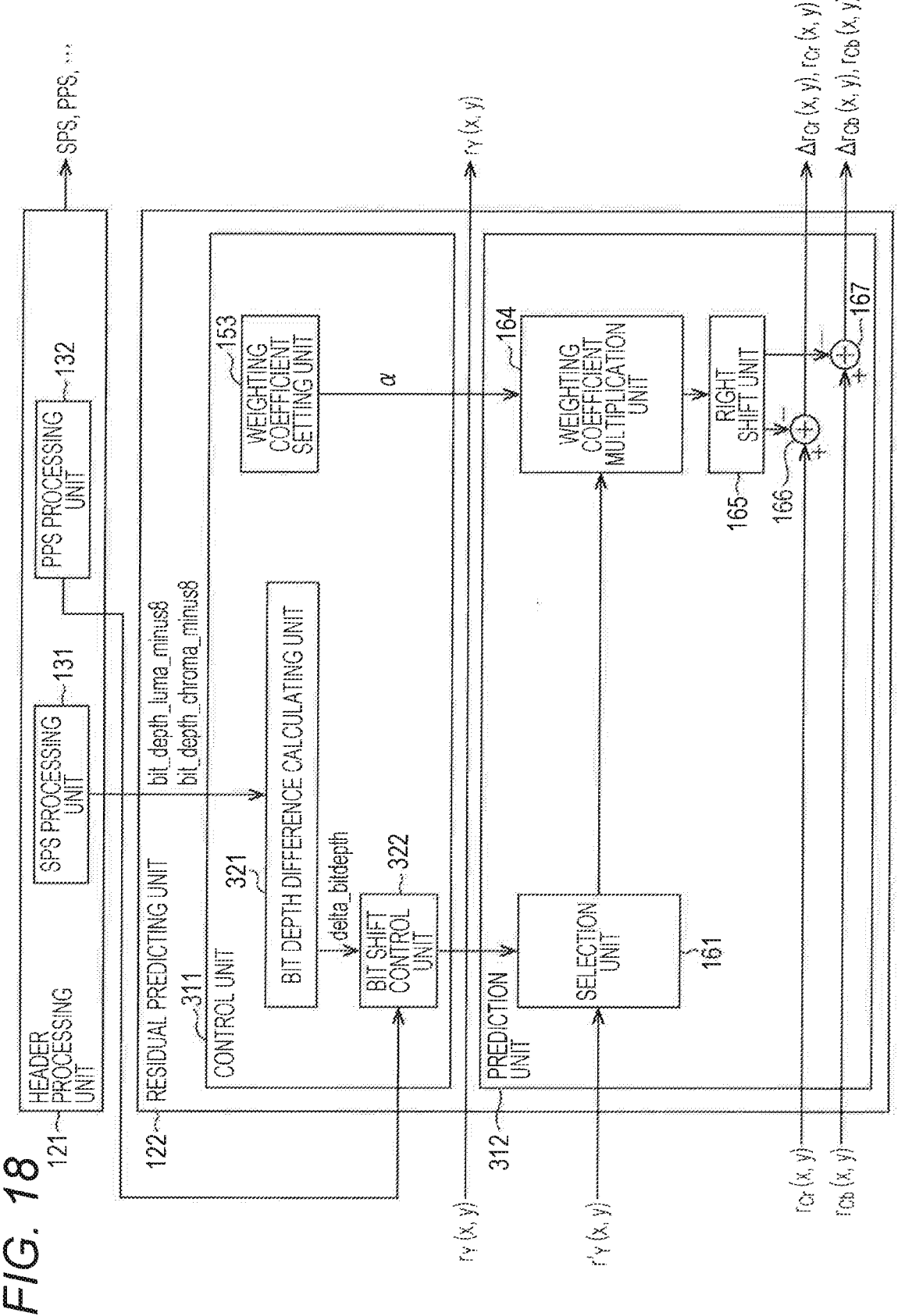
FIG. 18 is a block diagram that illustrates an example of the main configurations of a header processing unit and a residual predicting unit.

FIG. 18 is a block, diagram that, illustrates an example of the main configurations of a header processing unit 121 and a residual predicting unit 122 of such a case. As illustrated in FIG. 18, in this case, when compared to the case of the first embodiment, a residual predicting unit 122 includes a control unit 311 instead of the control unit 141 and includes a prediction unit 312 instead of the prediction unit 142.

The control unit 311 performs a process that is basically the same as that of the control, unit 141. When compared with the configuration of the control unit 141, the control unit 311 includes a bit depth difference calculating unit 321 instead of the bit depth difference calculating unit 151, includes a bit shift control unit 322 instead of the bit shift control unit 152, and, similarly to the case of the control unit 141, includes the weighting coefficient setting unit 153.

The bit depth difference calculating unit 321, similarly to the case of the bit depth difference calculating unit 151, calculates a bit depth difference (delta_bitdepth) between the components. However, the bit depth difference calculating unit 321, differently from the case of the bit depth difference calculating unit 151, does not supply the calculated bit depth difference (delta_bitdepth) between the components to the prediction unit 312.

The bit shift control unit 322, similarly to the case of the bit shift control unit 152, controls the calculation performed by the prediction unit 312, However, in a case where the bit depths of the residual data, are different between the components, the bit shift control unit 322 prohibits a residual prediction (does not calculated predicted, residual data).

In other words, in the example of this embodiment, the scaling of the bit depths, in other words, a bit shift used for arranging the bit depths to be uniform between the components is not performed, and accordingly, the prediction unit 312, compared to the configuration of the prediction unit 142, does not include the right shift unit 162 and the left shift unit 163.

<Flow of Residual Predicting Process>

In case of this embodiment, the coding process is performed similarly to that of the case of the first, embodiment. An example of the flow of the residual predicting process performed in this embodiment will, be described with reference to a flowchart illustrated, in FIG. 19.

Figure 19:
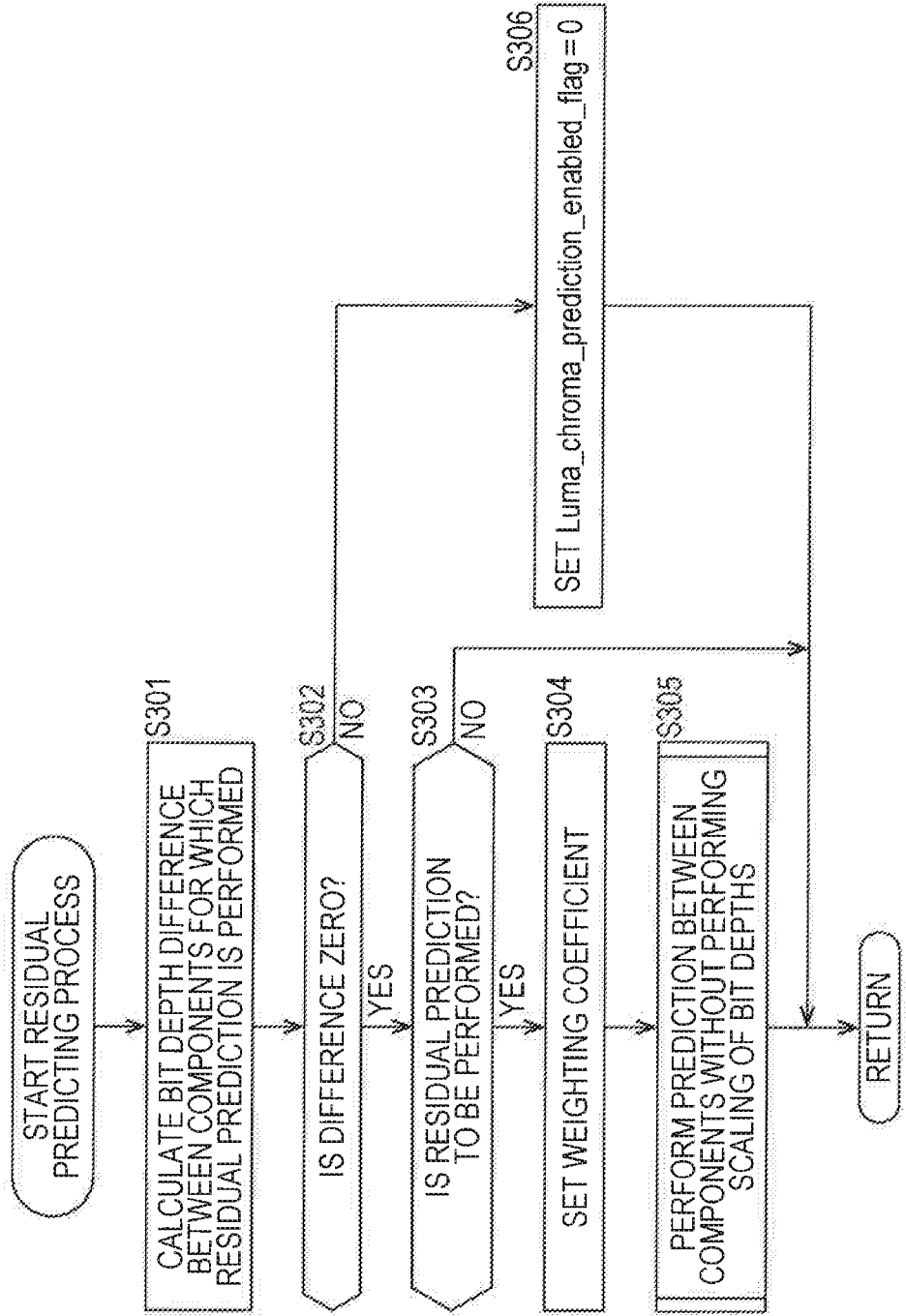
FIG. 19 is a flowchart that illustrates an example of the flow of a residual predicting process.

Also in the case of the example illustrated in FIG. 19, when, a residual predicting process is started, in Step S301, the bit depth difference calculating unit 321 calculates a bit depth difference between components for which the residual prediction is performed. In other words, the bit depth difference calculating unit 321 performs calculation represented in Equation (4) and calculates a bit depth difference (delta_bitdepth) between the luminance component (Y) and the color difference component (Cr or Cb). In a case where bit depth differences are different between the color difference component (Cr) and the color difference component (Cb), the bit depth differences (delta_bitdepth) are calculated.

In Step S302, the bit shift control unit 322 determines whether or not the bit depth difference (delta_bitdepth)

calculated in Step S301 is zero. In a case where zero is determined, the process proceeds to Step S303. In such a case, a bit shift is not performed, but the residual, prediction is performed as represented in Equation (3).

In other words, processes of Step S303 to Step S305 are performed similarly to those of Step S123 to Step S125 of the residual predicting process according to the first embodiment. Then, in a case where the process of Step S305 ends or it is determined in Step S303 that a residual prediction is not performed, the residual predicting process ends, and the process is returned, to the process illustrated in FIG. 5.

In addition, in Step S302, in a case where the bit depth difference (delta_bitdepth) is determined not to be zero, the process proceeds to Step S306.

In Step S306, the bit shift control unit 322 sets the value of information (for example, luma_chroma_prediction_enabled_flag) used for controlling whether or not a residual prediction is performed to a value representing that, a residual prediction (residual restoration) is not performed (prohibited). For example, the bit shift control unit 322 may set the value of luma_chroma_prediction_enabled_flag to zero.

When the process of Step S306 ends, the residual predicting process ends, and the process is returned to the process illustrated in FIG. 5.

By configuring as such, in a case where bit depths of residual data, are different between, components, and a residual prediction cannot be correctly performed, the residual prediction can be configured not to be performed. Accordingly, predicted residual data can be correctly calculated all the time, and the image coding apparatus 100 can suppress a decrease in the coding efficiency due to an inaccurate residual prediction. In addition, the scaling of the bit depths is unnecessary, and accordingly, an increase in the processing load can be suppressed.

<Header Acquiring Unit, and Residual Restoring Unit>

Also in this case, the image decoding apparatus 200 may have a configuration that is basically the same as that of the case of the first embodiment.

Figure 20:
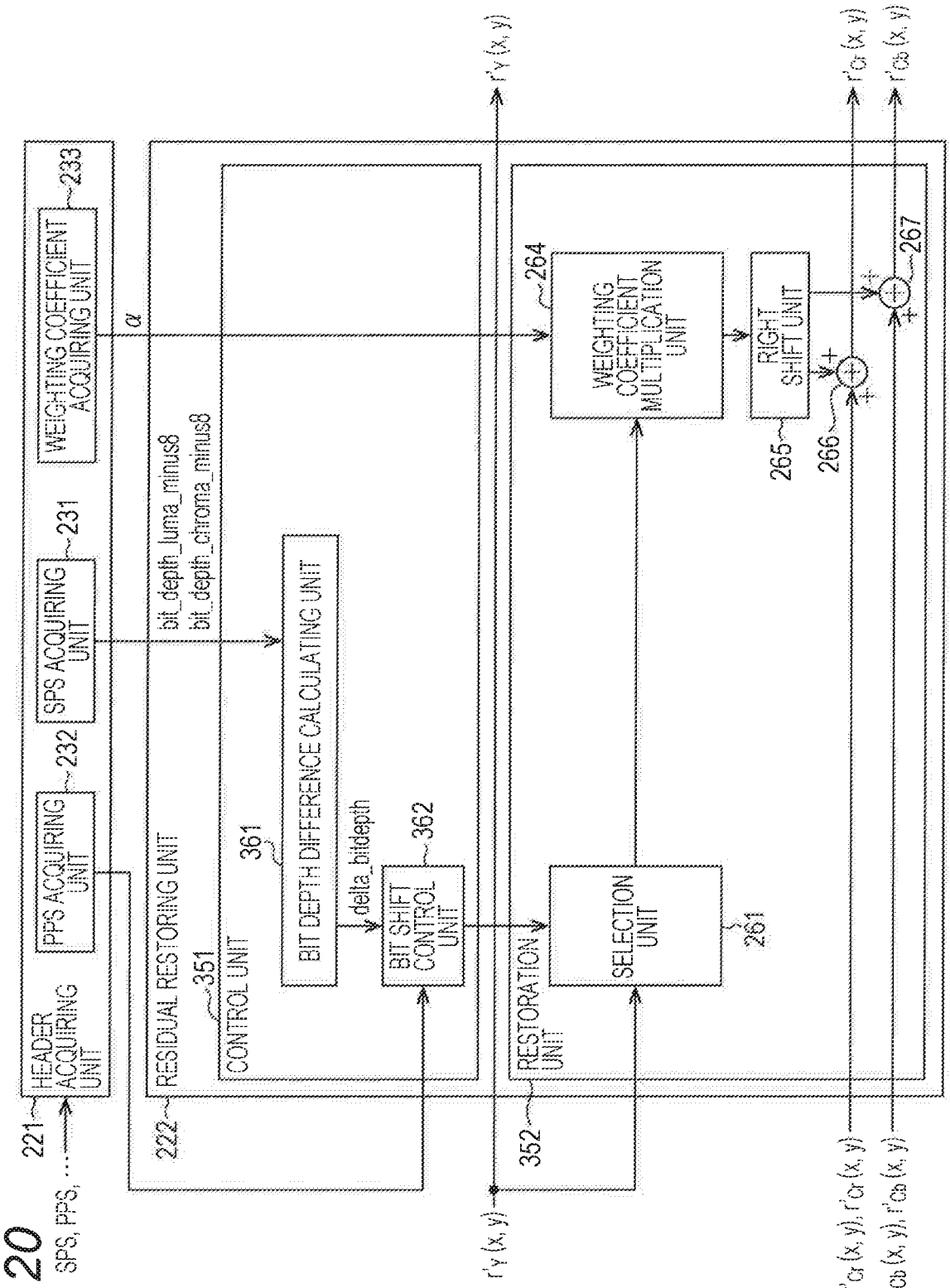
FIG. 20 is a block diagram that illustrates an example of the main configurations of a header acquiring unit and a residual restoring unit.

FIG. 20 is a block diagram that illustrates an example of the main configuration of the header acquiring unit 221 and the residual restoring unit 222 of this case. As illustrated in FIG. 20, in this case, when compared to the case of the first embodiment, the residual restoring unit. 222 includes a control unit 351 instead of the control unit 241 and includes a restoration unit 352 instead of the restoration unit 242.

The control unit 351 performs a process that is basically the same as that of the control unit 241. When compared to the configuration of the control unit 241, the control unit 351 includes a bit depth difference calculating unit 361 instead of the bit depth difference calculating unit 251 and includes a bit shift control unit 362 instead of the bit shift control unit 252.

The bit depth difference calculating unit 361, similarly to the case of the bit depth difference calculating unit 251, calculates a bit depth difference, (delta_bitdepth) between components. However, differently from the case of the bit depth difference calculating unit 251, the bit depth difference calculating unit 361 does not supply the calculated bit depth difference (delta_bitdepth) between the components to the restoration unit 352.

The bit shift control unit 362, similarly to the case of the bit shift control unit 252, controls calculation performed by the restoration unit 952 however, in a case where the bit depths of residual data are different between components, the bit shift control unit 362 prohibits residual restoration (does not restore the residual data of the color difference component).

In other words, in case of the example of this embodiment, the scaling of bit depths, in other words, a bit shift for arranging bit depths to foe uniform between components is not performed. Accordingly, when compared to the configuration of the restoration unit. 242, the restoration unit 952 does not include the right shift unit 262 and the left shift unit 263.

<Flow of Residual Restoring Prccess>

In case of this embodiment, the decoding process is performed similarly to the case of the first embodiment. An example of the flow of the residual restoring process in the case of this embodiment will be described with reference to a flowchart illustrated in FIG. 21.

Figure 21:
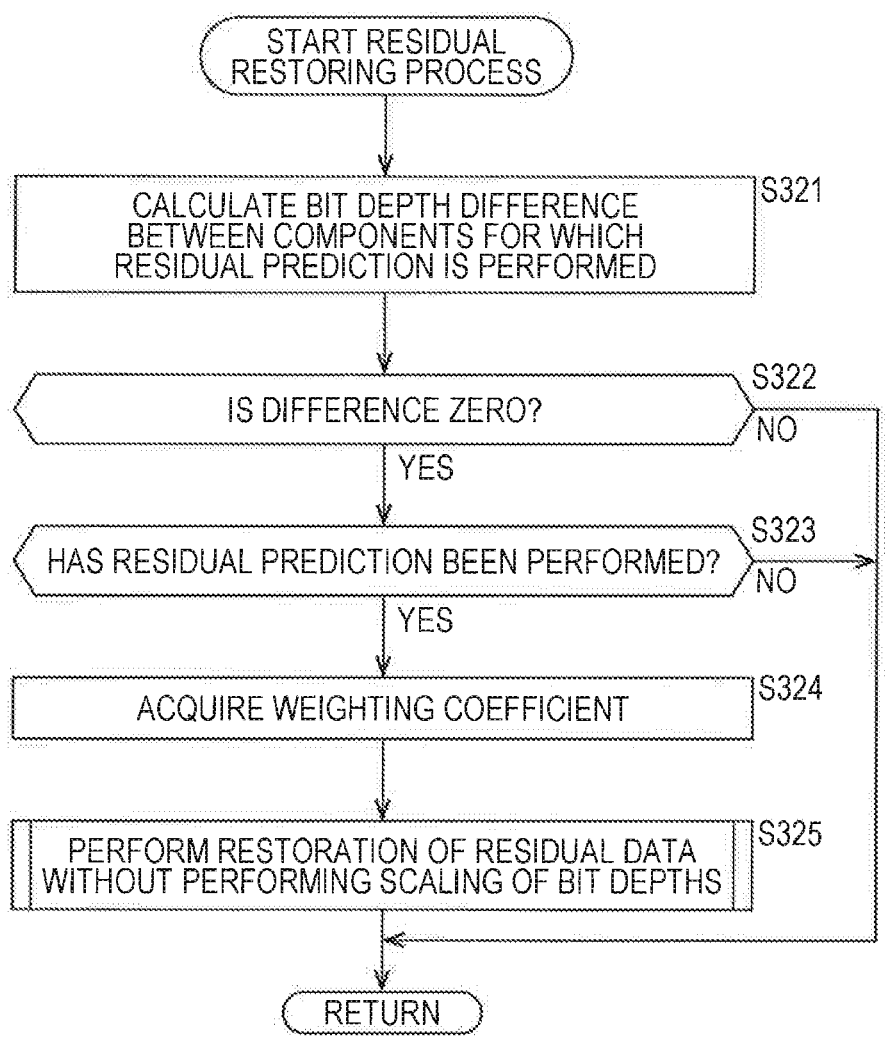
FIG. 21 is a flowchart that illustrates an example of the flow of a residual restoring process.

Also in case of the example illustrated in FIG. 21, when a residual restoring process is started, in Step S321, the bit depth difference calculating unit 361 calculates a bit depth difference between components for which the residual prediction has been performed. In other words, the bit depth difference calculating unit 361 performs calculation represented in Equation (10) and calculates a bit depth difference (delta_bitdepth) between the luminance component (Y) and the color difference component (Cr or Cb). In a case where bit depth differences are different between the color difference component (Cr) and the color difference component (Cb), the bit depth differences (delta_bitdepth) are calculated.

In Step S322, the bit shift control unit 362 determines whether or not the bit depth difference (delta_bitdepth) calculated in Step S321 is zero. In a case where zero is determined, the process proceeds to Step S323. In such a case, a bit shift is not performed, and the residual restoration is performed as represented in Equation (3).

In other words, the processes of Step S323 to Step S325 are performed similarly to the processes of Step S223 to Step S225 of the residual predicting process according to the first embodiment. Then, in a case where the process of Step S325 ends or it is determined in Step S323 that a residual prediction is not performed, the residual restoring process ends, and the process is returned to the process illustrated, in FIG.

On the other hand, in Step S322, also in a case where the bit depth difference (delta_bitdepth) calculated in Step S321 is determined not to be zero, the scaling of the bit depths is not performed, but the residual restoration is omitted. Thus, also in this case, the residual restoring process ends, and the process is returned to the process illustrated in FIG. 12.

By configuring as such, in a case where the bit depths of residual data are different between components, and a residual prediction cannot be correctly performed, the residual prediction is not performed, and residual restoration is configured not to be performed in accordance therewith. Accordingly, the residual data can be correctly restored all the time, and the image decoding apparatus 200 can suppress a decrease in the coding efficiency due to inaccurate residual restoration. In addition, since the scaling of bit depths is unnecessary, an increase in the processing load can be suppressed.

3. Third Embodiment

Using Both Scaling of Bit Depth and Prohibition of Residual Prediction

A method of controlling the residual prediction/residual decoding is not limited to that of the example described above. For example, it may be configured, such chat the scaling of bit depths is performed only in a case where the bit depths of residual data are different between components, and the calculated bit depth difference between the components is positive, and a residual prediction is prohibited (predicted residual data is not calculated) in a case where the calculated bit depth difference between the components is negative.

More specifically, for example, it may be configured such that, in a case where the bit depth of the residual data of the luminance component is larger than the bit depth of the residual data of the color difference component, a residual prediction is performed with the bit depths of the residual data arranged to be uniform between components by scaling the bit depth through a right shift, and, in a case where the bit depth of the residual data of the luminance component is smaller than the bit depth, of the residual data of the color difference component, a residual prediction is prohibited (predicted residual data is not calculated).

As described above, based on the characteristics of images, the luminance component is more important than, the color difference component, and generally, the bit depth of the residual data of the luminance component is the bit depth of the residual data of the color difference component or more, To the contrary, there are rare cases in which the color difference component has a bit depth larger than the luminance component. In other words, in a case where the bit depth of the color difference component is set to be large even against the characteristics of an image, there is a high possibility that a producer's certain intention beyond the characteristics of the image is included in the image. For this reason, the possibility of easily decreasing the prediction accuracy of a residual prediction that is a process toward a general image may be also considered. In other words, there is a possibility of easily decreasing the coding efficiency.

Thus, in a case where the luminance component expected to have high prediction accuracy has a bit depth larger than the color difference component, it may be configured such that a residual prediction (residual restoration) is executable, and the residual prediction is performed with the bit depths of the residual data, arranged to be uniform between components by scaling the bit depth of the residual data through a right shift so as to correctly perform the prediction (restoration). On the other hand, in a case where the color difference component expected to have low prediction accuracy has a bit depth larger than the luminance component, it may be configured such that a residual prediction is controlled not to be executed by using information (for example, luma_chroma_prediction_enabled_flag), which is included in the picture parameter set (PPS), used for controlling whether or not a residual prediction is performed.

By configuring as such, the residual prediction/residual decoding may be configured, to be executed only in a case where a sufficient, effect according to the execution of the residual prediction can be acquired (the coding efficient, can be sufficiently improved). Accordingly, since an unnecessary residual prediction/residual decoding can be omitted, a decrease in the coding efficiency can be suppressed, and an increase in the processing load can be suppressed.

<Semantics>

In order to perform control as described above, the semantics may be described as in an example illustrated, in FIG. 22. A portion of the semantics illustrated in FIG. 22 to which an underline is attached is a description corresponding to the execution control of the residual prediction/residual decoding described above.

<Header Processing Unit and Residual Predicting Unit>

Also in this case, the image coding apparatus 100 may have a configuration that is basically the same as that according to the first embodiment.

Figure 23:
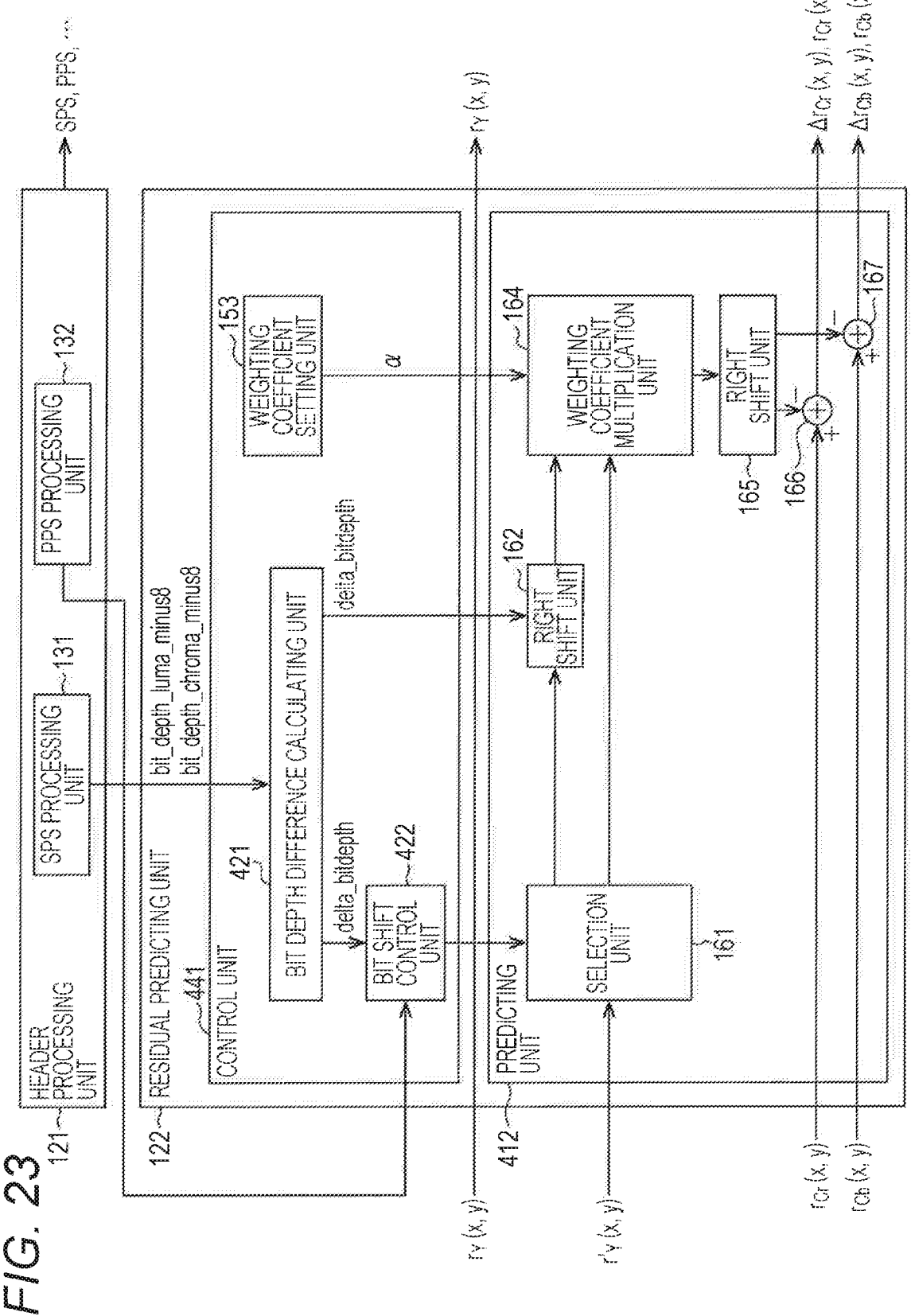
FIG. 23 is a block diagram that illustrates an example of the main configurations of a header processing unit and a residual predicting unit.

FIG. 23 is a block diagram that illustrates an example of the main configurations of a header processing unit 121 and a residual predicting unit 122 of such a case. As illustrated in FIG. 23, in this case, when compared to the case of the first embodiment, a residual predicting unit 122 includes a control unit 411 instead of the control unit 141 and includes a prediction unit. 412 instead of the prediction unit 142.

A control unit 411 performs a process that is basically the same as that of the control unit 141. When compared with the configuration of the control unit 141, the control unit 411 includes a bit depth difference calculating unit 421 instead of the bit depth difference calculating unit 151, includes a bit shift control unit 422 instead of the bit shift control unit 152, and, similarly to the case of the control unit 141, includes the weighting coefficient setting unit 153.

The bit depth difference calculating unit 421, similarly to the case of the bit depth difference calculating unit 151, calculates a bit depth difference (delta_bitdepth) between the components. However, the bit depth difference calculating unit 421, differently from, the case of the bit depth difference calculating unit 151, does not supply the calculated bit depth difference (delta_bitdepth) between the components to the left shift unit 163 (the prediction unit 412 does not have the left shift unit 163).

The bit shift control unit 422, similarly to the case of the bit shift control unit 152, controls the calculation performed by the prediction unit 412. However, in a case where the bit depth difference (delta_bitdepth) of the residual data between components calculated by the bit depth difference calculating unit 421 is zero, the bit shift control unit 422 causes the prediction unit 412 not to perform scaling of the bit depth but to calculate the predicted residual data. On the other hand, in a case where the bit depth difference (delta_bitdepth) of the residual data between the components calculated by the bit depth difference calculating unit 421 is positive, the bit shift control unit 422 causes the prediction unit 412 to perform scaling of the bit depth to calculate predicted residual data. In contrast to this, in a case where the bit depth difference (delta_bitdepth) of the residual data between the components calculated by the bit depth difference calculating unit 421 is negative, the bit shift control unit 422 prohibits a residual prediction (causes no calculation of predicted residual data) by controlling the prediction unit 412.

In other words, in case of the example of this embodiment, when the bit depth difference (delta_bitdepth) of the residual data between the components calculated by the bit depth difference calculating unit 421 is negative, the scaling of the bit depths, in other words, a bit shift used for arranging the bit depths to be uniform between the components is not performed, and accordingly, compared to the configuration of the prediction unit 142, the left shift unit 163 is not included in the prediction unit 412.

<Flow of Residual Predicting Process>

In case of this embodiment, the coding process is performed similarly to that of the case of the first embodiment. An example of the flow of the residual predicting process performed in this embodiment will be described with reference to a flowchart illustrated in FIG. 24.

Figure 24:
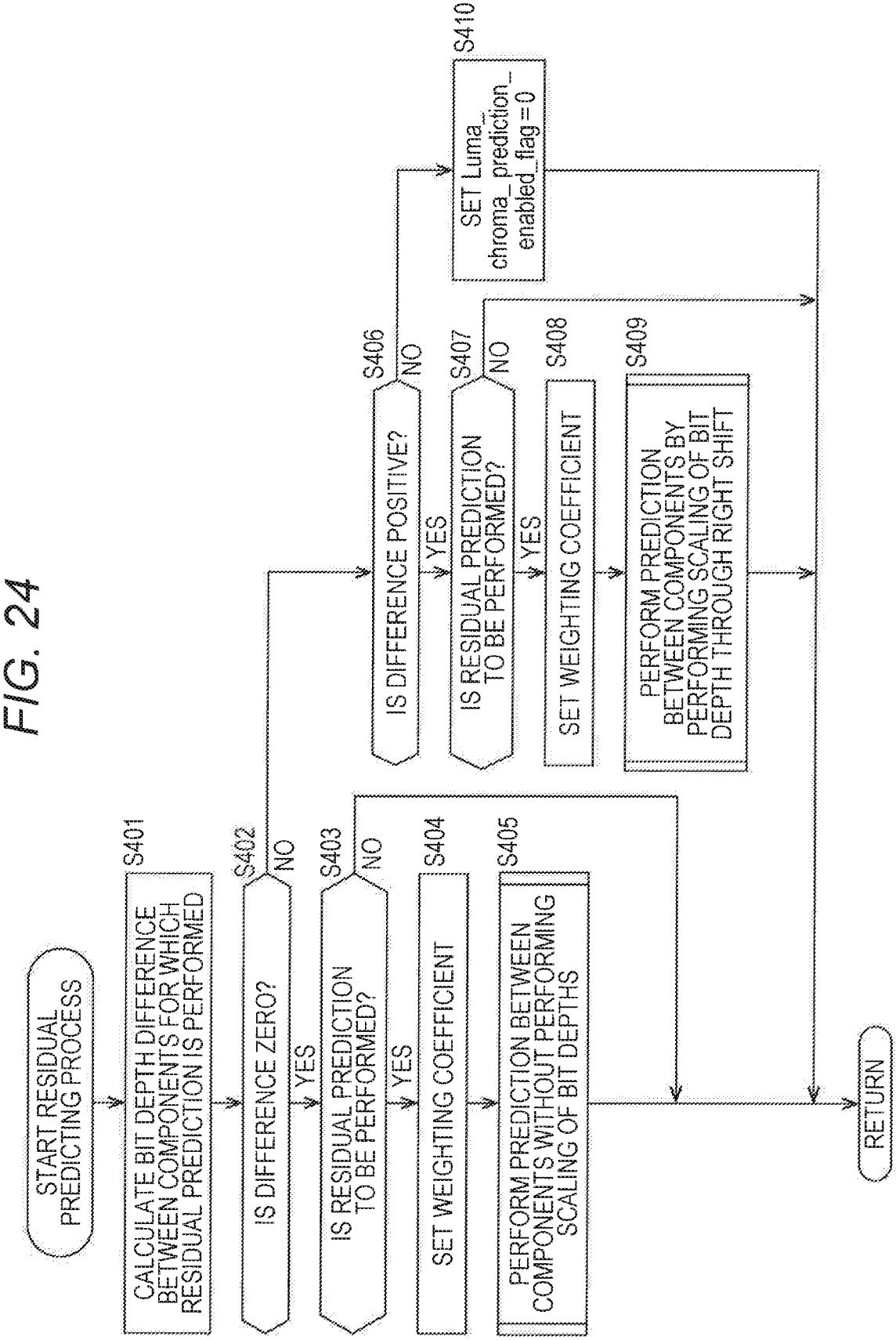
FIG. 24 is a flowchart that illustrates an example of the flow of a residual predicting process.

Also in the case of the example illustrated in FIG. 24, when a residual predicting process is started, in Step S401, the bit depth difference calculating unit 421 calculates a bit depth difference between components for which the residual prediction is performed. In other words, the bit depth difference calculating unit 421 performs calculation represented in Equation (4) and calculates a bit depth difference (delta_bitdepth) between the luminance component (Y) and the color difference component (Cr or Cb). In a case where bit depth differences are different between the color difference component (Cr) and the color difference component (Cb), the bit depth differences (delta_bitdepth) are calculated.

In Step S402, the bit shift control unit 422 determines whether or not the bit depth difference (delta_bitdepth) calculated in Step S401 is zero. In a case where zero is determined, the process proceeds to Step S403. In such a case, a bit shift is not performed, but the residual prediction is performed as represented in Equation (3).

In other words, processes of Step S403 to Step S405 are performed similarly to those of Step S123 to Step S125 of the residual predicting process according to the first, embodiment. Then, in a case where the process of Step S405 ends or it is determined in Step S403 that a residual prediction is not performed, the residual predicting process ends, and the process is returnee to the process illustrated in FIG. 5.

In addition, in Step S402, in a case where the bit depth difference (delta_bitdepth) is determined not to be zero, the process proceeds to Step S406.

In Step S406, the bit shift control unit 422 determines whether or not the bit depth difference (delta_bitdepth) calculated in Step S401 is positive. In a case where being positive is determined, the process proceeds to Step S407. In such a case, a residual prediction is performed as represented in Equation (6) (scaling through a right shift is performed).

In other words, the processes of Step S407 to Step S409 are performed similarly to the processes of Step S127 to Step S129 of the residual predicting process according to the first embodiment. Then, in a case where the process of Step S409 ends or it is determined in Step S407 that a residual prediction is not performed, the residual predicting process ends, and the process is returned to the process illustrated in FIG. 5.

On the other hand, in a case where the bit depth difference (delta_bitdepth) is determined not to be positive (determined to be negative) in Step S406, the process proceeds to Step S410.

In Step S410, the bit shift control unit 422 sets the value of information (for example, luma_chroma_prediction_enabled_flag) used for controlling whether or not a residual prediction is performed to a value representing that a residual prediction (residual restoration) is not performed (is prohibited). For example, the bit shift control unit 422 may set the value of luma_chroma_prediction_enabled_flag to zero.

When the process of Step S410 ends, the residual predicting process ends, and the process is returned to the process illustrated in FIG. 5.

By configuring as such, in a case where the bit depth difference of the residual data between the components is negative, in other words, the color difference component has a bit depth larger than the luminance component, and there is a possibility that sufficient effect is not acquired (the coding efficiency cannot be sufficiently improved) even in a case where a residual prediction is performed, the residual prediction may be configured not to be performed. Therefore, according to the image coding apparatus 100, since an unnecessary residual prediction can be omitted, a decrease in the coding efficiency can be suppressed, and an increase in the processing load can be suppressed.

<Header Acquiring Unit and Residual Restoring Unit>

Also in this case, the image decoding apparatus 200 may have a configuration that is basically the same as that of the case of the first embodiment.

Figure 25:
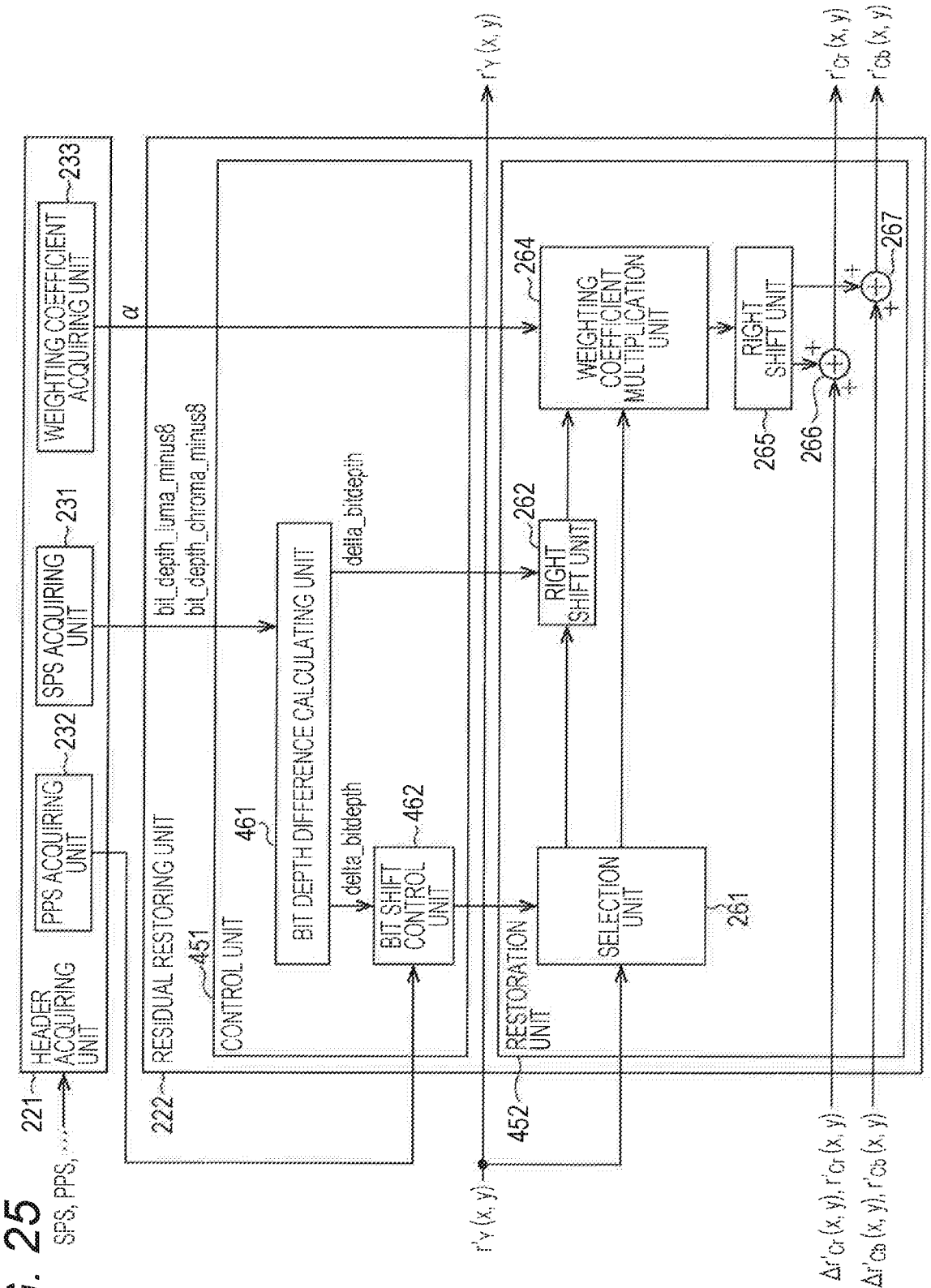
FIG. 25 is a block diagram that illustrates an example of the main configuration of a header acquiring unit and a residual restoring unit.

FIG. 25 is a block diagram that illustrates an example of the main configuration of the header acquiring unit 221 and the residual restoring unit 222 of this case. As illustrated in FIG. 25, in this case, when compared to the case of the first embodiment, the residual restoring unit 222 includes a control unit 451 instead of the control unit 241 and includes a restoration unit 452 instead of the restoration unit 242.

The control unit 451 performs a process that is basically the same as that of the control unit 241. When compared to the configuration of the control unit 241, the control unit 451 includes a bit depth difference calculating unit 461 instead of the bit depth difference calculating unit 251 and includes a bit shift control unit 462 instead of the bit shift control unit 252.

The bit depth difference calculating unit 461, similarly to the case of the bit depth difference calculating unit 251, calculates a bit depth difference (delta_bitdepth) between components. However, differently from the case of the bit depth difference calculating unit 251, the bit depth difference calculating unit 461 does not supply the calculated bit depth difference (delta_bitdepth) between the components to the left shift unit 263 (the restoration unit 452 does not include the left, shift unit 263).

The bit shift control unit 462, similarly to the case of the bit shift control unit 252, controls the calculation performed by the restoration unit 452. However, in a case where the bit depth difference (delta_bitdepth) of the residual data between components calculated by the bit depth difference calculating unit 461 is zero, the bit shift control unit 462 causes the restoration unit 452 not to perform scaling of the bit depth but to restore the residual data. On the other hand, in a case where the bit depth difference (delta_bitdepth) of the residual data between the components calculated by the bit depth difference calculating unit 461 is positive, the bit shift control unit 462 causes the restoration unit 452 to perform scaling of the bit depth to restore the residual data. In contrast to this, in a case where the bit depth difference (delta_bitdepth) of the residual data between the components calculated by the bit depth difference calculating unit 461 is negative, the bit shift control unit 462 omits residual restoration (omits the restoration of the residual data) by controlling the restoration unit 452.

In other words, in case of the example of this embodiment, when the bit depth difference (delta_bitdepth) of the residual data between the components calculated by the bit depth difference calculating unit 461 is negative, the scaling of the bit depths, in other words, a bit shift used for arranging the bit depths to be uniform between the components is not performed, and accordingly, compared to the configuration of the restoration unit 242, the left shift unit 263 is not included in the restoration unit 452.

<Flow of Residual Restoring Process>

In case of this embodiment, the decoding process is performed similarly to the case of the first embodiment. An example of the flow of the residual restoring process in the case of this embodiment, will be described, with reference to a flowchart illustrated in FIG. 26.

Figure 26:
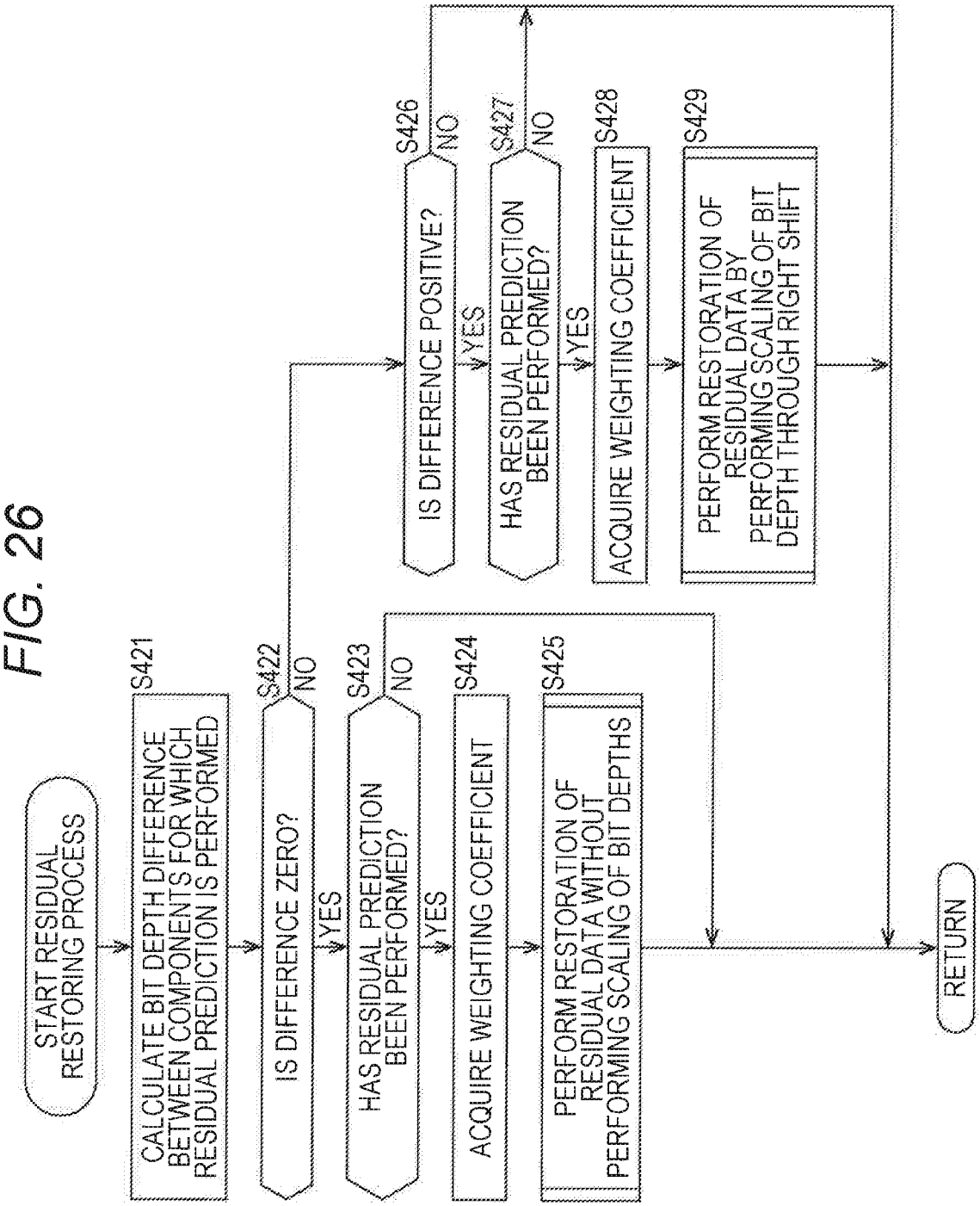
FIG. 26 is a flowchart that illustrates an example of the flow of a residual restoring process.

Also in case of the example illustrated in FIG. 26, when a residual restoring process is started, in Step S421, the bit depth difference calculating unit 461 calculates a bit depth difference between components for which the residual prediction has been, performed. In other words, the bit depth difference calculating unit. 461 performs calculation represented in Equation (10) and calculates a bit depth difference (delta_bitdepth) between the luminance component (Y) and the color difference component (Cr or Cb). In a case where bit depth differences are different between the color difference component (Cr) and the color difference component (Cb), the bit depth differences (delta_bitdepth) are calculated.

In Step S422, the bit shift control unit 462 determines whether or not the bit depth difference (delta_bitdepth) calculated in Step S421 is zero. In a case where zero is determined, the process proceeds to Step S423. In such a case, a bit shift is not performed, and the residual restoration is performed as represented in Equation (9).

In other words, the processes of Step S423 to Step S425 are performed similarly to the processes of Step S223 to Step 3225 of the residual predicting process according to the first embodiment. Then, in a case where the process of Step S425 ends or it is determined in Step S423 that a residual prediction is not performed, the residual restoring process ends, and the process is returned to the process illustrated in FIG. 12.

On the other hand, in Step S422, in a case where the bit depth difference (delta_bitdepth) is determined not to be zero, the process proceeds to Step S426.

In Step S426, the bit shift control unit 462 determines whether or not the bit depth difference (delta_bitdepth) calculated in Step S421 is positive. In a case where being positive is determined, the process proceeds to Step S427, In such a case, a residual prediction is performed as represented in Equation (12) (scaling through a right shift is performed).

In other words, the processes of Step S427 to Step S429 are performed similarly to the processes of Step S227 to Step S229 of the residual predicting process according to the first embodiment. Then, in a case where the process of Step S429 ends or it is determined in Step S427 that a residual prediction is not performed, the residual restoring process ends, and the process is returned to the process illustrated in FIG. 12.

In addition, in Step S426, also in a case where the bit depth difference (delta_bitdepth) is determined not to be positive (determined to be negative), the scaling of the bit depths is not performed, and the residual restoration is omitted. Accordingly, also in this case, the residual restoring process ends, and the process is returned to the process illustrated in FIG. 12.

By configuring as such, in a case where the bit depth difference of the residual data between the components is negative, in other words, the color difference component has a bit depth larger than the luminance component, and there is a possibility that sufficient effect is not acquired (the coding efficiency cannot be sufficiently improved) even in a case where a residual prediction is performed, the residual prediction is not performed, and the residual restoration may be configured not to be performed in accordance therewith. Therefore, according to the image decoding apparatus 200, since unnecessary restoration prediction can be omitted, a decrease in the coding efficiency can be suppressed, and an increase in the processing load can be suppressed.

4. Fourth Embodiment

Residual Predicting Control According to Color Space of Image

A method of controlling the residual prediction/residual decoding is not limited to that illustrated in the example described above. For example, whether or not the residual prediction/residual decoding is performed may be controlled in accordance with the color space of the image. For example, it may be configured such that the execution of the residual prediction/residual decoding is controlled basically as described in the third embodiment, and, additionally, in a case where the color space of the image that is a coding/decoding target is the RGB, the residual prediction/residual, decoding is configured to be prohibited.

Generally, in case of the YUV, there are many cases where a luminance component is more important than a color difference component as information, and a case may be considered in which the luminance component has a more information amount (larger bit depth) than the color difference component. On the other hand, in case of the RGB, there are many cases where the degrees of importance of components as information are the same, and the information amounts (bit depths) of the components are the same. While a case may be considered in which a G component is more important than an R component and a B component as information, there are rare cases where there is a difference between the information amounts (bit depths) thereof.

In other words, in a case where the color space of the image is RGB, and the information amounts (bit depths) of the components are not uniform, there is a high possibility that a producer's certain intention beyond the characteristics of the image is included in the image. For this reason, the possibility of easily decreasing the prediction accuracy of a residual prediction that is a process toward a general image may be also considered. In other words, there is a possibility of easily decreasing the coding efficiency.

Thus, it may be configured such that, only in a case where the image has a color space such as the YUV expected to have high prediction accuracy, the residual prediction (residual restoration) is configured to be executable, and, in a case where the image has a color space such as the RGB in which the prediction accuracy may be easily decreased, the residual prediction (residual restoration) is controlled not to be performed by using information (for example, luma_chroma_prediction_enabled_flag), which is included in the picture parameter set (PPS), used for controlling whether or not the residual prediction is performed.

By configuring as such, the residual prediction/residual decoding may be configured to be executed only for the case of a color space for which sufficient effect according to the execution of the residual prediction is acquired (coding efficiency can be sufficiently improved). Accordingly, since an unnecessary residual prediction/residual decoding can be omitted, a decrease in the coding efficiency can be suppressed, and an increase in the processing load can be suppressed.

<Semantics>

In order to perform the control process as described above, the semantics may be described as in an example illustrated in FIG. 27. A portion of the semantics illustrated in FIG. 27, to which an underline is attached is a description corresponding to the execution, control of the residual prediction/residual decoding described above.

<Header Processing Unit and Residual Predicting Unit>

Also in this case, the image coding apparatus 100 may have a configuration that is basically the same as that according to the first embodiment.

Figure 28:
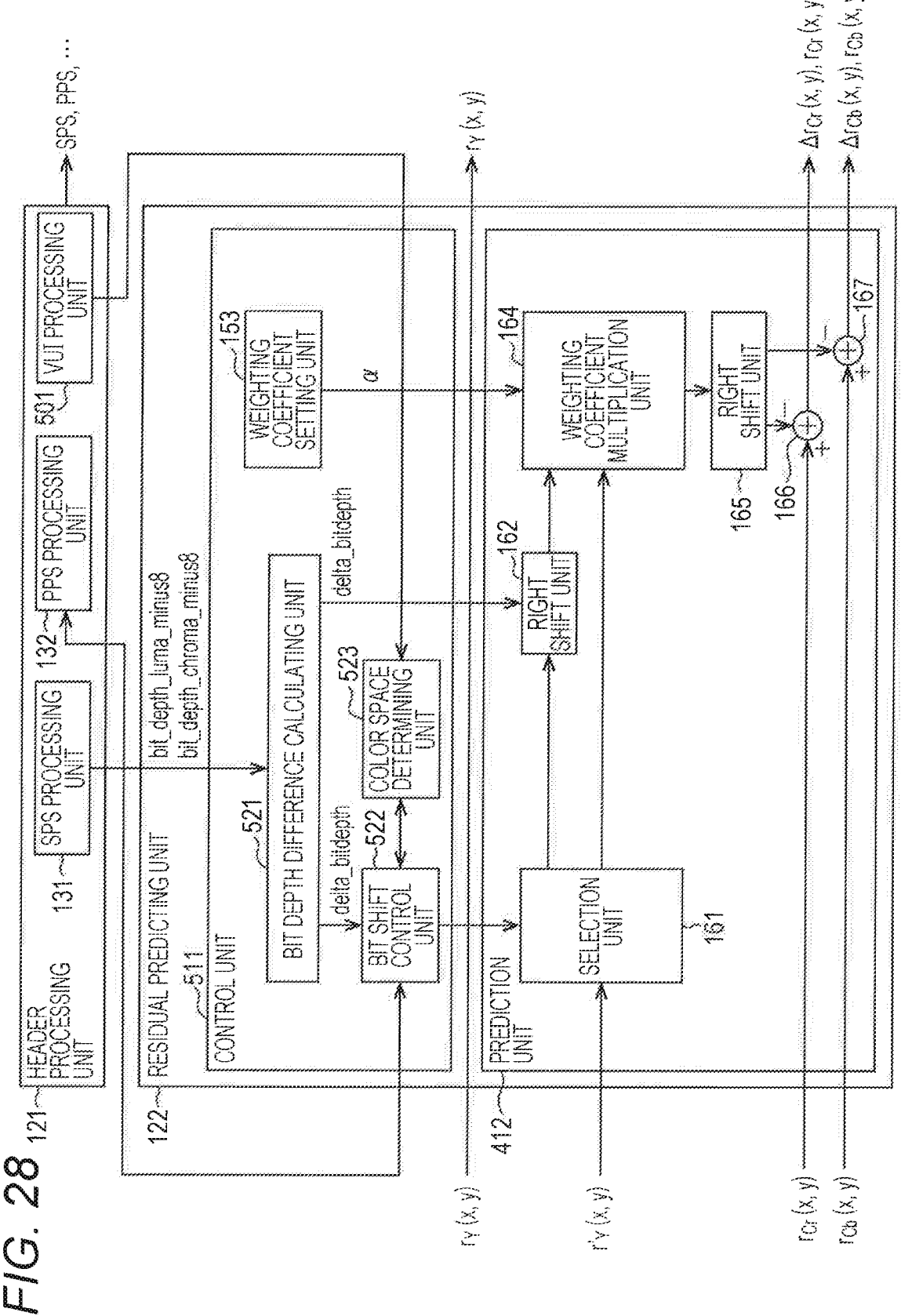
FIG. 28 is a block diagram that illustrates an example of the main configurations of a header processing unit and a residual predicting unit.

FIG. 28 is a block diagram that illustrates an example of the main configurations of a header processing unit 121 and a residual predicting unit 122 of such a case. As illustrated in FIG. 28, in this case, when compared to the case of the first embodiment, the header processing unit 121 further includes a VUI (Video Usability Information) processing unit 501. In addition, when compared to the case of the first embodiment, the residual predicting unit 122 includes a control unit 511 instead of the control unit 141 and includes a prediction unit 412 instead of the prediction unit 142.

The VUI processing unit 501 performs a process relating to the generation of VUI (Video Usability Information), The VUI is data relating to the display of a video and is stored in a video parameter set (VPS) or a sequence parameter set (SPS). In addition, the VUI processing unit 501, for example, supplies information (matrix_coffs), which is included in the VUI, representing the color space of the image to the residual predicting unit 122 (a color space determining unit 523 to be described later). The matrix_coffs is information that represents a transformation matrix for a transformation from the RGB to the luminance/color difference. In other words, in case of matrix_coffs=0, it represents that the color space of the image is sRGB.

The control unit 511 performs a process that is basically the same as that of the control unit 141. When compared with the configuration of the control unit 141, the control unit 511 includes a bit depth difference calculating unit 521 instead of the bit depth difference calculating unit 151, includes a bit shift control unit 522 instead of the bit shift control unit 152, and, similarly to the case of the control unit 141, includes the weighting coefficient setting unit 153. In addition, the control unit 511 includes a color space determining unit 523.

The bit depth difference calculating unit 521, similarly to the case of the bit depth difference calculating unit 151, calculates a bit depth, difference (delta_bitdepth) between the components. However, the bit depth difference calculating unit 521, differently from the case of the bit depth difference calculating unit 151, does not supply the calculated bit depth difference (delta_bitdepth) between the components to the left shift unit 163 (the prediction unit 412 does not include the left shift unit 163).

The bit shift control unit 522, similarly to the case of the bit shift control unit 152, controls the calculation, performed by the prediction unit 412. However, in a case where the bit depth difference (delta_bitdepth) of the residual data between components calculated by the bit depth difference calculating unit 521 is zero, the bit shift control unit 522 causes the prediction unit 412 not to perform scaling of the bit depth but to calculate the predicted residual data. On the other hand, in a case where the bit depth difference (delta_bitdepth) of the residual data between the components calculated by the bit depth difference calculating unit 521 is positive, the bit shift control unit 522 causes the prediction unit 412 to perform scaling of the bit depth to calculate predicted residual data. In contrast, to this, in a case where the bit depth difference (delta_bitdepth) of the residual data between the components calculated by the bit-depth difference calculating unit 521 is negative, the bit shift control unit 522 prohibits a residual prediction (causes no calculation of predicted residual data) by controlling the prediction unit 412.

In addition, the bit shift control unit 522 controls calculation performed by the prediction unit 412 based on a result of the determination of a color space of the image that, is acquired, by the color space determining unit 523, For example, in a case where the color space of the image is determined to be the RGB by the color space determining unit 523, the bit shift control unit 522 prohibits a residual prediction (the predicted, residual data is not calculated) by controlling the prediction unit 412

The color space determining unit 523 determines a color space of the image by referring to the information (matrix_coffs) representing the color space of the image supplied from the VUI processing unit 501, For example, in case of matrix_coffs=0, the color space determining unit 523 determines that the color space of the image is the RGB.

In other words, in case of the example of this embodiment, similarly to the case of the third embodiment, when the bit depth difference (delta_bitdepth) of the residual data between the components calculated by the bit depth difference calculating unit 421 is negative, the scaling of the bit depths, in other words, a bit shift used for arranging the bit depths to be uniform between the components is not performed. Accordingly, as described in the third embodiment, compared to the configuration of the prediction unit 142, the left shift, unit 163 is not included in the prediction unit 412.

<Flow of Residual Predicting Process>

In case of this embodiment, the coding process is performed similarly to that, of the case of the first embodiment. An example of the flow of the residual predicting process performed in this embodiment will be described with reference to a flowchart illustrated in FIG. 29.

Figure 29:
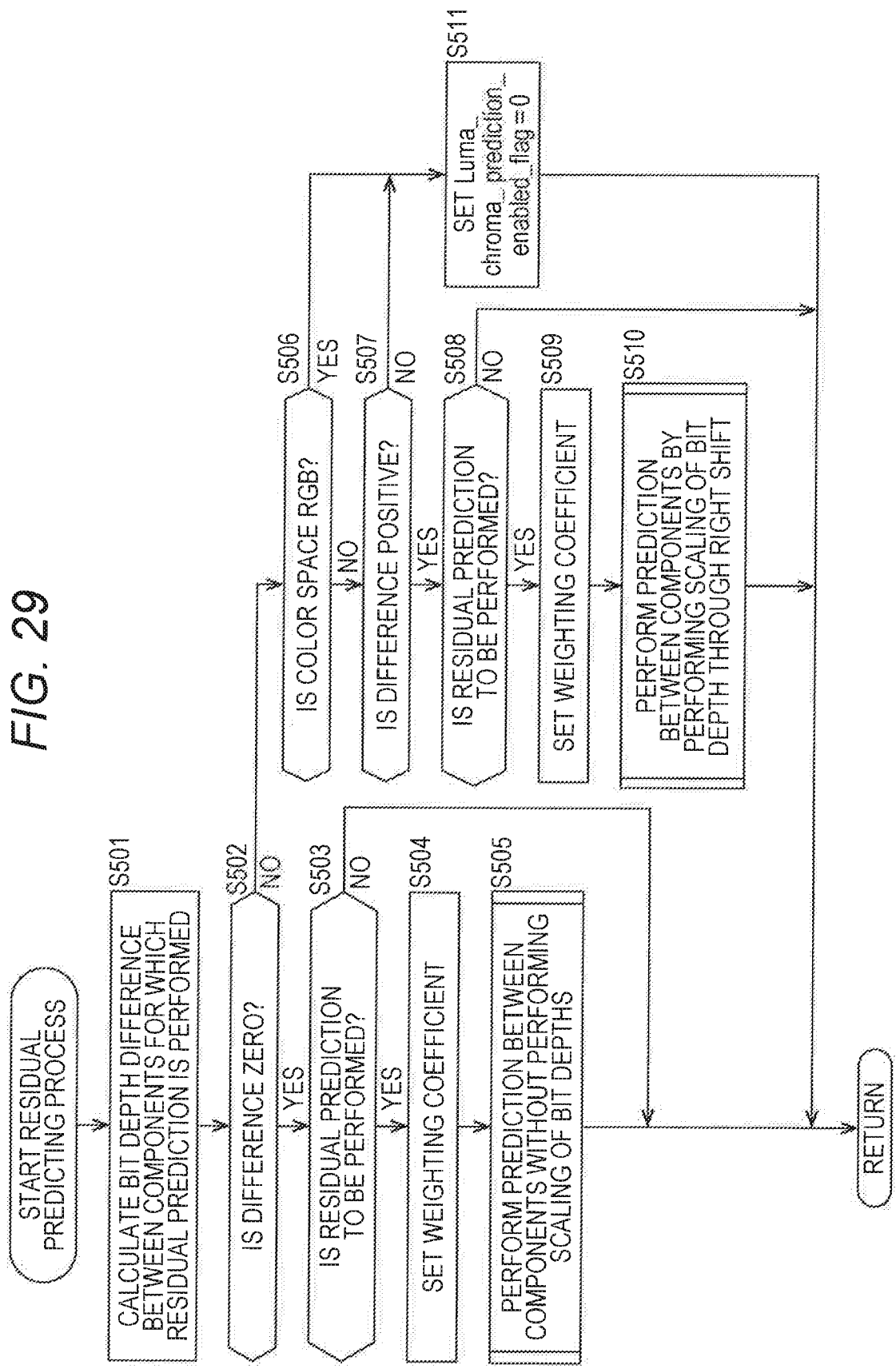
FIG. 29 is a flowchart that illustrates an example of the flow of a residual predicting process.

Also in the case of the example illustrated in FIG. 29, when a residual predicting process is started, in Step S501, the bit depth difference calculating unit 521 calculates a bit depth difference between components for which, the residual prediction is performed. In other words, the bit depth difference calculating unit 521 performs calculation represented in Equation (4) and calculates a bit depth difference (delta_bitdepth) between the luminance component (Y) and the color difference component (Cr or Cb). In a case where bit depth differences are different between the color difference component (Cr) and the color difference component (Cb), the bit depth differences (delta_bitdepth) are calculated.

In Step S502, the bit shift control unit 522 determines whether or not the bit depth difference (delta_bitdepth) calculated in Step S501 is zero. In a case where zero is determined, the process proceeds to Step S503. In such a case, a bit shift, is not performed, but the residual prediction is performed as represented in Equation (3).

In other words, processes of Step S503 to Step S505 are performed similarly to those of Step S123 to Step S125 of the residual predicting process according to the first embodiment. Then, in a case where the process of Step S505 ends or it is determined in Step S503 that a residual prediction is not performed, the residual predicting process ends, and the process is returned to the process illustrated in FIG. 5.

In addition, in Step S502, in a case where the bit depth difference (delta_bitdepth) is determined not to be zero, the process proceeds to Step S506.

In Step S506, the color space determining unit 523 determines whether or not the color space of the image is the RGB based on the information (matrix_coffs) representing the color space of the image acquired from the VUI processing unit 501. In a case where the color space is determined not to be the RGB, the process proceeds to Step S507.

In Step. S507, the bit shift control unit 522 determines whether or not the bit depth difference (delta_bitdepth) calculated in Step S501 is positive. In a case where being positive is determined, the process proceeds to Step S508. In such a case, a residual prediction is performed as represented in Equation (6) (scaling through a right shift, is performed).

In other words, the processes of Step S508 to Step S510 are performed similarly to the processes of Step S127 to Step 3129 of the residual predicting process according to the first embodiment. Then, in a case where the process of Step S510 ends or it is determined in Step S508 that a residual prediction is not performed, the residual predicting process ends, and the process is returned to the process illustrated in FIG. 5.

On the other hand, in Step S506, in a case where the color space is determined to be the RGB or the bit depth difference (delta_bitdepth) is determined not to be positive (determined to be negative) in Step S507, the process proceeds to Step S511.

In Step S511, the bit shift control unit 522 sets the value of information (for example, luma_chroma_prediction_enabled_flag) used for controlling whether or not a residual prediction is performed to a value representing that a residual prediction (residual restoration) is not performed (is prohibited). For example, the bit shift control unit 522 may set the value of luma_chroma_prediction_enabled_flag to zero.

When the process of Step S511 ends, the residual predicting process ends, and the process is returned to the process illustrated in FIG. 5.

By configuring as such, in a case where the bit depth difference of the residual data between the components is negative, in other words, the color difference component has a bit depth larger than the luminance component, and there is a possibility that sufficient effect is not acquired (the coding efficiency cannot be sufficiently improved) even in a case where a residual prediction is performed, the residual prediction may be configured not to be performed. In addition, only for a color space for which sufficient effect according to a residual prediction is acquired (the coding efficiency can be sufficiently improved), the residual prediction can be performed. Therefore, according to the image coding apparatus 100, since an unnecessary residual prediction can be omitted, a decrease in the coding efficiency can be suppressed, and an increase in the processing load can be suppressed.

<Header Acquiring Unit and Residual Restoring Unit>

Also in this case, the image decoding apparatus 200 may have a configuration that is basically the same as that of the case of the first embodiment.

Figure 30:
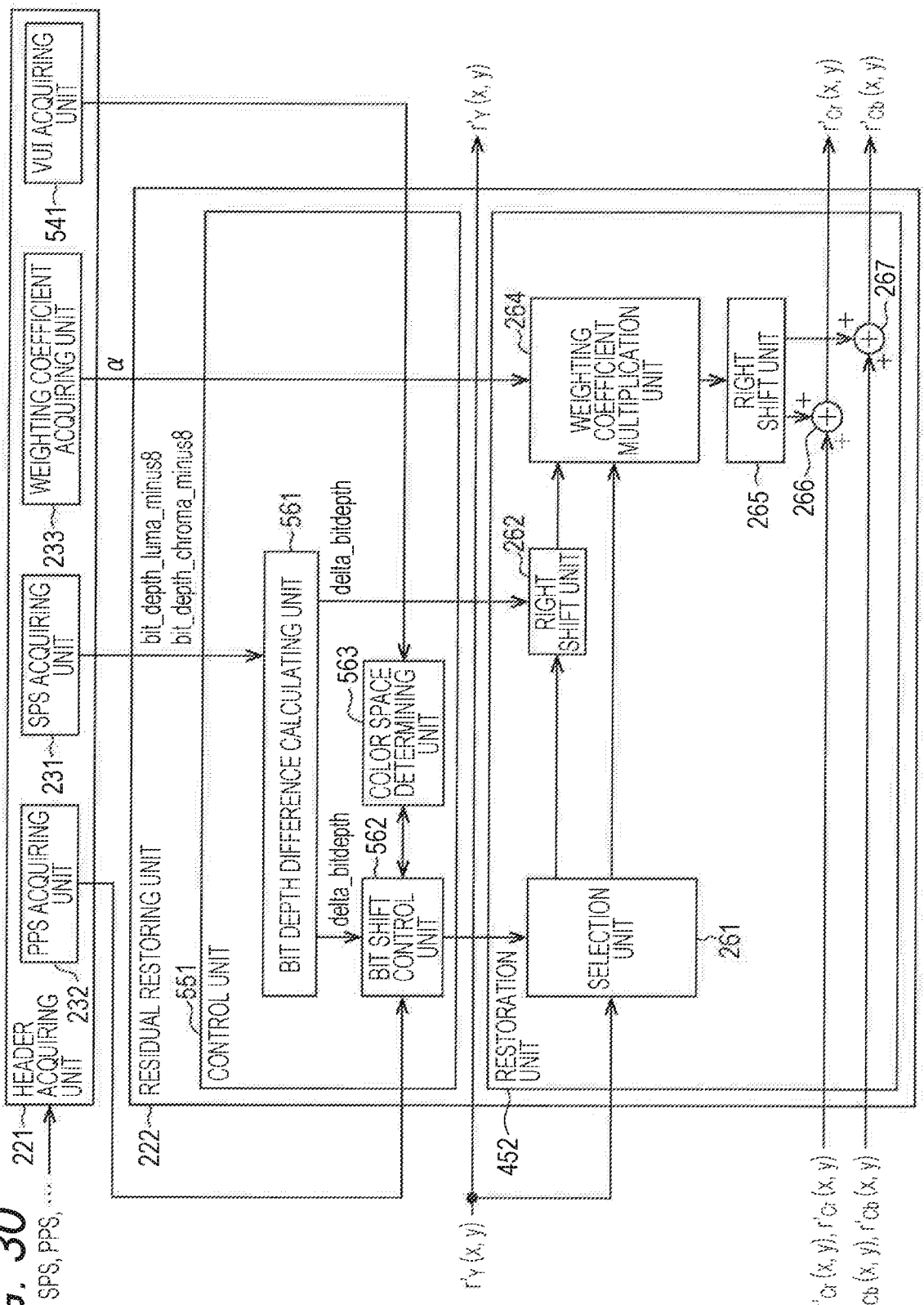
FIG. 30 is a block diagram that illustrates an example of the main configurations of a header acquiring unit and a residual restoring unit.

FIG. 30 is a block diagram that illustrates an example of the main configurations of the header acquiring unit 221 and the residual restoring unit 222 of this case. As illustrated in FIG. 30, in this case, when compared to the case of the first embodiment, the header acquiring unit 221 further includes a VUI acquiring unit 541. In addition, when compared to the case of the first embodiment, the residual restoring unit 222 includes a control unit 551 instead of the control unit 241 and includes the restoration unit 452 instead of the restoration unit 242.

The VUI acquiring unit 541 acquires VUI that is data relating to the display of a video from the video parameter-set (VPS) or the sequence parameter set (SPS) supplied from the coding side, acquires the information (matrix, coffs) representing the color space of the image included in the VUI, and supplies the acquired information to the residual restoring unit 222 (a color space determining unit 563 to be described later).

The control unit 551 performs a process that is basically the same as that of the control unit 241, When compared to the configuration of the control unit 241, the control unit 551 includes a bit depth difference calculating unit 561 instead of the bit depth difference calculating unit 251 and includes a bit shift control unit 562 instead of the bit shift control unit 252. In addition, the control unit 551 includes a color space determining unit 563.

The bit depth difference calculating unit 561, similarly to the case of the bit depth difference calculating unit 251, calculates a bit depth difference (delta_bitdepth) between components. However, differently from the case of the bit depth difference calculating unit 251, the bit depth difference calculating unit 561 does not supply the calculated bit depth difference (delta_bitdepth) between the components to the left shift unit 263 (the restoration unit 452 does not include the left shift unit 263).

The bit shift control unit 562, similarly to the case of the bit shift control unit 252, controls the calculation performed by the restoration unit 452. However, in a case where the bit depth difference (delta_bitdepth) of the residual data between components calculated by the bit depth difference calculating unit 561 is zero, the bit shift control unit 562 causes the restoration unit. 452 not to perform scaling of the bit depth but to restore the residual data. On the other hand, in a case where the bit depth difference (delta_bitdepth) of the residual data between the components calculated by the bit depth difference calculating unit 561 is positive, the bit shift control unit 562 causes the restoration unit 452 to perform scaling of the bit depth to restore the residual data. In contrast to this, in a case where the bit depth difference (delta_bitdepth) of the residual data between the components calculated by the bit depth difference calculating unit. 561 is negative, the bit shift control unit. 562 omits residual restoration (omits the restoration of the residual data) by controlling the restoration unit 452.

In addition, the bit shift control unit 562 controls calculation performed by the restoration unit 452 based on a result of the determination of the color space of the image that is performed by the color space determining unit 563. For example, in a case where the color space of the image is determined to be the RGB by the color space determining unit 563, the bit shift control unit 562 omits residual restoration (the restoration of the residual data is omitted) by controlling the restoration unit 452.

The color space determining unit 563 determines the color space of the image by referring to the information (matrix_coffs) representing the color space of the image supplied from the VUI acquiring unit 541. For example, in case of matrix_coffs=0, the color space determining unit 563 determines that the color space of the image is the RGB.

In other words, in case of the example of this embodiment, similarly to the case of the third embodiment, when the bit depth difference (delta_bitdepth) of the residual data between the components calculated by the bit depth difference calculating unit. 561 is negative, the scaling of the bit depths, in other words, a bit shift, used for arranging the bit depths to be uniform between the components is not performed. Accordingly, compared to the configuration of the restoration unit 242, the left shift unit 263 is not included in the restoration unit 452.

<Flow of Residual Restoring Process>

In case of this embodiment, the decoding process is performed similarly to the case of the first embodiment. An example of the flow of the residual restoring process in the case of this embodiment will be described with reference to a flowchart illustrated in FIG. 31.

Figure 31:
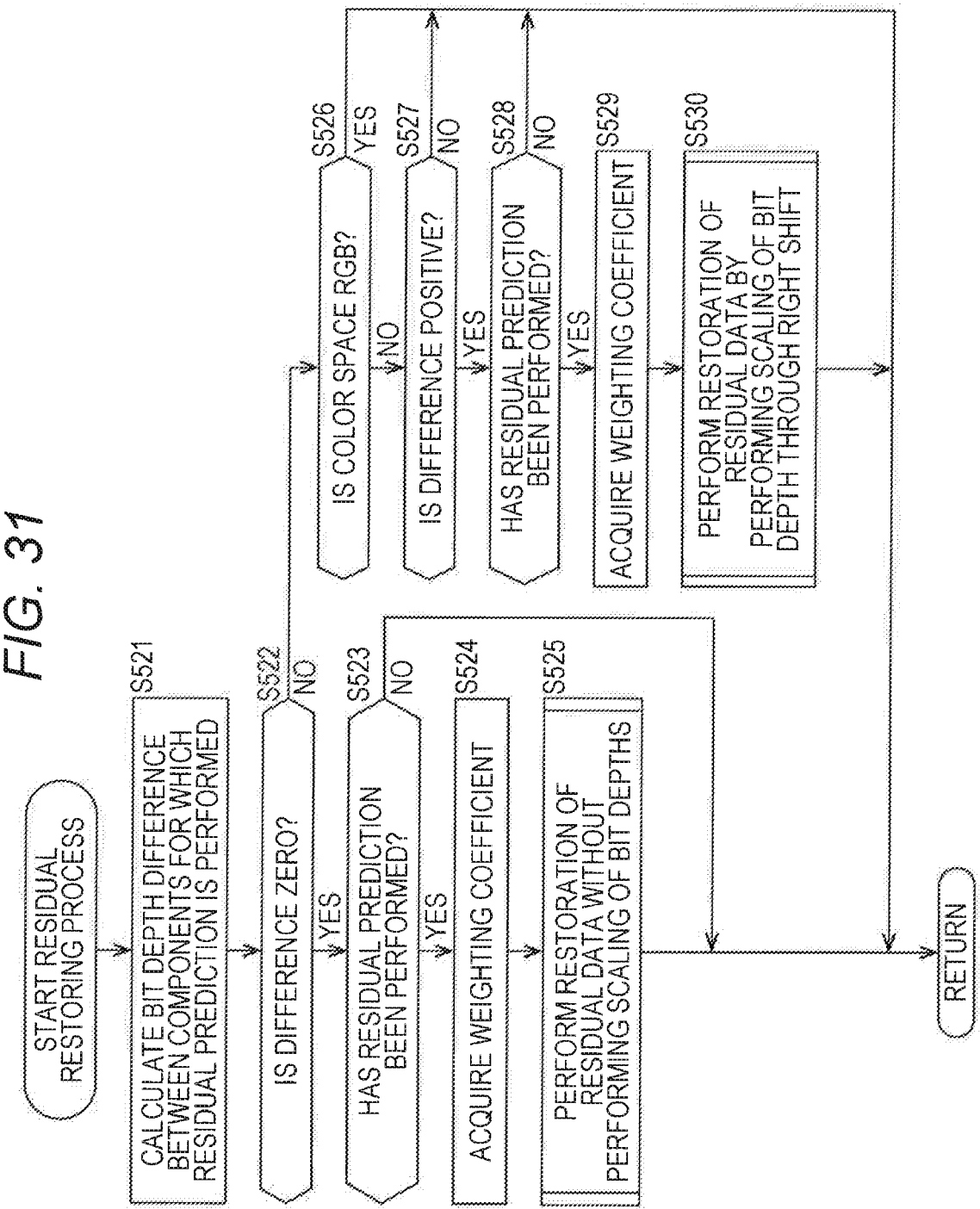
FIG. 31 is a flowchart chat illustrates an example of the flow of a residual restoring process.

Also in case of the example illustrated in FIG. 31, when a residual restoring process is started, in Step S521, the bit depth difference calculating unit 561 calculates a bit depth difference between components for which the residual prediction has been performed. In other words, the bit depth difference calculating unit 561 performs calculation represented, in Equation (10) and calculates a bit depth difference (delta_bitdepth) between the luminance component (Y) and the color difference component (Cr or Cb). In a case where bit depth differences are different between the color difference component (Cr) and the color difference component (Cb), the bit depth differences (delta_bitdepth) are calculated.

In Step S522, the bit shift control unit 562 determines whether or not the bit depth difference (delta_bitdepth) calculated, in Step S521 is zero. In a case where zero is determined, the process proceeds to Step S523. In such a case, a bit shift is not performed, and the residual, restoration is performed as represented in Equation (9).

In other words, the processes of Step S523 to Step S525 are performed similarly to the processes of Step S223 to Step S225 of the residual predicting process according to the first embodiment. Then, in a case where the process of Step S525 ends or it is determined in Step S523 that a residual prediction is not performed, the residual restoring process ends, and the process is returned to the process illustrated in FIG. 12.

On the other hand, in Step S522, in a case where the bit depth difference (delta_bitdepth) is determined not to be zero, the process proceeds to Step S526.

In Step S526, the color space determining unit 563 determines whether or not the color space of the image is the RGB based on the information (matrix_cofs) representing the color space of the image acquired from the VUI acquiring unit 541. In a case where the color space is determined not to be the RGB, the process proceeds to Step S527.

In Step S527, the bit shift control unit 562 determines whether or not the bit depth difference (delta_bitdepth) calculated in Step S521 is positive. In a case where being positive is determined, the process proceeds to Step S528. In such a case, a residual prediction is performed as represented in Equation (12) (scaling through a right shift is performed).

In other words, the processes of Step S528 to Step S530 are performed similarly to the processes of Step S227 to Step S229 of the residual predicting process according to the first embodiment. Then, in a case where the process of Step S530 ends or it is determined in Step S528 that a residual prediction is not performed, the residual restoring process ends, and the process is returned to the process illustrated in FIG.

In addition, also in a case where the color space is determined to be the RGB in Step S526 or the bit depth, difference (delta_bitdepth) is determined, not to be positive (determined to be negative) in Step S527, the scaling of the bit depths is not performed, and the residual restoration is omitted. Accordingly, also in this case, the residual restoring process ends, and the process is returned to the process illustrated in FIG. 12.

By configuring as such, in a case where the bit depth difference of the residual data between the components is negative, in other words, the color difference component has a bit depth larger than the luminance component, and there is a possibility that sufficient effect is not acquired (the coding efficiency cannot be sufficiently improved) even in a case where a residual prediction is performed, the residual prediction is not performed, and the residual restoration may be configured not to be performed in accordance therewith. In addition, only for a color space in which sufficient effect of performing the residual prediction is acquired (the coding efficiency can be sufficiently improved), the residual prediction is performed, and residual restoration may be configured not to be performed in accordance therewith. Therefore, according to the image decoding apparatus 200, since unnecessary residual restoration can be omitted, a decrease in the coding efficiency can be suppressed, and an increase in the processing load can be suppressed.

5. Fifth Embodiment

Communization of Weighting Coefficient

As above, while the weighting coefficient setting unit. 153 has been described to independently set the weighting coefficient α for each component, the setting of the weighting coefficient is not limited thereto. Thus, the weighting coefficient setting unit 153 may be configured to set a weighting coefficient α that is common to a plurality of components. For example, the weighting coefficient setting unit 153 may be configured to set a weighting coefficient α that is common to both the color difference component Cr and the color difference component Cb.

<Syntax and Semantics>

FIG. 32 illustrates an example of the syntax of a TU transmitting a weighting coefficient α in a case where the weighting coefficient α is independently set for each component. In such a case, as in a portion illustrated in FIG. 32 to which a pattern of slanted lines is applied, a determination of a condition for the transmission r of the weighting coefficient α is performed for each of the color difference components Cr and Cb, and the weighting coefficient α is transmitted (calling luma_chroma_pred( )) for each of the color difference components Cr and Cb. In the transmission of the weighting coefficient α, it is necessary to designate a component number (c) of the color difference component (Chroma) (for example, "c" of luma_chroma_pred(x0, y0, c); in the example illustrated in FIG. 32, c="0" or "1").

An example of the syntax of the residual prediction (Luma-chroma prediction) is illustrated in FIG. 33. As illustrated in FIG. 33, also in this syntax, it is necessary to designate the component number (c) of the color difference component (Chroma).

In addition, examples of the semantics are illustrated in FIGS. 34 and 35. As illustrated in such diagrams, also in the semantics, it is necessary to designate the component number (c) of the color difference component (Chroma).

In contrast to this, FIG. 36 illustrates an example of the syntax of a TU transmitting a weighting coefficient α in a case where the weighting coefficient α is commonized. In such a case, as in a portion illustrated in FIG. 36 to which a pattern of slanted lines is applied, a determination of a condition for the transmission r of the weighting coefficient α and the transmission (calling luma_chroma_pred( )) of the weighting coefficient α may be performed once. Thus, by configuring as such, the loads of the image coding apparatus 100 and the image decoding apparatus 200 can be decreased, and the amount of information to be transmitted can be decreased, whereby the coding efficiency can be improved. In addition, since it is not necessary to designate the component number (c) of the color difference component (Chroma), the coding efficiency can be further improved.

An example of the syntax of the residual prediction (Luma-chroma prediction) of such a case is illustrated in FIG. 37. As illustrated in FIG. 37, also in this syntax, since it is not necessary to designate the component number (c) of the color difference component (Chroma), the coding efficiency can be further improved.

Examples of the semantics of such a case are illustrated in FIGS. 36 and 39. As illustrated, in the drawing's, also in the semantics, it is unnecessary to designate the component number (c) of the color difference component (Chroma).

Therefore, the loads of the image coding apparatus 100 and the image decoding apparatus 200 can be decreased.

The present technology can be applied to all the image coding apparatuses and image decoding apparatuses capable of coding/decoding image data as an applicable range thereof.

In addition, the present: technology, for example, may be applied to an image coding apparatus and an image decoding apparatus that are used when image information (bit stream) compressed using an orthogonal transform such as a discrete cosine transform and motion compensation, like MPH-G, H. 26x, or the like, is received through a network medium such as satellite broadcast, cable television, the Internet, or a mobile phone. In addition, the present technology may be applied to an image coding apparatus and an image decoding apparatus that are used when information is processed on a storage medium such as an optical disc, a magnetic disk, or a flash memory.

6. Sixth Embodiment

Figure 40:
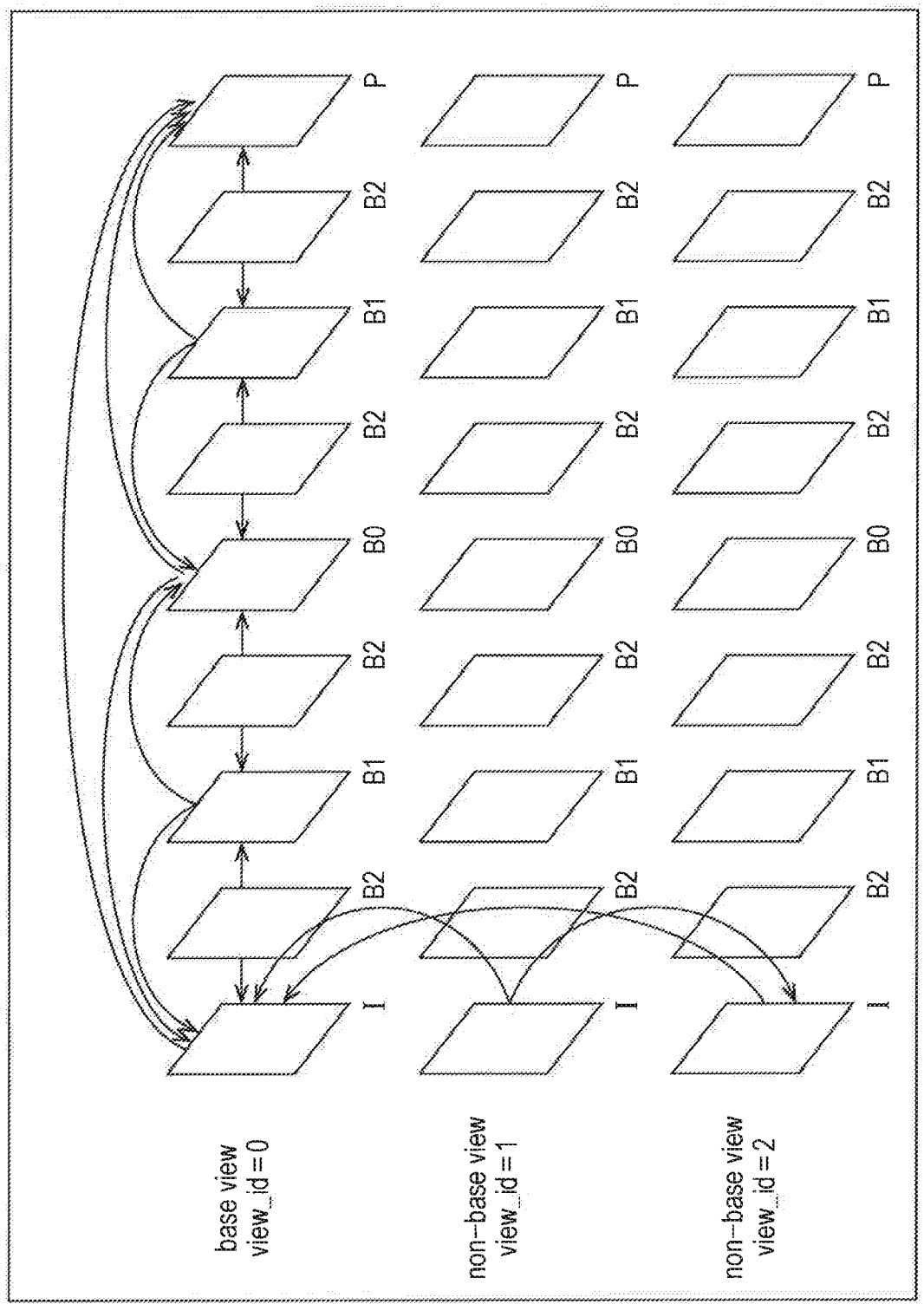
FIG. 40 is a diagram that illustrates an example of a multiple viewpoint image coding system.

Application to Multiple Viewpoint Image Coding and Multiple Viewpoint Image Decoding A series of the processes described above may be applied to multiple viewpoint image coding/multiple viewpoint image decoding. FIG. 40 is a diagram, that illustrates an example of a multiple viewpoint image coding system.

As illustrated in FIG. 40, a multiple viewpoint image includes images of multiple viewpoints (views). The multiple views of the multiple viewpoint image are configured by a base view that is coded and decoded by using only the image of the base view without: using information of another view and a non-base view that is coded and decoded using information of other views. For coding/decoding the non-base view, information of the base view or information of any other non-base view may be used.

In a case where the multiple viewpoint image as in the example illustrated in FIG. 40 is coded and decoded, while an image of each viewpoint is coded and decoded, the methods described above in the first to fifth embodiments may be applied to the coding and decoding of each viewpoint. In such a case, a decrease in the coding efficiency of each viewpoint can be suppressed. In other words, similarly, also in the case of a multiple viewpoint, image, a decrease in the coding efficiency can be suppressed.

<Multiple Viewpoint Image Coding Apparatus>

Figure 41:
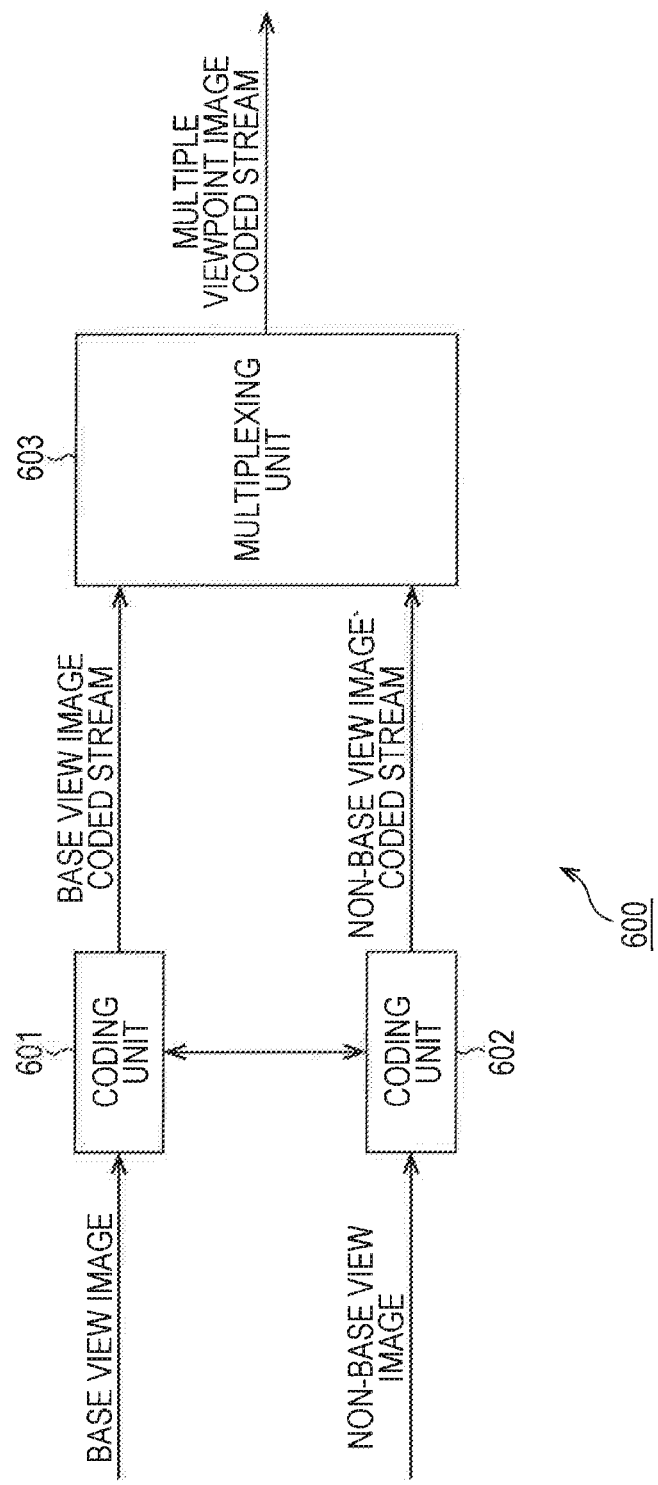
FIG. 41 is a diagram that illustrates an example of the main configuration of a multiple viewpoint image coding apparatus according to the present technology.

FIG. 41 is a diagram that, illustrates a multiple viewpoint image coding apparatus performing the multiple viewpoint image coding described above. As illustrated in FIG. 41, the multiple viewpoint image coding apparatus 600 includes: a coding unit 601; a coding unit 602; and a multiplexing unit 603.

The coding unit 601 codes a base view image, thereby generating a base view image coded stream. In addition, the coding unit. 602 codes a non-base view image, thereby generating a non-base view image coded stream. The multiplexing unit 603 multiplexes the base view image coded stream generated by the coding unit 601 and the non-base view image coded stream generated by the coding unit 602, thereby generating a multiple viewpoint image coded, stream.

For example, as the coding unit. 601 and the coding unit 602 of the multiple viewpoint image coding apparatus 600, the image coding apparatus 100 described, above may be applied. In such a case, also in the coding of a multiple viewpoint image, various methods described in the first to fifth embodiments can be applied. In other words, the multiple viewpoint image coding apparatus 600 can suppress a decrease in the coding efficiency of coding data of the multiple viewpoint image.

<Multiple Viewpoint Image Decoding Apparatus>

Figure 42:
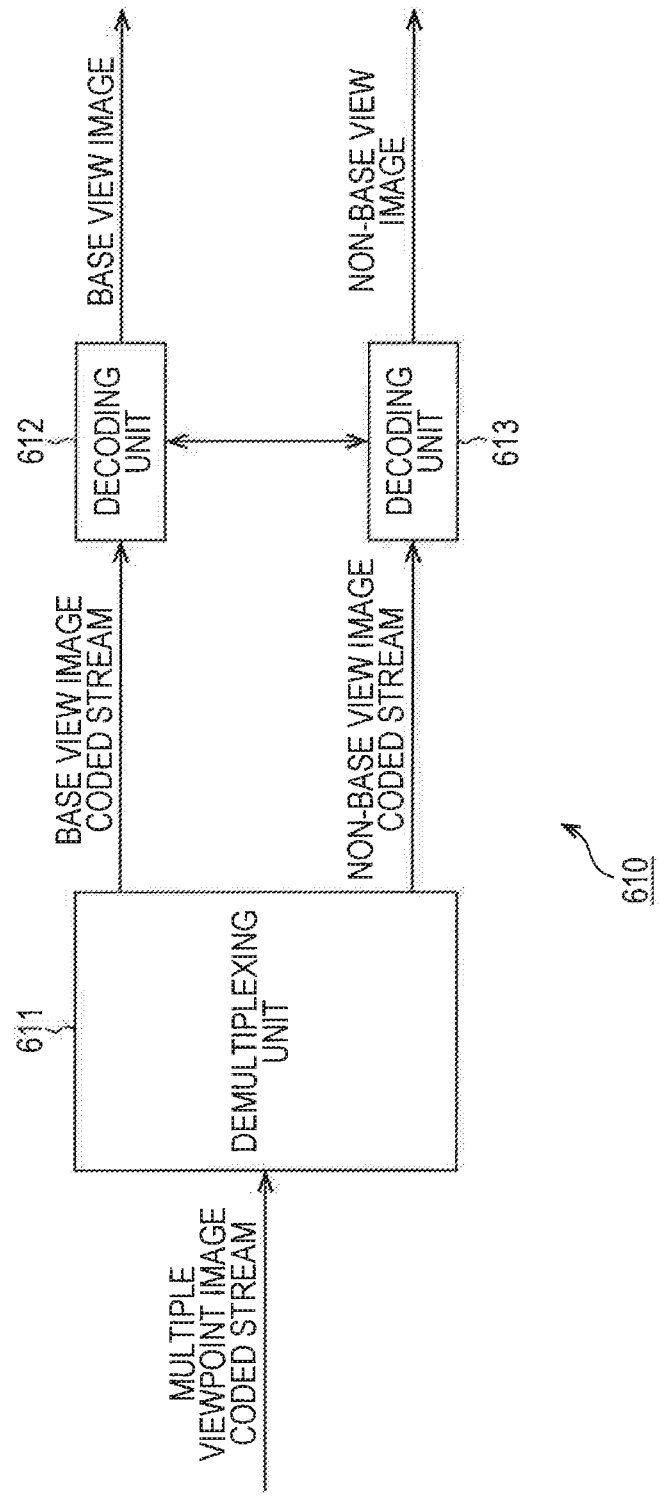
FIG. 42 is a diagram that, illustrates an example of the main configuration of a multiple viewpoint image decoding apparatus according to the present technology.

FIG. 42 is a diagram that illustrates a multiple viewpoint image decoding apparatus performing the multiple viewpoint image decoding described above. As illustrated in FIG. 42, the multiple viewpoint, image decoding apparatus 610 includes: a demultiplexing unit 611; a decoding unit 612; and a decoding unit 613.

The demultiplexing unit 611 demultiplexes a multiple viewpoint image coded stream acquired by multiplexing the base view image coded stream and the non-base view image coded stream, thereby extracting the base view image coded stream and the non-base view image coded stream. The decoding unit. 612 decodes the base view image coded stream extracted by the demultiplexing unit 611, thereby acquiring a base view image. The decoding unit 613 decodes the non-base view image coded stream extracted by the demultiplexing unit 611, thereby acquiring a non-base view image.

For example, as the decoding unit 612 and the decoding unit 613 of the multiple viewpoint image decoding apparatus 610, the image decoding apparatus 200 described above may be applied. In such a case, also in the decoding of coded data of a multiple viewpoint image, various methods described in the first to fifth embodiments can be applied. In other words, the multiple viewpoint image decoding apparatus 610 can correctly decode the coded data of a multiple viewpoint image coded using various methods described in the first: to fifth embodiments. Accordingly, the multiple viewpoint image decoding apparatus 610 cam suppress a decrease in the coding efficiency of coding data of the multiple viewpoint image.

7. Seventh Embodiment

Application to Hierarchical Image Coding/Hierarchical Image Decoding

Figure 43:
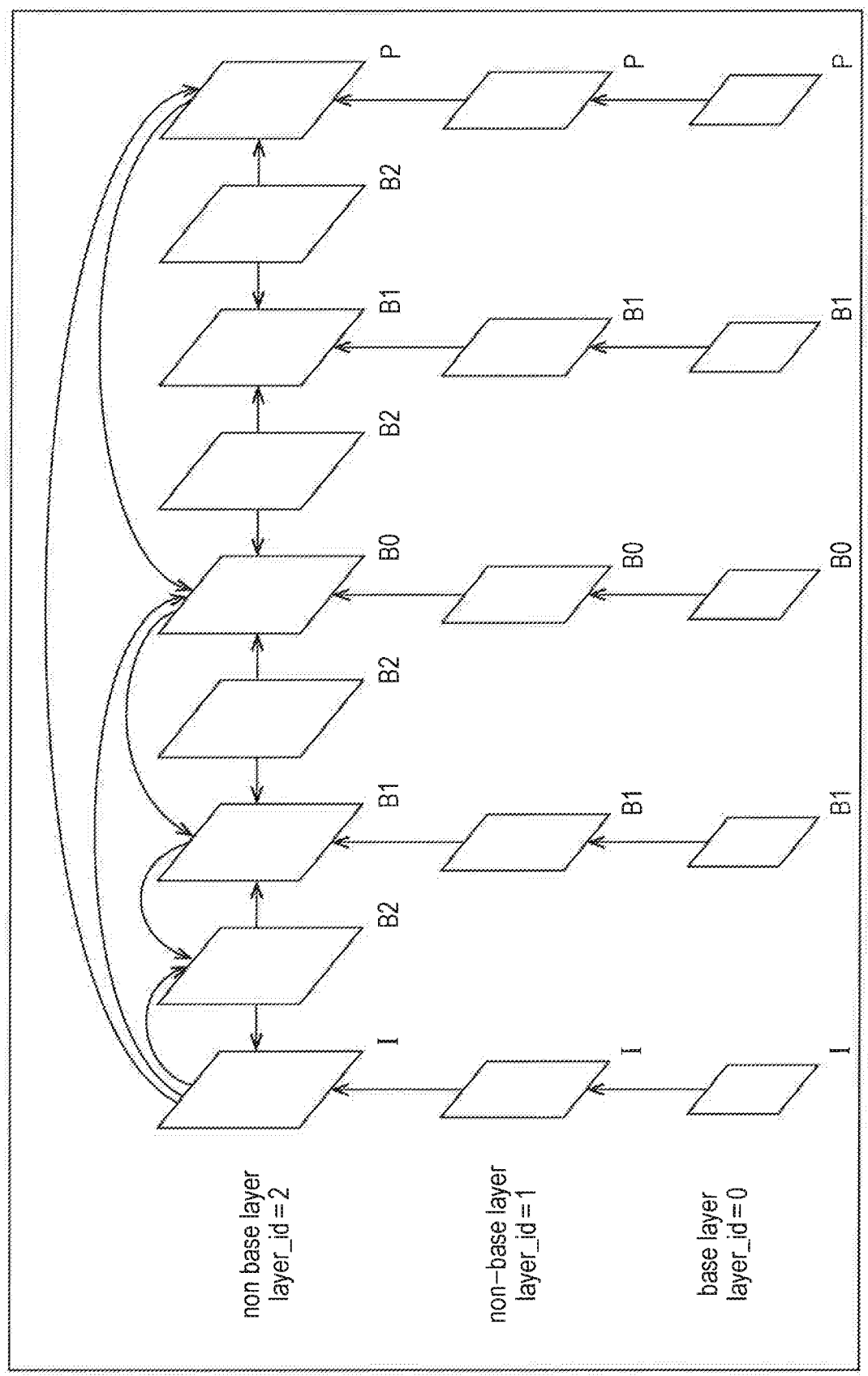
FIG. 43 is a diagram that illustrates an example of a hierarchical image coding system.

A series of processes described above can be applied to hierarchical image coding/hierarchical image decoding (scalable coding/scalable decoding). FIG. 43 illustrates an example of a hierarchical image coding system.

In the hierarchical coding (scalable coding), an image is configured as a plurality of layers (hieraxchize) so as to have a scalability function for a predetermined parameter, and image data is coded for each layer. The hierarchical image decoding (scalable decoding) is a decoding process corresponding to the hierarchical image coding.

As illustrated in FIG. 43, in the hierarchizing an image one image is divided into a plurality of hierarchies (layers) by referring to a predetermined, parameter having the scalability function. In other words, the hierarchized image (hierarchical image) includes a plurality of images (layers) having mutually-different values of the predetermined paraxtieter The plurality of layers of the hierarchical image is configured by a base layer coding and decoding using an image of the base layer without using an image of another layer and a non-base layer (also referred to as an enhancement layer) coding and decoding using an image of another layer. The non-base layer may be configured to use an image of the base layer or use an image of another non-base layer.

Generally, in order to reduce redundancy, the non-base layer is configured by data (differential data) of a differential image between the image of the non-base layer and an image of another layer. For example, in a case where one image is hierarchized into two layers including a base layer and a non-base layer (also referred as an enhancement layer), an image having a quality lower than the original image is acquired by using only the data of the case layer, and, the original image (in other words, a high-quality image) is acquired by composing the data of the base layer and the data of the non-base layer.

By hierarchizing the image in this way, images of various qualities can be easily acquired according to the situation. For example, as in a case where, to a terminal having a low processing capability such as a mobile phone, image compression information of only a base layer is transmitted, and a moving image having low spatial/temporal resolution or a low image quality is reproduced, and, to a terminal having a high processing capability such as a television set or a personal, computer, image compression information of an enhancement layer in addition to the base layer is transmitted, and a moving image having high, space/time resolution or a nigh image quality is reproduced, the image compression information according to the capability of the terminal or the network can be transmitted from a server without performing trans-code processing.

In a case where a hierarchical image as in the example illustrated in FIG. 43 is coded and decoded, while an image of each layer is coded and decoded, the methods described above in the first to fifth embodiments may be applied to the coding and decoding of each layer. In such a case, a decrease in the coding efficiency of each layer can be suppressed. In other words, similarly, also in the case of a hierarchical image, a decrease in the coding efficiency can be suppressed.

<Scalable Parameter>

Figure 44:
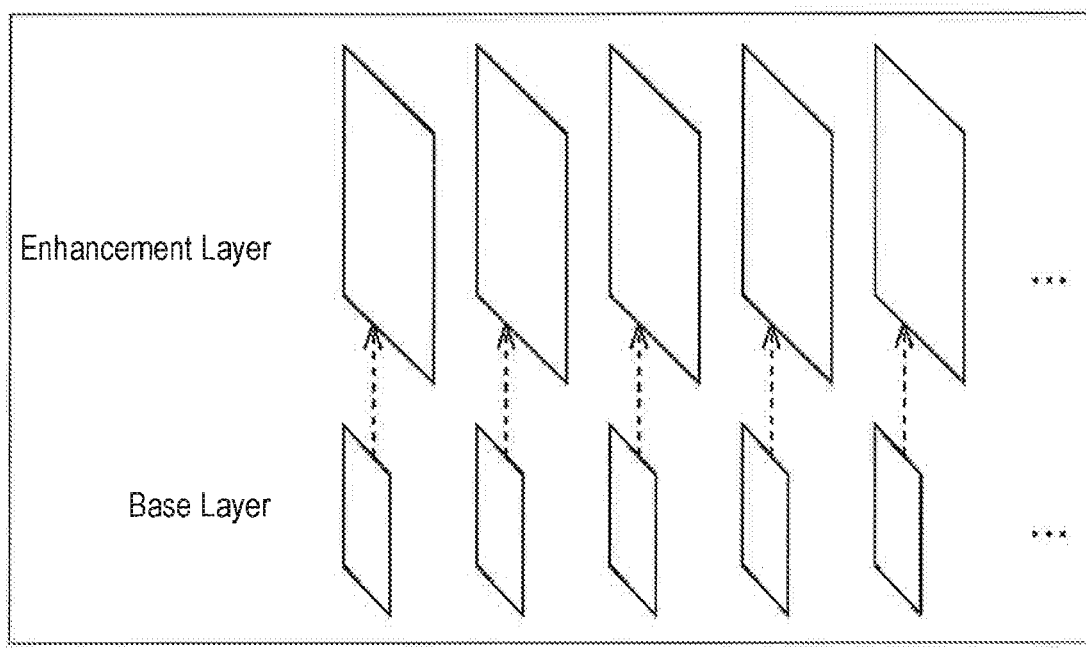
FIG. 44 is a diagram that illustrates an example of temporal scalable coding.

In such hierarchical image coding/hierarchical image decoding (scalable coding/scalable decoding), a parameter having the scalability function is arbitrary. For example, spatial resolution as illustrated in FIG. 44 may be set as the parameter (spatial scalability). In the case of this spatial scalability, the resolution of the image is different for each layer. In other words, as illustrated in FIG. 44, each, picture is hierarchized into two hierarchies of the base layer having spatial resolution lower than the original, image and the enhancement layer capable of acquiring the original image (original spatial resolution) by being composed with the image of the base layer. It is apparent that the number of hierarchies is ax, example, and the picture can be hierarchized using an arbitrary number of hierarchies.

Figure 45:
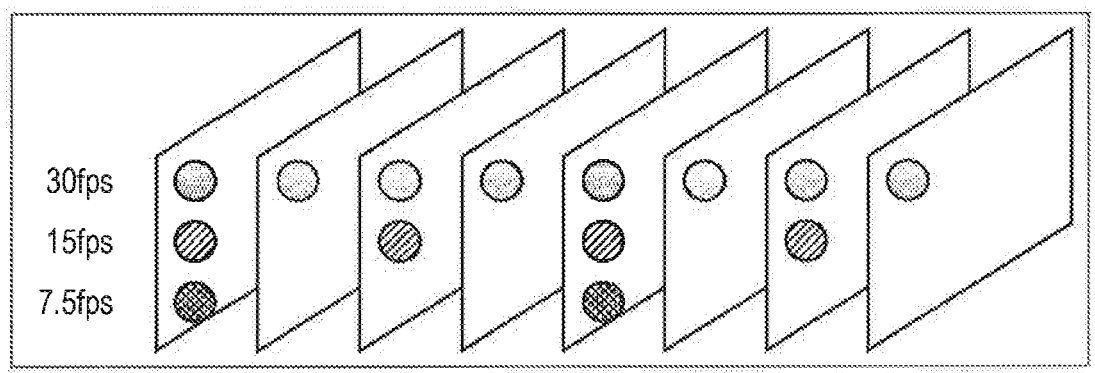

As a parameter having such, scalability, for example, temporal resolution as illustrated in FIG. 45 may be applied (temporal scalability). In the case of this temporal scalability, the frame rate is different for each layer. In other words, in this case, as illustrated in FIG. 45, since an image is hierarchized into layers having mutually-different frame rates, by adding a layer of a high frame rate to a layer of a low frame rate, a moving image having a higher frame rate can be acquired, and, by adding all the layers, the original moving image (the original frame rate) can be acquired. Here, the number of hierarchies is an example, and the image can be hierarchized for an arbitrary number of hierarchies.

Figure 46:
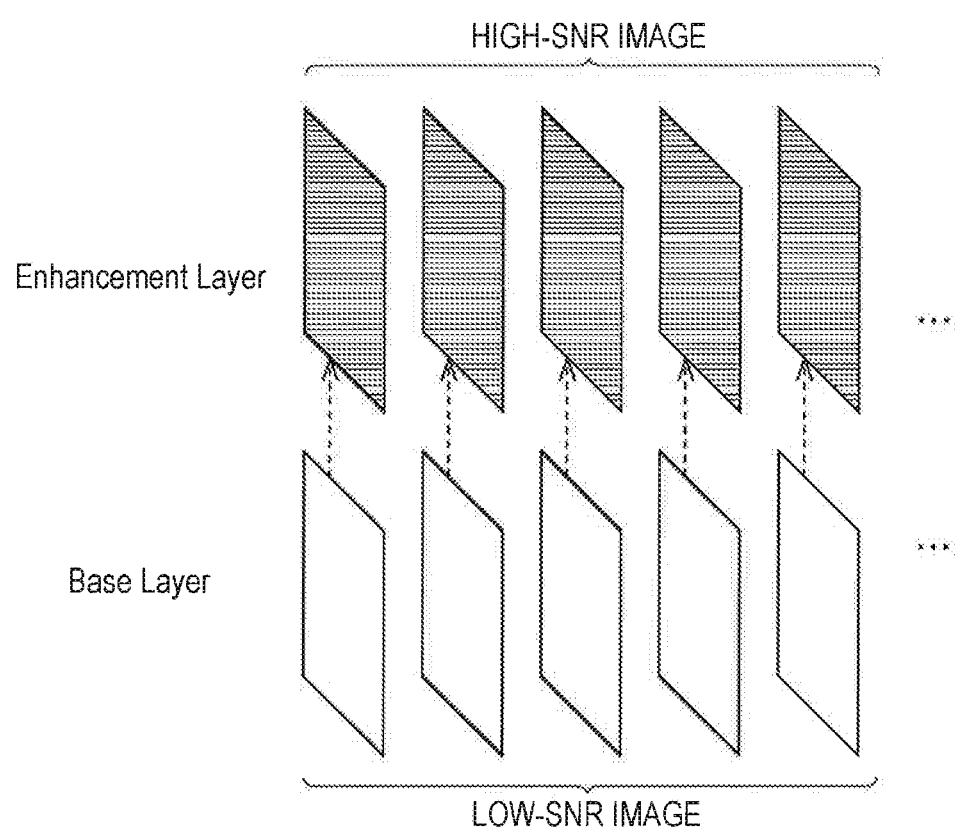
FIG. 46 is a diagram that illustrates an example of scalable coding of a signal-to-noise ratio.

In addition, as a parameter having such scalability, for example, a Signal to Noise ratio (SNR) may be applied (SNR scalability). In the case of this SNR scalability, the SN ratio is different for each layer. In other words, as illustrated in FIG. 46, each picture is hierarchized into two hierarchies including a base layer having an SNR lower than the original image and an enhancement layer capable of acquiring the original image (original SNR) by being composed with an image of she base layer. In other words, in the case layer image compression information, information relating to an image having a low PSNP is transmitted, and, by adding enhancement layer image compression, information thereto, an image having a high PSNP can be rebuilt. It is apparent that the number of hierarchies is an example, and the image can be hierarchized for an arbitrary number of hierarchies.

It is apparent that a parameter having the scalability may be other than, those of the examples described above. For example, there is bit-depth scalability in which a base layer is configured by an 8-bit image, and, by adding an enhancement layer thereto, an image of 10 bits is acquired.

In addition, there is chroma scalability in which a base layer is configured by a component image of the 4:2:0 format, and a component image of the 4:2:2 format is acquired by adding an enhancement layer thereto.

<Hierarchical Image Coding Apparatus>

Figure 47:
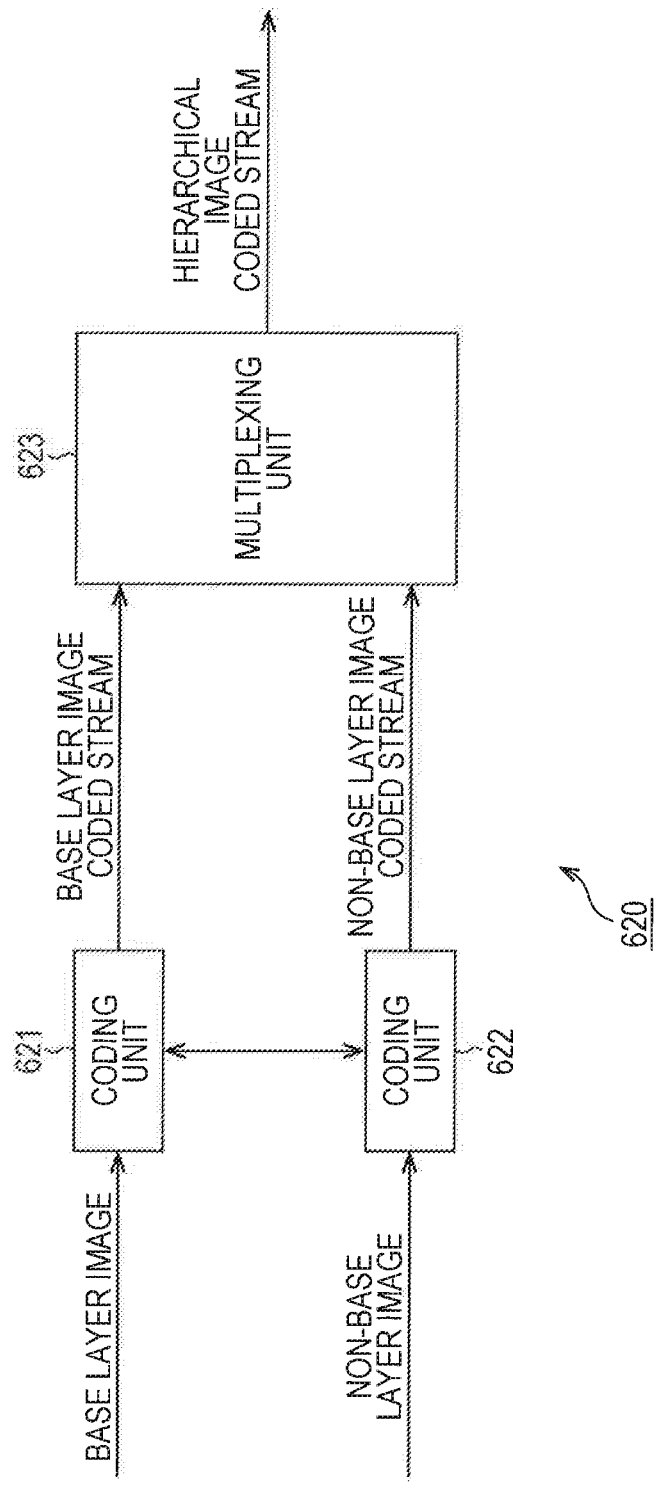
FIG. 47 is a diagram that, illustrates an example of the main configuration of a hierarchical image coding apparatus according to the present technology.

FIG. 47 is a diagram that illustrates a hierarchical image coding apparatus performing the hierarchical image coding described above. As illustrated in FIG. 47, the hierarchical image coding apparatus 620 includes: a coding unit 621; a coding unit 622; and a multiplexing unit 623.

The coding unit 621 codes a base layer image, thereby generating a base layer image coded stream. In addition, the coding unit 622 codes a non-base layer image, thereby generating a non-base layer image coded, stream. The multiplexing unit 623 multiplexes the base layer image coded stream generated by the coding unit 621 and the non-base layer image coded stream generated by the coding unit 622, thereby generating a hierarchical image coded stream.

For example, as the coding unit 621 and the coding unit 622 of the hierarchical image coding apparatus 620, the image coding apparatus 100 described above may be applied. In such a case, also in the coding of a hierarchical image, various methods described, in the first to fifth embodiments can be applied. In other words, the hierarchical image coding apparatus 620 can suppress a decrease in the coding efficiency of coding data of the hierarchical image.

<Hierarchical Image Decoding Apparatus>

Figure 48:
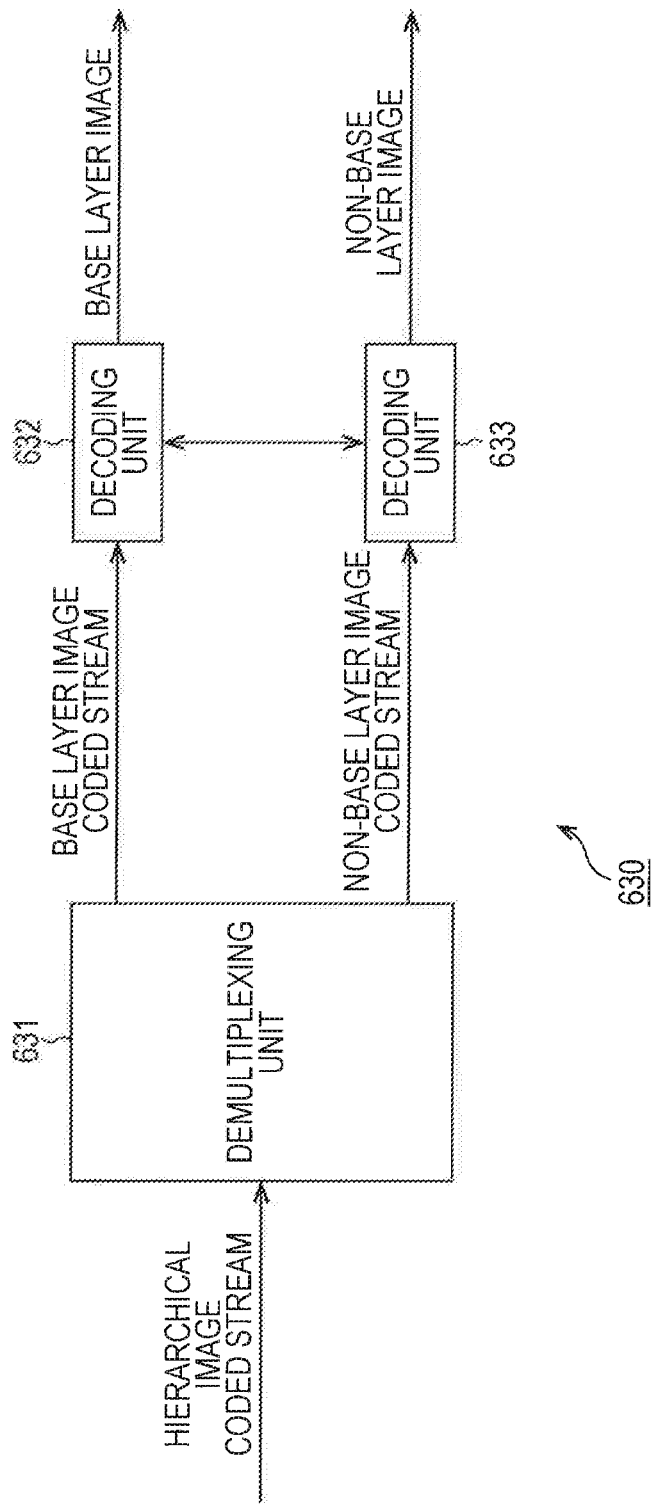
FIG. 48 is a diagram that illustrates an example of the main configuration of a hierarchical image decoding apparatus according to the present technology.

FIG. 48 is a diagram that, illustrates a hierarchical image decoding apparatus performing the hierarchical image decoding described above. As illustrated in FIG. 48, the hierarchical image decoding apparatus 630 includes: a demultiplexing unit 631; a decoding unit 632; and a decoding unit 633.

The demultiplexing unit 631 demultiplexes a hierarchical image coded stream in which the base layer image coded stream and the non-base layer image coded stream are multiplexed, thereby extracting a base layer image coded stream and a non-base layer image coded stream. The decoding unit 632 decodes the base layer image coded stream extracted by the demultiplexing unit 631, thereby acquiring a base layer-image. The decoding unit 633 decodes the non-base layer image coded stream extracted by the demultiplexing unit 631, thereby acquiring a non-base layer image.

For example, as the decoding unit 632 and the decoding unit 633 of the hierarchical image decoding apparatus 630, the image decoding apparatus 200 described above may be applied. In such a case, also in the decoding of the coded data of a hierarchical image, various methods described in the first to fifth embodiments can be applied. In other words, the hierarchical Image decoding apparatus 630 can correctly decode the image data of a hierarchical image coded using various methods described in the first to fifth embodiments. Accordingly, the hierarchical Image decoding apparatus 630 can suppress a decrease in the coding efficiency of coding data of the hierarchical image.

8. Eighth Embodiment

Computer

A series of the processes described above can be executed either by hardware or by software. In a case where the series of the processes is executed, by software, a program, configuring the software is installed to a computer, here, the computer includes a computer that is built in dedicated hardware, a computer such as a general-purpose personal computer that can execute various functions by installing various programs thereto, and the like.

Figure 49:
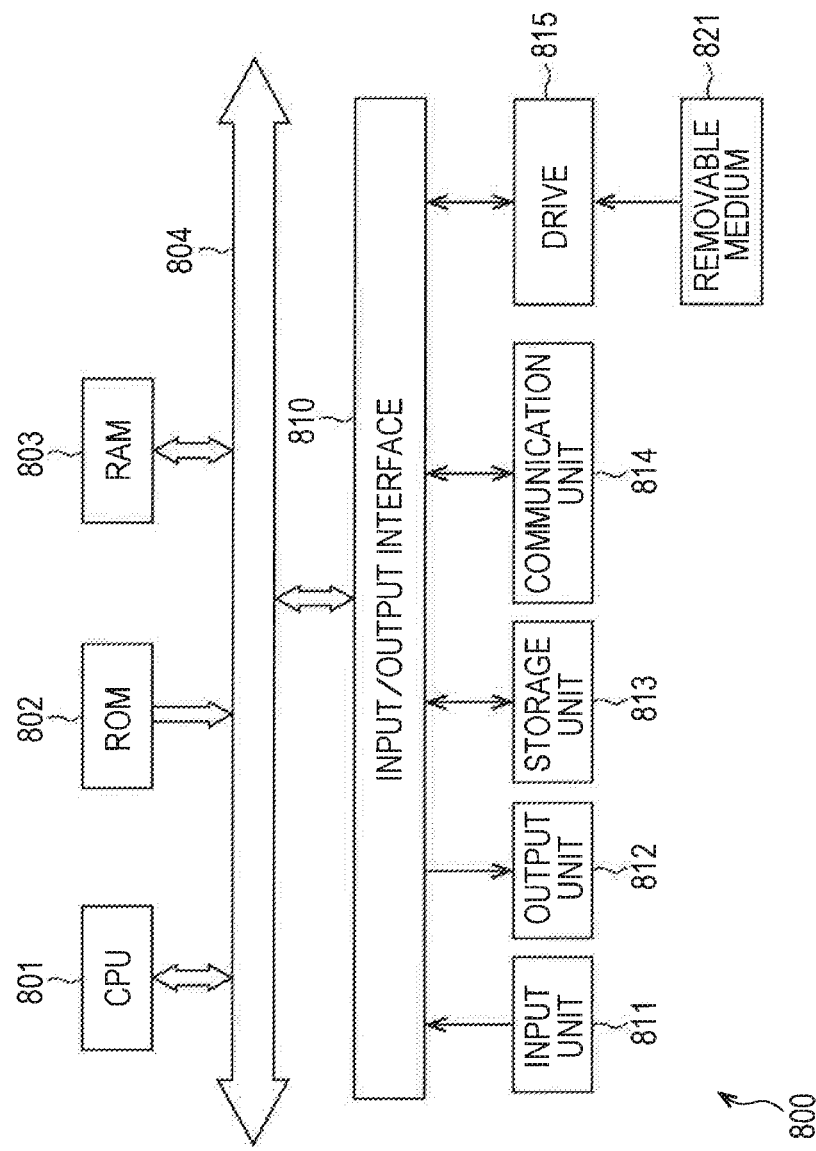
FIG. 49 is a block diagram that, illustrates an example of the main configuration of a computer.

FIG. 49 is a block diagram that illustrates an example of the hardware configuration of a computer that executes the series of processes described above according to a program.

In the computer 800 illustrated in rig. 49, a Central Processing Unit (CPU) 301, a Read. Only Memory (ROM) 302, and a Random Access Memory (RAM) 803 are interconnected through a bus 804.

In addition, an input/output interface 810 is connected to the bus 804. An input unit 811, an output unit 813, a storage unit 813, a communication unit 814, and a drive 815 are connected to the input/output interface 810.

The input unit 811, for example, is configured, by a keyboard, a mouse, a microphone, a touch panel, an input terminal, and the like. The output unit 812, for example, is configured, by a display, a speaker, an output terminal, and the like. The storage unit 813, for example, is configured by a hard disk, a RAM disk, a non-volatile memory, and the like. The communication unit 814, for example, is configured by a network interface. The drive 815 drives a magnetic disk, an optical disc, a magneto-optical disk, or a removable medium 821 such as a semiconductor memory.

In the computer configured as above, the CPU 801, for example, loads a program stored in the storage unit 813 into the RAM 803 through the input/output interface 810 and the bus 304 and executes the loaded program, thereby executing the series of the processes described above. In addition, data required for the CPU 801 to execute various processes and the like are appropriately stored in the RAM 803.

The program executed by the computer (CPU 601), for example, may be used with being recorded, on a removable medium 321 as a package medium or the like. In such a case, by loading the removable medium 821 into the drive 815, the program cam be installed to the storage unit 813 through the input/output interface 310.

In addition, the program can be provided through a wired or wireless transmission medium such as a local area network, the Internet, or digital, satellite broadcast. In such a case, the program may be received by the communication unit 814 and be installed to the storage unit 813.

Furthermore, the program can be installed to the ROM 802 or the storage unit 813 in advance.

In addition, the program executed by the computer may be a computer that executes the processes in a time series along the sequence described in this specification or a program that executes the processes in a parallel manner or at necessary timing such as at the timing of being called.

Furthermore, in this specification, a step describing the program recorded on a recording medium includes not only a process performed in a time series along the described sequence but also a process that is executed in a parallel manner or an individual manner without being necessarily processed, in a time series.

In addition, in this specification, a system represents a set of a plurality of constituent elements (a device, a module (component, and the like), and all the constituent elements do not need to be disposed in a same casing. Thus, a plurality of apparatuses that are housed in separate casings and are connected through a network and one apparatus in which a plurality of modules is housed in one casing are systems.

Furthermore, a configuration described above as one device (or one processing unit) may be divided so as to be configured as a plurality of devices (or processing units). To the contrary, a configuration described above as a plurality of devices (or processing units) may be arranged to be configured as one device (or one processing unit). In addition, a configuration that has not been described above may be added to the configuration of each, device (or each processing unit). As long as the overall configuration and the overall operation of the system, are substantially the same, a part, of the configuration of a specific device (or a specific processing unit) may be configured to be included in a configuration of another device (or another processing unit).

While preferred embodiments of the present disclosure have been described in detail with reference to the accompanying drawings, the technical scope of the present disclosure is not limited to such examples. It is apparent that a person having ordinary knowledge in the technical, field of the present disclosure can devise various changes or modifications within the scope of the technical idea described, in the claims, and, naturally, it is understood that such changes and modifications belong to the technical scope of the present disclosure.

For example, the present technology may take a configuration of cloud computing in which one function is divided and processed cooperatively by a plurality of apparatuses through a network.

In addition, each step described in each flowchart described above may be either executed by one apparatus or executed by a plurality of apparatuses in a shared manner.

Furthermore, in a case where a plurality of processes is included in one step, the plurality of processes included in the one step may be either executed by one apparatus or executed by a plurality of apparatuses in a shared manner.

The image coding apparatus and the image decoding apparatus according to the embodiments described above can be applied to various electronic apparatuses such as a transmitter or a receiver for wired broadcasting such as satellite broadcasting or cable TV, transmission on the Internet, transmission to a terminal through cellular communication, or the like, a recording apparatus that records an image on a medium such as an optical disc, a magnetic disk, or a flash memory, or a reproduction apparatus that reproduces an image from the storage medium. Hereinafter, four application examples will be described.

3. Ninth Embodiment

First Application Example: Television Receiver

Figure 50:
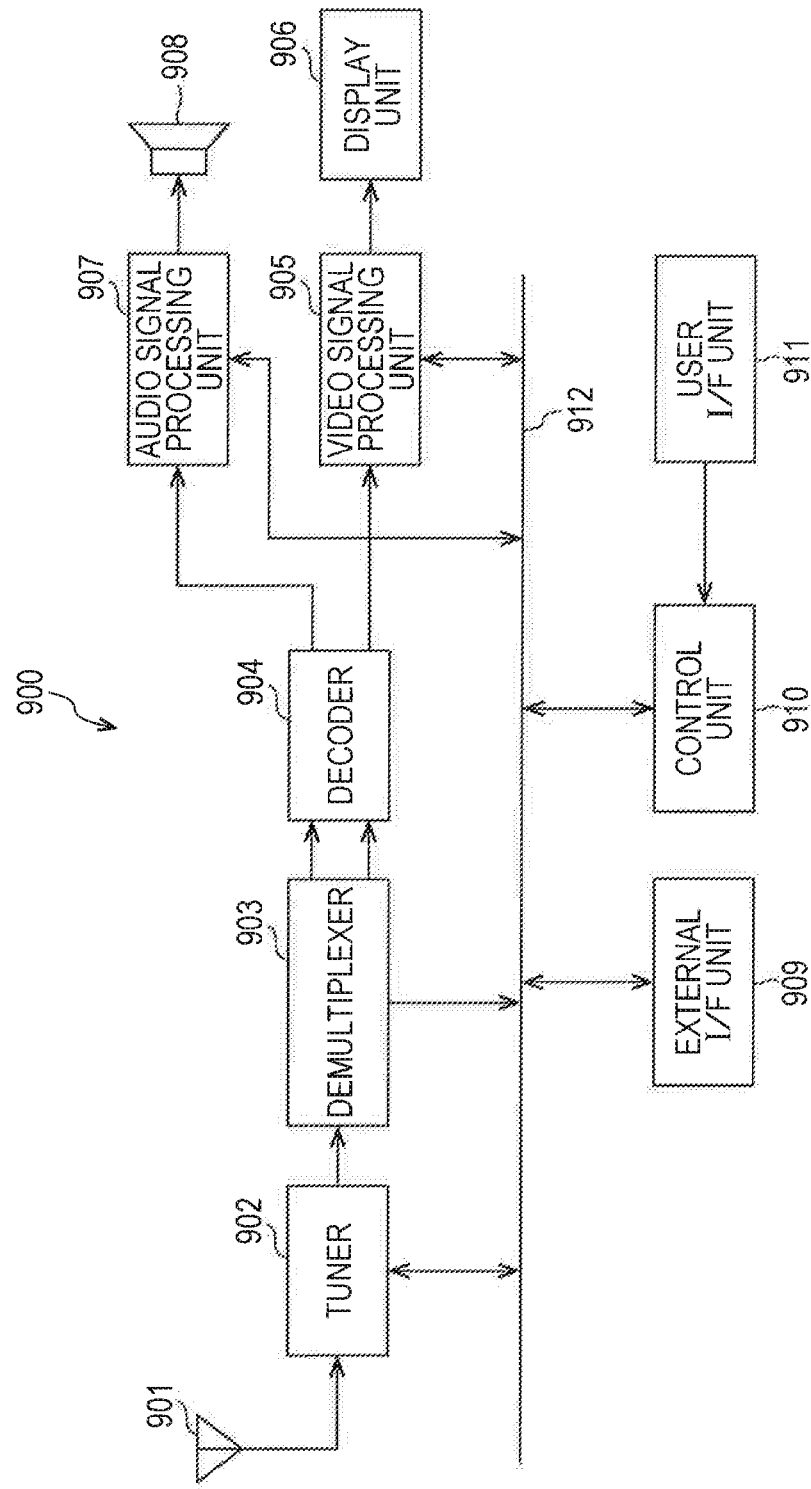
FIG. 50 is block diagram that illustrates an example of the schematic configuration of a television apparatus.

FIG. 50 illustrates an example of the schematic configuration of a television apparatus to which the above-described embodiment is applied. The television apparatus 900 includes an antenna 301, a tuner 902, a demultiplexer 903, a decoder 904, a video signal processing unit 305, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcast signal, received through the antenna 901 and demodulates the extracted Signal. Then, the tuner 903 outputs a coded bit stream, acquired, through demodulation to the demultiplexer 903. In other words, the tuner 902 serves as a transmission unit of the television apparatus 900 that receives a coded, stream in which an image is coded.

The demultiplexer 303 separates a video stream and an audio stream of a program to be watched from the coded bit stream and outputs each separated stream to the decoder 904. In addition, the demultiplexer 303 extracts auxiliary data such, as Electronic Program Guide (EPG) from the coded bit stream and supplies the extracted data to the control unit 310, Furthermore, the demultiplexer 903 may perform descrambling in a case where the coded bit stream is scrambled.

The decoder 904 decodes the video stream and the audio stream input from the demultiplexer 303. Then, the decoder 904 outputs video data generated by a decoding process to the video signal processing unit 905. In addition, the decoder 904 outputs audio data, generated by the decoding process to the audio signal processing unit 907.

The video signal processing unit 305 reproduces the video data, input from, the decoder 904 and causes the display unit 906 to display video. The video signal processing unit 905 may also cause the display unit 906 to display an application screen supplied through the network. In addition, the video signal processing unit 905 may perform an additional process such as noise removal for the video data according to a setting. Furthermore, the video signal processing unit 905 may generate a Graphical User Interface (GUI) image such as a menu, a button, and a cursor and superimpose the generated image on an output image.

The display unit 306 is driven according to a drive signal supplied from the video signal processing unit 905 so as to display a video or image on a video screen of a display device (for example, a liquid crystal display, a plasma display, an OELD (Organic ElectroLuminescence Display (organic EL display), or the like).

The audio signal processing unit 907 performs a reproducing process such as D/A conversion and amplification for the audio data input from the decoder 904 and causes the speaker 908 to output, the audio. In addition, the audio signal processing unit 907 may perform an additional process such as noise removal for the audio data.

The external, interface unit 909 is an interface for connecting the television apparatus 900 to an external device or the network. For example, a video streamer an audio stream received through the external inter face unit 909 may be decoded by the decoder 904. In other words, the external interface unit 909 also serves as a transmission, unit of the television apparatus 900 that receives a coded stream, in which an image is coded.

The control unit 910 includes a processor such as a CPU and a memory such as a RAM or a ROM. The memory stores a program executed by the CPU, program data, EPG data, data acquired, through the network, and the like. The program stored in the memory, for example, is read by the CPU or activation of the television, apparatus 900 and is executed. The CPU controls the operation of the television, apparatus 900, for example, according to an operation signal input from the user interface unit. 911 by executing the program.

The user interface unit 911 is connected to the control unit 910. The user interface unit 911, for example, includes a button and a switch for a user to operate the television apparatus 900, a reception unit, for a remote control signal, and the like. The user interface unit 911 detects a user's operation through such components, generates an operation signal, and outputs the generated operation signal to the control unit 910.

The bus 912 connects the tuner 902 the demultiplexer 903, the decoder 904, the video signal processing unit 905, the audio signal processing unit 907, the external interface unit 309, and the control unit 310 to each other.

In the television apparatus 900 configured in this way, the decoder 304 has the function of the image decoding apparatus 300 according to the above-described embodiment. In other words, the decoder 904 can correctly decode coded data in which image data is coded using any one of the methods described in the first to fifth embodiments by using the method described, in the corresponding embodiment. Accordingly, the television apparatus 900 can suppress a decrease in the coding efficiency.

Second Application Example: Mobile Phone

Figure 51:
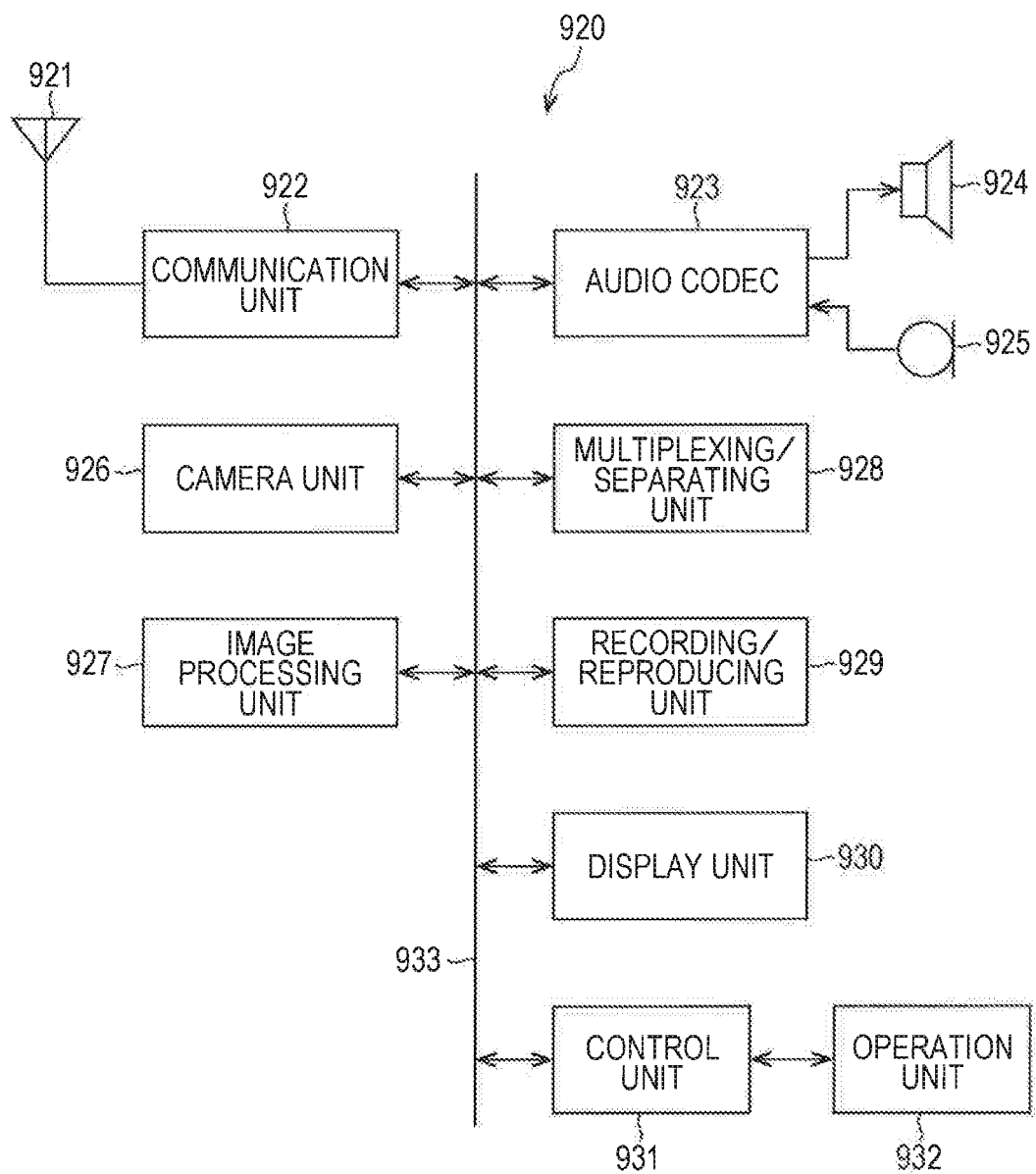
FIG. 51 is a block diagram that illustrates an example of the schematic configuration of a mobile phone.

FIG. 51 illustrates an example of the schematic configuration of a mobile phone to which the above-described embodiment is applied. The mobile phone 920 includes an antenna 921, a communication unit. 922, an audio codec 923, a speaker 924, a microphone 925, a camera unit 326, an image processing unit 927, a multiplexing/separating unit 928, a recording/reproducing unit 929, a display unit 930, a control unit 931, an operation unit 932, and a bus 933.

The antenna 921 is connected to the communication unit 922, The speaker 924 and the microphone 925 are connected to the audio codec 923. The operation unit 933 is connected to the control unit 931, The bus 933 connects the communication unit 322, the audio codec 923, the camera unit 326, the image processing unit 927, the multiplexing/separating unit 928, the recording/reproducing unit 339, the display unit 930, and the control unit 901 to each other.

The mobile phone 930 performs operation such as transmission/reception, of an audio signal, transmission/reception of an e-mail or image data, image capturing, and recording of data in various operation modes including a voice call mode, a data communication mode, an imaging mode, and a television-phone mode.

In the voice call mode, an analog audio signal generated by the microphone 933 is supplied to the audio codec 923, The audio codec 923 converts the analog audio signal into audio data, performs A/D conversion of the converted, audio data, and compresses the audio data. Then, the audit, codec 923 outputs the compressed, audio data to the communication unit 922. The communication unit 322 codes and modulates the audio data to generate a transmission signal. Then the communication unit 922 transmits the generated transmission signal to a base station (not illustrated) through the antenna 321. In addition, the communication unit 922 amplifies a wireless signal received, through the antenna 921 and performs frequency conversion of the wireless signal, thereby acquiring a reception signal. Then, the communication unit 922 generates audio data by demodulating and decoding the reception signal and outputs the generated, audio data to the audio codec 923. The audio codec 923 performs decompression and D/A conversion of the audio data, thereby generating an analog audio signal. Then, the audio codec 923 supplies the generated audio signal to the speaker 924 to causes audio to be outputted.

In the data communication mode, for example, the control unit 331 generates character data configuring an e-mail according to a users operation performed through the operation unit 382. In addition, the control unit 331 causes the display unit 930 to display characters. The control unit 931 generates e-mail data according to a transmission instruction from the user through the operation unit 932 and outputs the generated e-mail data to the communication unit 922. The communication unit 922 codes and modulates the e-mail data, thereby generating a transmission signal. Then, the communication unit 922 transmits the generated transmission signal to a base station (not illustrated) through the antenna 921. In addition, the communication unit 922 performs amplification and frequency conversion of the wireless signal received through the antenna 921, thereby acquiring a reception signal. Then, the communication unit 922 demodulates and decodes the reception signal to restore the e-mail data and outputs the restored e-mail data to the control unit 931. The control unit 331 causes the display unit 330 to display a content, of the e-mail data and supplies the e-mail data to the recording/reproducing unit 323 to cause the e-mail data to be written onto a recording medium thereof.

The recording/reproducing unit 929 includes an arbitrary readable and writable storage medium. For example, the storage medium may be a built-in storage medium such as a RAM and a flash memory or may be an external mounting-type storage medium such as a hard, disk, a magnetic disk, a magneto-optical disc, an optical disc, a universal Serial Bus (USB) memory, or a memory card.

In the imaging mode, for example, the camera unit 926 images an object to generate image data and outputs the generated image data to the image processing unit 927, The image processing unit 927 codes the image data input from the camera unit 926 and supplies a coded stream to the recording/reproducing unit 929 to cause the eroded scream to be written onto a recording medium thereof.

In an image display mode, the recording/reproducing unit 929 reads a coded stream recorded on the recording medium and outputs the read coded stream to the image processing unit 927. The image processing unit 927 decodes the coded stream input from that recording/reproducing unit 929 and supplies image data to the display unit 920 so as to cause an image thereof to be displayed.

In addition, in the television-phone mode, for example, the multiplexing/separating unit 928 multiplexes the video stream coded by the image processing unit 927 and the audio stream input from the audio codec 923 and outputs a resultant multiplexed stream to the communication unit 922, The communication unit 922 codes and modulates the stream, thereby generating a transmission signal. Then, the communication unit 922 transmits the generated, transmission signal to a base station (not illustrated) through the antenna 921. In addition, the communication unit 922 performs amplification and frequency conversion of a wireless signal received through, the antenna 921, thereby acquiring a reception signal. The transmission signal and the reception signal are acquired with the coded bit stream being included therein. Then, the communication unit 922 restores the stream by demodulating and decoding the reception signal and outputs the restored stream to the multiplexing/separating unit 928, The multiplexing/separating unit 928 separates a video stream and an audio stream from the input, stream and, outputs the video stream and the audio stream respectively to the image processing unit 927 and the audio codec 923. The image processing unit 927 decodes the video stream to generate video data. The video data is supplied to the display unit 930, and a series of images is displayed by the display unit 930, The audio codec 933 performs decompression and D/A conversion of the audio stream, thereby generating an analog audio signal. Then, the audio codec 923 supplies the generated audio signal to the speaker 924 to cause an audio to be outputted.

In the mobile phone 920 configured, in this way, the image processing unit 927 has the functions of the image coding apparatus 100 and the image decoding apparatus 200 according to the above-described embodiments. In other words, the image processing unit 927 can code image data using any one of the methods described in the first to fifth embodiments and can correctly decode coded data acquired by the coding process by using the method described in the corresponding embodiment. Accordingly, the mobile phone 920 can suppress a decrease in the coding efficiency.

Third Application Example: Recording and Reproducing Apparatus

Figure 52:
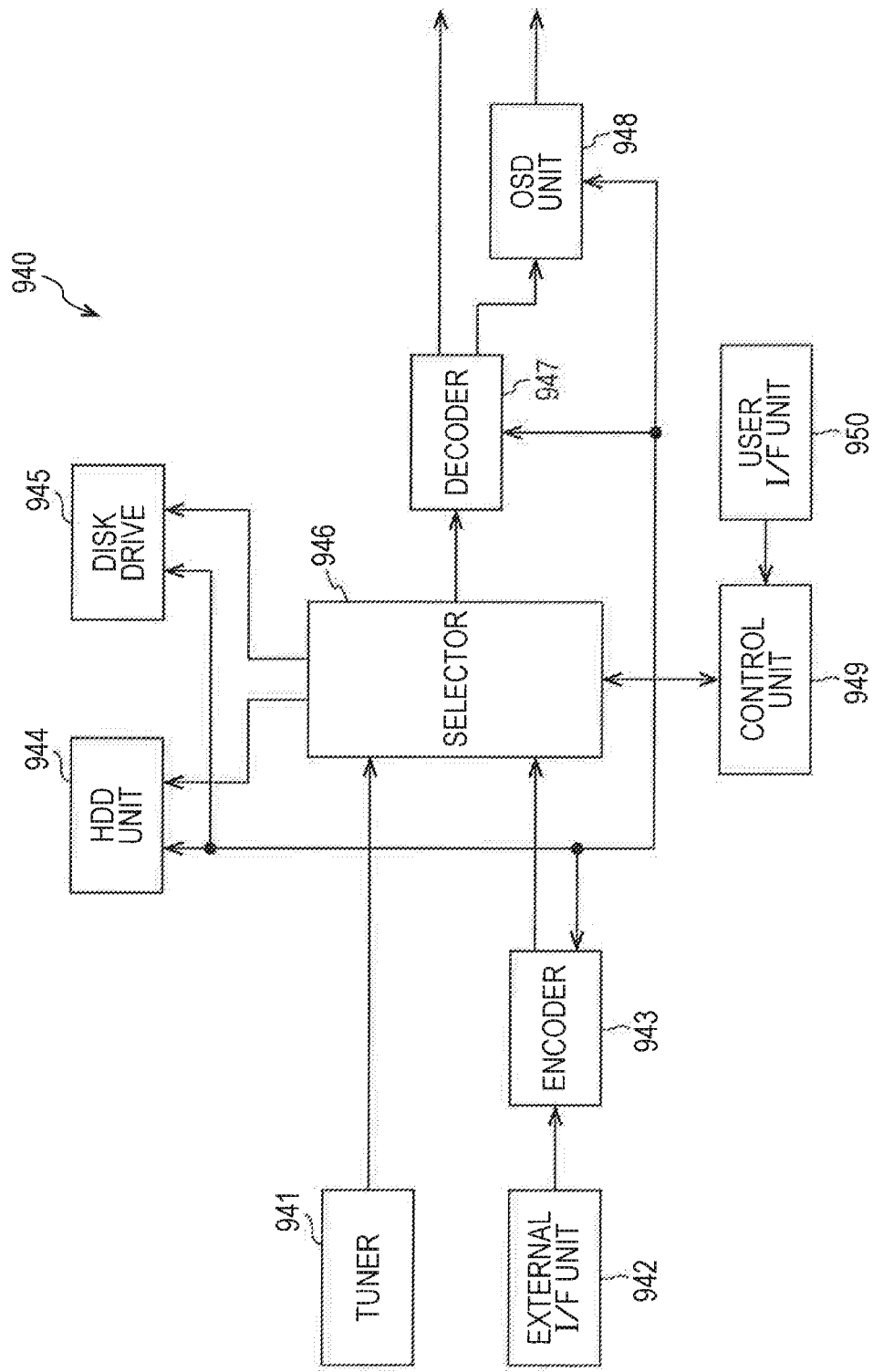
FIG. 52 is a block diagram that illustrates an example of the schematic configuration of a recording/reproducing apparatus.

FIG. 52 is a block diagram that illustrates an example of the schematic configuration of a recording/reproducing apparatus to which the above-described embodiment is applied. The recording/reproducing apparatus 940, for example, codes audio data and video data of a received broadcast program and records the coded data on a recording medium. In addition, the recording/reproducing apparatus 940, for example, may code audio data and video data acquired from another apparatus and record the coded data on a recording medium. Furthermore, the recording/reproducing apparatus 940, for example, reproduces the data recorded on the recording medium using the monitor and the speaker according- to a user's instruction. At that time, the recording/reproducing apparatus 940 decodes the audio data and the video data.

The recording/reproducing apparatus 940 includes a tuner 941, an external interface (I/F) unit 943, an encoder 943, a Hard Disk Drive (HDD) 944, a disk drive 943, a selector 346, a decoder 947, an On-Screen Display (OSD) 948, a control unit 943, and a user interface (I/F) unit 930.

The tuner 941 extracts a signal of a desired channel from a broadcast signal received through an antenna (not illustrated) and demodulates the extracted signal. Then, the tuner 941 outputs a coded bit stream acquired by the demodulation process to the selector 946. In other words, the tuner 941 serves as a transmission unit, of the recording/reproducing apparatus 940.

The external interface unit 942 is an interface used for connecting the recording/reproducing apparatus 940 and an external device or the network. The external interface unit 943, for example, may be an Institute of Electrical and Electronic Engineers (IEEE) 1394 interface, a network interface, a USB interface, a flash memory interface or the like. For example, the video data and the audio data received through the external interface unit 942 are input to the encoder 943. In other words, the external interface unit 942 serves as the transmission unit of the recording/reproducing apparatus 940.

In a case where the video data and the audio data input from the external interface unit 942 are not coded, the encoder. 943 codes the video data and the audio data when the video data and the audio data input from the external interface unit 942. Then, the encoder 943 outputs a coded bit stream to the selector 946.

The HDD 944 records the cooed bit stream in which contents data such as a video and am audio is compressed, various programs, and other data in an internal hard disk. When a video and an audio are reproduced, the HDD 944 reads the data from the hard disk.

Tire disk drive 943 records and reads data on/from a loaded recording medium. The recording medium loaded into the disk drive 945, for example, may be a Digital Versatile Disc (DVD) disc (a DVD-Video, a DVD-RAM (DVD—Random Access Memory), a DVD—Recordable (DVD-R), a DVD—Rewritable (DVD-RW), DVD recordable (DVD+R), a DVD-rewritable (DVD+RW) or the like), a Blu-ray (registered trademark) disc, or the like.

When a video and an audio are recorded, the selector 946 selects a coded bit stream input from the tuner 941 or the encoder 343 end outputs the selected coded bit stream, to the HDD 944 or the disk drive 945. In addition, when the video and the audio are reproduced, the selector 946 outputs the coded bit stream input from the HDD 944 or the disk drive 345 to the decoder 343.

The decoder 947 decodes the coded bit stream to generate video data and audio data. Then, the decoder 947 outputs the generated, video data, to the OSD 948. In addition, the decoder 947 outputs the generated audio data to an external speaker.

The OSD 948 reproduces the video data input from, the decoder 947, thereby displaying the video. The OSD 948 may superimpose an image of a GUI such as a menu, a button, a cursor, on the displayed video.

The control unit 943 includes a processor such as a CPU and a memory such as a RAM or a ROM. The memory stores a program executed by the CPU, program data, and the like. The program stored in the memory, for example, is read and executed by the CPU on activation of the recording/reproducing apparatus 340. The CPU controls the operation of the recording/reproducing apparatus 340, for example, according to an operation signal input from the user interface unit 950 by executing the program.

The user interface unit 950 is connected, to the control unit 949, The user interface unit 950, for example, includes a button and a switch for the user to operate the recording/reproducing apparatus 940 and a reception unit for a remote control signal. The user interface unit 950 detects a user's operation through the constituent elements to generate an operation, signal and outputs the generated operation signal to the control unit 949.

In the recording/reproducing apparatus 940 configured in this way, the encoder 943 has the function, of the image coding apparatus 100 according to the above-described embodiment. In other words, the encoder 943 can code image data using any one of the methods described in the first to fifth embodiments. In addition, the decoder 947 has the function of the image decoding apparatus 200 according to the embodiment, described above. In other words, the decoder 947 can correctly decode coded data that is coded, by using any one of the methods described in the first to fifth embodiments by using rare method described in the corresponding embodiment. Accordingly, the recording/reproducing apparatus 940 can suppress a decrease in the coding efficiency.

Fourth Application Example: Imaging Apparatus

Figure 53:
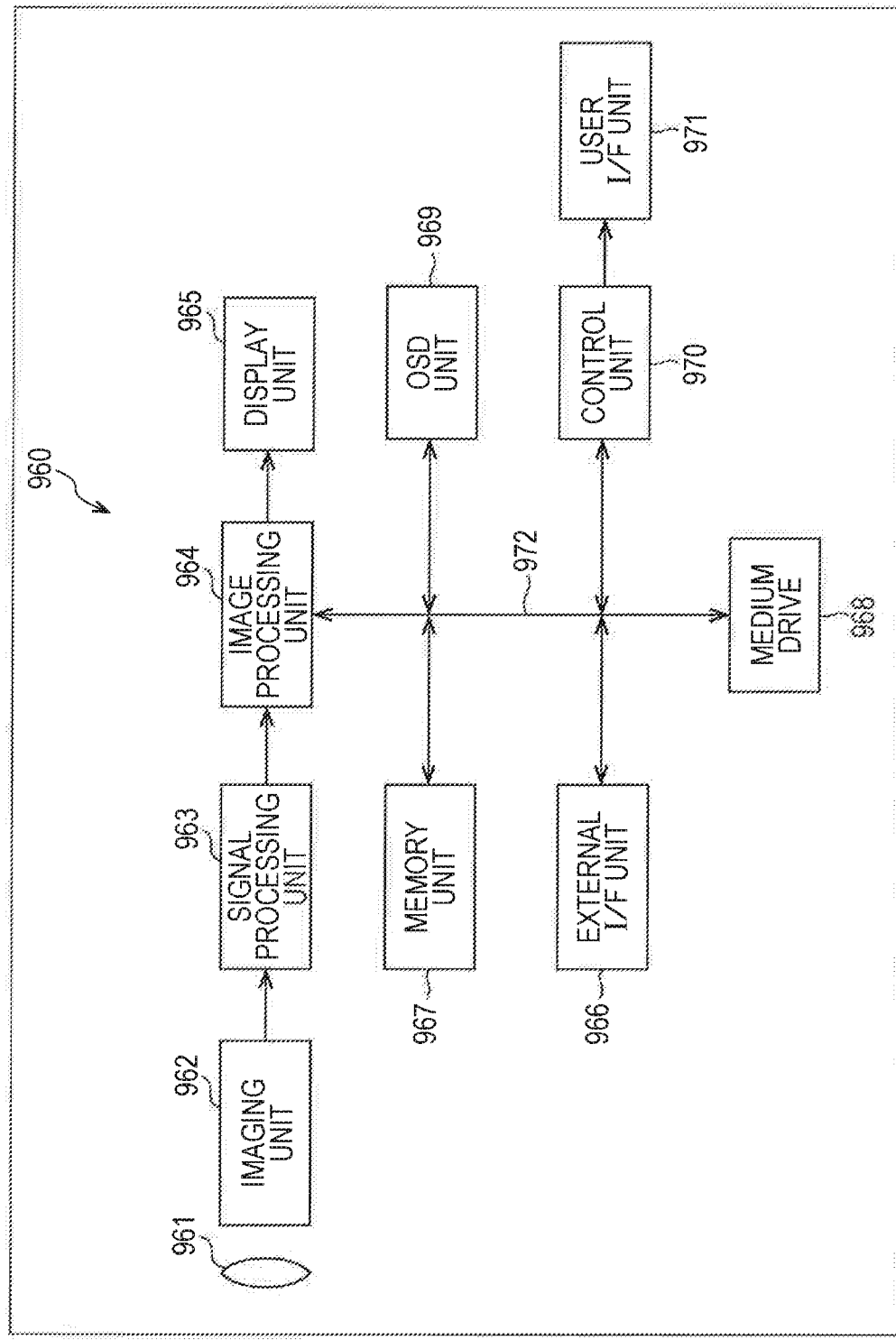
FIG. 53 is a block diagram, that illustrates an example of the schematic configuration of an imaging apparatus.

FIG. 53 illustrates an example of the schematic configuration of an imaging apparatus to which the above-described embodiment is applied. The imaging apparatus 960 images an object to generate an image, codes the image data, and records the coded image data on a recording medium.

The imaging apparatus 960 includes an optical block 961, an imaging unit 962, a signal processing unit 963, an image processing unit 964, a display unit 965, an external interface (I/F) unit 966, a memory unit 967, a medium drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 372 connects the image processing unit 964, the external interface unit 966, the memory unit 967, the medium drive 968, the OSD 969, and the control unit 970 to each other.

The optical block 961 includes a focus lens, a diaphragm mechanism, and the like. The optical block 961 forms an optical image of the object on an imaging surface of the imaging unit. 962, The imaging unit 962 includes an image sensor such as a Charge Coupled Device (CCD) and a Complementary Metal Oxide Semiconductor (CMOS) and converts the optical image formed on the imaging surface info an image signal as an electric Signal through photoelectric conversion. Then, the imaging unit 362 outputs the image signal to the signal, processing unit 963.

The signal processing unit 963 performs various camera signal processes such as a knee correction, a gamma correction, a color correction, and the like for the image signal input from fine imaging unit 962, The signal processing unit 963 outputs the image data after the camera signal processes to the image processing unit 364.

The image processing unit 964 codes the image data input from the signal processing unit 963 to generate coded data. Then, the image processing unit 364 outputs the generated coded data to the external interface unit 966 or the medium drive 969. In addition, the image processing unit 964 decodes the coded data input from the external interface unit 366 or the medium drive 368 to generate image data. Then, the image processing unit 964 outputs the generated image data to the display unit 965. In addition, the image processing unit 964 may output the image data input from the signal processing unit. 963 to the display unit 965 to display the image. Furthermore, the image processing unit 964 may superimpose data for display that is acquired from the OSD 969 on the image output to the display unit 965.

The OSD 963, for example, generates an image of a GUI such as a menu, a button, a cursor, or the like and outputs the generated image to the image processing unit 964.

The external interface unit 966, for example, is configured as an USB input/output terminal. The external interface unit 966, for example, connects the imaging apparatus 360 and a printer when an image is printed. In addition, a drive is connected to the external interface unit 966 as is necessary. A removable medium such as a magnetic disk or an optical disc is loaded into the drive, and a program, read from the removable medium may be installed to the imaging apparatus 960. Furthermore, the external interface unit 966 may be configured as a network interface that is connected to a network such as a LAN, the Internet, or the like. In other words, the external interface unit 966 serves as a transmission unit of the imaging apparatus 960.

The recording medium loaded into the medium drive 368, for example, may be ax arbitrary readable/writable removable medium such as a magnetic disk, a magneto-optical dish, an optical, disc, or a semiconductor memory. In addition, it may be configured such that a recording medium is fixedly mounted to the medium drive 968 to configure a non-portable storage unit such as a built-in hard disk drive or a Solid State Drive (SSD).

The control unit 970 includes a processor such as a CPU and a memory such as a RAM or a ROM. The memory stores a program executed by the CPU, program data, and the like. The program stored in the memory is read by the CPU, for example, on activation of the imaging apparatus 360 and is executed. The CPU controls the operation of the imaging apparatus 960, for example, according to an operation signal input from the user interface unit 971 by executing the program.

The user interface unit 971 is connected to the control unit 970. The user interface unit 971, for example includes a button, a switch, and the like for a user to operate the imaging apparatus 960, The user interface unit 971 detects a riser's operation through the constituent elements to generate an operation signal and outputs the generated operation signal to the control unit 970.

In the imaging apparatus 360 configured in this way, the image processing unit. 964 has the functions of the image coding apparatus 100 and the image decoding apparatus 200 according to the above-described embodiments. In other words, the image processing unit 964 cars code image data rising any one of the methods described in the first to fifth embodiments and can correctly decode coded data acquired by the coding process by using the method described in the corresponding embodiment. Accordingly, the imaging apparatus 960 can improve the coding efficiency.

In addition, the present technology may be also applied to HTTP streaming such as MPEG or DASH that selects and, uses appropriate coded data in units of segments from among a plurality pieces of coded data having mutually-different resolutions and the like that is prepared in advance. In other words, among the plurality or pieces of coded data, information relating to coding and decoding may be shared.

10. Tenth Embodiment

Other Examples

While the examples of the apparatus, the system, and the like to which the present technology is applied have been described as above, the present technology is not limited thereto. Thus, the present technology may be also implemented as all the components mounted in the apparatus or an apparatus configuring the system such as a processor as a system Large Scale Integration (LSI) or the like, a module using a plurality of processors and the like, a unit using a plurality of modules and the like, and a set acquired by adding another function to the unit, (in other words, a part of the configuration of the apparatus).

<Video Set>

Figure 54:
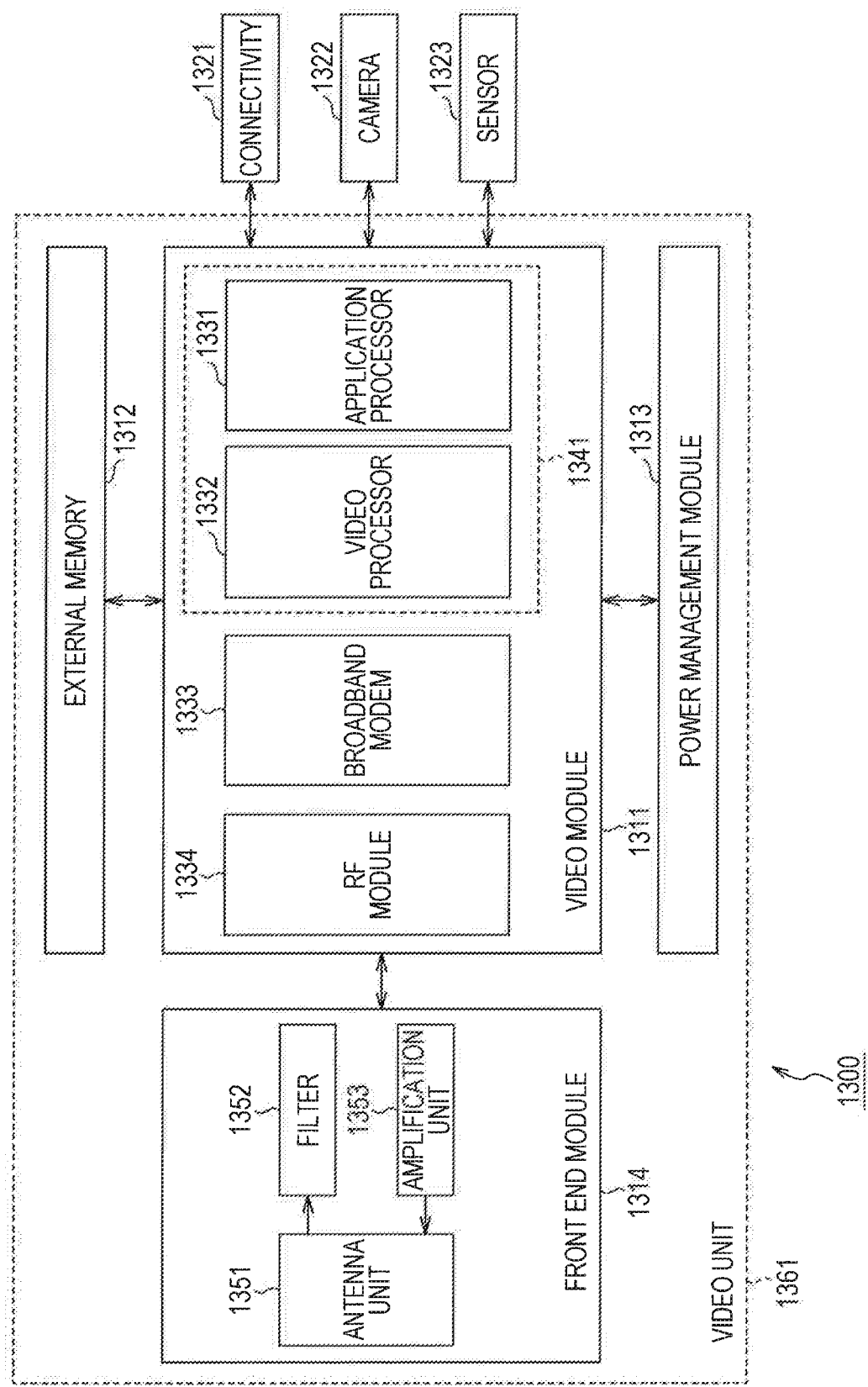
FIG. 54 is a block diagram that illustrates an example of the schematic configuration of a video set.

An example of a case where the present technology is implemented as a set will be described with, reference to FIG. 54, FIG. 54 illustrates an example of the schematic configuration of a video set to which the present technology is applied.

Recently, implementation of multiple functions in electronic apparatuses has been progressed, and, in the development or the manufacture of each electronic apparatus, in a case where a part of the configuration is executed in sales, provision, or the like, frequently, there is not only a case where the part is executed as a configuration having one function but also a case where the part is executed as one set having multiple functions by combining a plurality of configurations having related functions.

The video set 1300 illustrated in FIG. 54 has such a configuration that has multiple functions and is acquired by combining a device having a function relating to coding/decoding (one of coding and decoding or both thereof) of an image with devices having other functions relating to the function.

As illustrated in FIG. 54, the video set 1303 includes: a module group such as a video module 1311, an external memory 1312, a power management module 1313, and, a front end module 1311 and devices having related functions such as connectivity 1321, a camera 1322, and a sensor 1323.

A module is a component, that has functions having coherence acquired by gathering several component functions relating to each other. A specific physical configuration is arbitrary, and, for example, a configuration may be con side red in which a plurality of processors having respective functions, electronic circuit components, such as a resistor and a capacitor, and other devices are arranged to be integrated in a wiring board or the like. In addition, it may be considered to form a new module by combining a module with other modules, a processor, or the like.

In the case of the example illustrated in FIG. 54, the video module 1311 is constructed by combining configurations having functions relating to image processing and includes: an application processor, a video processor, a broadband modem 1333, and an RF module 1334.

a processor is formed by integrating a configuration having a predetermined function on a semi conductor chip through a System On a Chip (SoC) and, for example, there is a processor called a barge Scale Integration (LSI) or the like. The configuration having a predetermined function may be a logical circuit (hardware configuration), a configuration including a CPU, a ROM, a RAM, and the like and a program (software configuration) executed using the components, or a configuration acquired by combining both. For example, it may be configured such that a processor includes logic circuits, a CPU, a ROM, a RAM, and the like, some functions thereof are realized by logic circuits (hardware configuration), and the other functions are realized by a program (software configuration) executed by the CPU.

An application processor 1331 illustrated in FIG. 54 is a processor that executes an application relating to image processing. In order to realize a predetermined function, the application, executed, by this application processor 1331 not only executes a calculation process but also may control configurations of the inside/outside of the video module 1311 such as a video processor 1332 and the like as is necessary.

A video processor 1332 is a processor that has a function relating to coding/decoding (one of coding and decoding or both coding and decoding) of an image.

The broadband modem 1333 converts data (digital signal) transmitted through wired or wireless (or wired and wireless) broadband communication that is performed through broadband communication lines such as the Internet or a public telephone switched, network into an analog signal through a digital, modulation process or the like or converts an analog signal received, through the broadband communication info data (digital, signal) through a demodulation process. The broadband, modem 1333 processes arbitrary information such as image data processed by the video processor 1332, a stream in which the image data is coded, an application program, and setting data.

The RF module 1334 is a module that performs frequency conversion, modulation/demodulation, amplification, a filter process, and the like for a Radio Frequency (RF) signal that, is transmitted or received through an antenna. For example, the RF module 1334 performs the frequency conversion and the like for a dedicated line connection system signal generated by the broadband modem 1333, thereby generating an RF signal. In addition, for example, the RF module 1334 performs the frequency conversion and the like for an RF signal received through the front end module 1314, thereby generating a dedicated line connection system signal.

As denoted by a dotted line 1341 in FIG. 54, the application processor 1331 and the video processor 1332 may be integrated so as to be configured as one processor.

The external memory 1312 is a module that is arranged outside the video module 1311 and has a memory device used by the video module 1311. While the memory device or the external, memory 1312 may be realized by a certain physical configuration, generally, the memory device is frequently used for storing data of a large volume such as image data configured in units of frames. Accordingly, it is preferable that memory device is realised by a semiconductor memory of a large capacity such as a Dynamic Random Access Memory (DRAM) at a relatively low cost.

The power management module 1313 manages and controls supply of power to the video module 1311 (each configuration arranged inside the video module 1311).

The front end module 1314 is a module that provides a front end function (a circuit at the transmission/reception end on the antenna side) for the RF module 1334. As illustrated in FIG. 61, the front end module 1314, for example, includes an antenna unit 1351, a filter 1352, and an amplification unit 1353.

The antenna unit 1351 includes an antenna that transmits and receives wireless signals and peripheral, configurations. The antenna unit 1351 transmits a signal supplied from the amplification unit 1353 as a wireless signal and supplies the received wireless signal to the filter 1353 as an electrical signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified 33 signal to the antenna unit 1351.

The connectivity 1331 is a module that has a function relating to a connection with the outside. The physical configuration of the connectivity 1321 is arbitrary. For example, the connectivity 1321 includes a configuration having a communication function according to a communication standard other than a communication standard with which the broadband modem 1333 compliant, an external input/output terminal, and the like.

For example, the connectivity 1321 may be configured to include a module that has a communication function compliant with a radio communication standard such as Bluetooth (registered trademark), IEEE 832.11 (for example, Wireless Fidelity; registered, trademark (Wi-Fi)), Near Field Communication, (NFU), or InfraRed Data Association (IrDA), an antenna that transmits and receives signals compliant with the standard, and, the like. In addition, for example, the connectivity 1321 may be configured to include a module that has a communication function compliant with a wired communication standard such as Universal Serial Bus (USB) or High-Definition Multimedia Interface (HDMI (registered trademark)) and terminals compliant with the standard. Furthermore, for example, the connectivity 1321 may be configured to have another data (signal) transmission function, of an analog input/output terminal or the like.

In addition, the connectivity 1321 may be configured to include a device of the transmission destination of data (signal). For example, the connectivity 1321 may be configured to include a drive (including not only a drive of a removable medium but also a hard disk, a Solid State Drive (SSD), a Network Attached Storage (MAS), and the like) that reads/writes data from/into a recording medium such as a magnetic disk, an optical disc, a magneto-optical disk, or a semiconductor memory. In addition, the connectivity 1321 may be configured to include an output device (a monitor, a speaker, or the like) of an image or a voice.

The camera 1122 is a module that has a function for acquiring image data of an object by imaging the object. The image data acquired by the imaging process performed by the camera 1322, for example, is supplied to the video processor 1332 and is coded.

The sensor 1323 is a module that has the function of an arbitrary sensor, such a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, a tilt sensor, a magnetic identification sensor, an impact sensor, or a temperature sensor. Data detected by the sensor 1323, for example, is supplied to the application processor 1331 and is used by the application and the like.

The configuration described above as the module may be realized as the processor. To the contrary, the configuration described above as the processor may be realized as the module.

In the video set 1300 having the above-described configuration, as will be described later, the present technology may be applied to the video processor 1332. Accordingly, the video set 1300 may be executed as a set to which the present technology is applied.

<Configuration Example of Video Processor>

Figure 55:
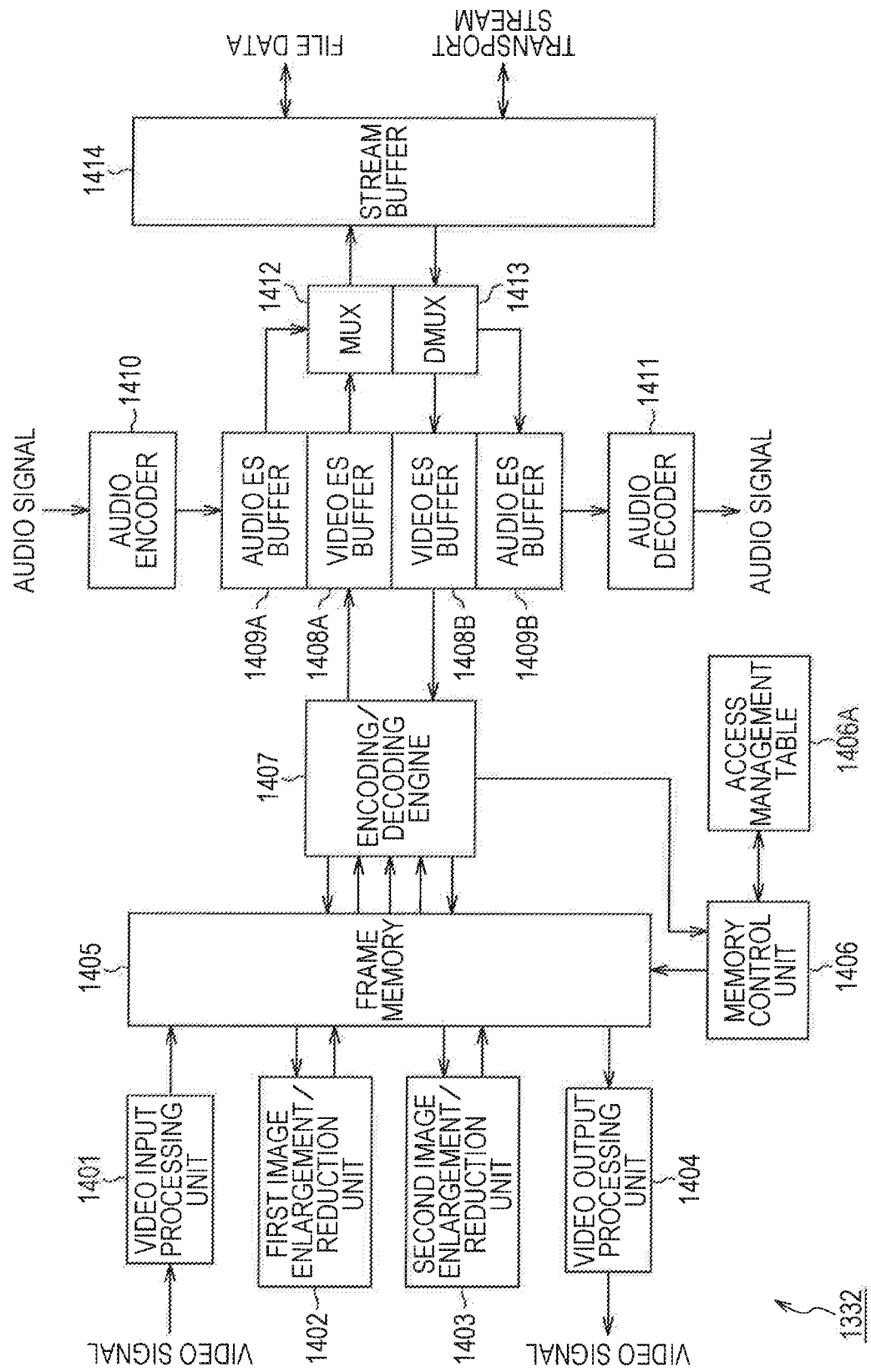
FIG. 55 is a block diagram that illustrates an example of the schematic configuration of a video processor.

FIG. 55 illustrates an example of the schematic configuration of the video processor 1332 (FIG. 34) to which the present, technology is applied.

In the case of the example illustrated in FIG. 55, the video processor 1332 has a function for receiving inputs of a video signal and an audio signal and coding the video signal and the audio signal according to a predetermined system and a function for decoding coded video data, and coded audio data and reproducing and outputting a video signal and audio signal.

As illustrated in FIG. 55, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1333 includes: an encoding/decoding engine 1407; video Elementary Stream (ES) buffers 1408A and 1408B; and audio ES buffers 1409A and 1409B. Furthermore, the video processor 1332 includes: an audio encoder 1410; an audio decoder 1411; a multiplexing unit (Multiplexer (MUX) 1412; a demultiplexing unit (Demultiplexer (DMUX)) 1413; and a stream buffer 1414.

The video input processing unit 1401, for example, acquires a video signal input from the connectivity 1321 (FIG. 54) or the like and converts the video signal into digital image data. The first image enlargement/reduction unit 1402 performs a format conversion, an image enlargement/reduction process, and the like for the image data. The second image enlargement/reduction unit 1403 performs an image enlargement/reduction process according to a format of the output destination through the video output processing unit 1404, similar format conversion as that of the first image enlargement/reduction unit 1402, an image enlargement/reduction process, and the like for the image data. The video output processing unit 1404 performs a format conversion, a conversion into an analog signal, and the like for the image data and outputs a resultant signal, for example, to the connectivity 1321 or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1403, The frame memory 1405, for example, is realized by a semiconductor memory such as a DRAM.

The sensory control unit 1406 receives a synchronisation signal from the encoding/decoding engine 1407 and controls accesses to the frame memory 1405 for writing/reading according to an access schedule for accessing the frame memory 1405 that is written in an access management table 1406A, The access management table 1406A, is updated by the memory control unit 1406 in accordance with the processes executed by the encoding/decoding engine 1407, the first image enlargement/reduction unit 1402, the second image enlargement/deduction unit 1403, and the like.

The encoding/decoding engine 1407 performs an encoding process of image data and a decoding process of a video stream that is data acquired by coding the image data, for example, the encoding/decoding engine 1407 codes the image data read from the frame memory 1405 and sequentially writes the image data into the video ES buffer 1408A as a video stream. In addition, for example, the encoding/decoding engine 1407 sequentially reads and decodes video streams supplied from the video ES buffet 1408B and sequentially writes the decoded video streams into the frame memory 1405 as image data. The encoding/decoding engine 1407 uses the frame memory 1405 as a work area in such coding and decoding processes. In addition, the encoding/decoding engine 1407 outputs a synchronization signal to the memory control unit 1406, for example, at timing when a process for each macro block is started.

The video 33 buffet 1408A buffers a video stream generated by the encoding/decoding engine 1407 and supplies the buffered video stream to the multiplexing unit (MUX) 1412. The video HIS buffer 1408B buffers a video stream supplied from the demultiplexing unit (DMUX) 1413 and supplies the buffered video stream to the encoding/decoding engine 1407.

The audio ES buffer 1409A buffers an audio stream generated by the audio encoder 1410 and supplies the buffered audio stream to the multiplexing unit (MUX) 1412. The audio ES buffer 1403B buffers an audio stream, supplied from the demultiplexer (DMUX) 1413 and supplies the buffered audio stream to the audio decoder 1411.

The audio encoder 1410, for example, converts an audio signal, for example, input from the connectivity 1321 or the like into a digital signal and codes the converted digital signal according to a predetermined system such as an MPEG audio system or an Audio Code number 3 (AC3) system. The audio encoder 1410 sequentially writes audio streams each being data acquired by coding an audio signal into the audio ES buffer 1409A. The audio decoder 1411 decodes the audio stream supplied from the audio ES buffer 1409B and, for example, performs a conversion into an analog signal, and the like for the decoded, audio stream and supplies a resultant signal, for example, to the connectivity 1321 or the like as a reproduced audio signal.

The multiplexing unit (MUX) 1412 multiplexes a video stream and an audio stream, A method of this multiplexing process (in other words, the format of a bit stream generated by the multiplexing process) is arbitrary. In addition, in the multiplexing process, the multiplexing unit (MUX) 1412 may add predetermined header information and the like to the bit stream. In other words, the multiplexing unit (MUX) 1412 can convert the format of a stream, through the multiplexing process. For example, by multiplexing a video stream and an audio stream, the multiplexing unit (MUX) 1412 converts the streams into a transport stream that is a bit stream of a transmission format. In addition, for example, by multiplexing the video stream and the audio stream, the multiplexing unit (MUX) 1412 converts the streams into data (file data) of a recording file format.

The demultiplexing unit (DMUX) 1413 demultiplexes a bit stream in which a video stream and an audio stream are multiplexed using a method corresponding to the multiplexing process performed by the multiplexing unit (MUX) 1412. In other words, the demultiplexing unit (DMUX) 1413 extracts a video stream, and an audio stream from the bit stream, read from the stream buffer 1414 (separates the video stream and the audio stream from each other). In other words, the demultiplexing unit (DMUX) 1413 can convert the format of a stream through the demultiplexing process (an inverse conversion, of the conversion performed by the multiplexing unit (MUX) 1412). For example, the demultiplexing unit (DMUX) 1413 acquires a transport, stream supplied, for example, from the connectivity 1321, the broadband modem 1333, or the like through the stream buffer 1414 and demultiplexes the supplied transport stream, thereby converting the transport stream into a video stream and an audio stream. In addition, for example, the demultiplexing unit (DMUX) 1413 acquires file data, for example, read from various recording media by the connectivity 1321 through the stream buffer 1414 and demultiplexes the acquired file data, thereby converting the file data into a video stream and an audio stream.

The stream buffer 1414 buffers the bit stream. For example, the stream buffer 1414 buffers the transport stream supplied from the multiplexing unit (MUX) 1412 and supplies the buffeted transport stream, for example, to the connectivity 1321, the broadband modem 1333, or the like at predetermined timing or based on a request from the external, or the like.

In addition, for example, the stream buffer 1414 buffers the file data supplied from the multiplexing unit (MUX) 1412 and supplies the buffered file data, for example, to the connectivity 1321 or the like at predetermined timing, a request from the external, or the like so as to be recorded on various recording media.

Furthermore, the stream buffer 1414 buffers a transport stream, for example, acquired through the connectivity 1321, the broadband modem 1333, or the like and supplies the buffered transport stream to the demultiplexing unit (DMUX) 1413 at predetermined timing or based, on a request from the external or the like.

In addition, the stream buffer 1414 buffers file data read from various recording media by the connectivity 1321 or the like and supplies the buffered file data to the demultiplexing unit (DMUX) 1413 at predetermined timing or a request from the external or the like.

Next, an example of the operation of the video processor 1332 having such a configuration will be described. For example, a video signal input from the connectivity 1321 or the like to the video processor 1332 is converted into digital image data of a predetermined system such as a 4:2:2 Y/Cb/Cr system in the video input, processing tint 1401 and is sequentially written into the frame memory 1405. This digital image data is read by the first image enlargement/reduction unit 1402 or the second image enlargement/reduction unit 1403, a format conversion into a predetermined system such as a 4:2:0 Y/Cb/Cr system and an enlargement/reduction process are performed for the read digital image data, and resultant digital, image data is rewritten into the frame memory 1405. This image data is coded by the encoding/decoding engine 1407 and is written into the video ES buffer 1408A as a video stream.

In addition, an audio signal input from the connectivity 1321 or the like to the video processor 1332 is coded by the audio encoder 1410 and is written into the audio ES buffer 1409A as an audio stream.

A video stream in the video ES buffer 1408A and an audio stream in the audio ES buffer 1409A are read and multiplexed by the multiplexing unit (MUX) 1412 and is converted into a transport stream file data, or the like. The transport stream generated by the multiplexing unit (MUX) 1412 is buffered in the stream buffer 1414 and then, is output to an external network, for example, through the connectivity 1321, the broadband modem 1333, or the like. In addition, the file data generated by the multiplexing unit (MUX) 1412 is buffered in the stream buffer 1414 and then, is output, for example, to the connectivity 1321 or the like and is recorded on various recording media.

In addition, the transport stream input to the video processor 1332 from an external network, for example, through the connectivity 1321, the broadband modem. 1333, or the like is buffered in the stream buffer 1414 and then is demultiplexed by the demultiplexing unit (DMUX) 1413. In addition, the file data that is read from various recording media and is input to the video processor 1332, for example, by the connectivity 1321 or the like is buffered in the stream buffer 1414 and then, is demultiplexed by the demultiplexing unit (DMUX) 1413. In other words, the transport stream or the file data input to the video processor 1332 is separated into a video stream and an audio stream by the demultiplexing unit (DMUX) 1413.

The audio stream is supplied to the audio decoder 1411 through the audio ES buffer 1409B and is decoded, and an audio signal is reproduced. In addition, the video stream is written into the video BS buffer 1403B and then is sequentially read and decoded by the encoding/decoding engine 1407 and is written into the frame memory 1405. The decoded image data is processed to be enlarged or reduced by the second image enlargement/reduction unit 1403 and is written into the frame memory 1405. Then, the decoded image data is read by the video output processing unit 1404, is converted into another format, according to a predetermined system such as the 4:2:2 Y/Cb/Cr system or the like, and is further converted into an analog signal, and a video signal is reproduced and output.

In a case where the present technology is applied to the video processor 1332 configured as such, the present technology relating to each embodiment described above may be applied, to the encoding/decoding engine 1407. In other words, for example, the encoding/decoding engine 1407 may be configured to have the functions of the image coding apparatus 100 and the image decoding apparatus 200 relating to the embodiment described above. By configuring as such, the video processor 1332 can have the same advantages as those described above with reference to FIGS. 1 to 39.

In addition, in the encoding/decoding engine 1407, the present technology (in other words, the functions of the image coding apparatus and the image decoding apparatus according to each embodiment described above) may be realised by hardware such as logic circuits or software such as an embedded program or may be realized by both the hardware and the software.

<Another Configuration Example of Video Processor>

Figure 56:
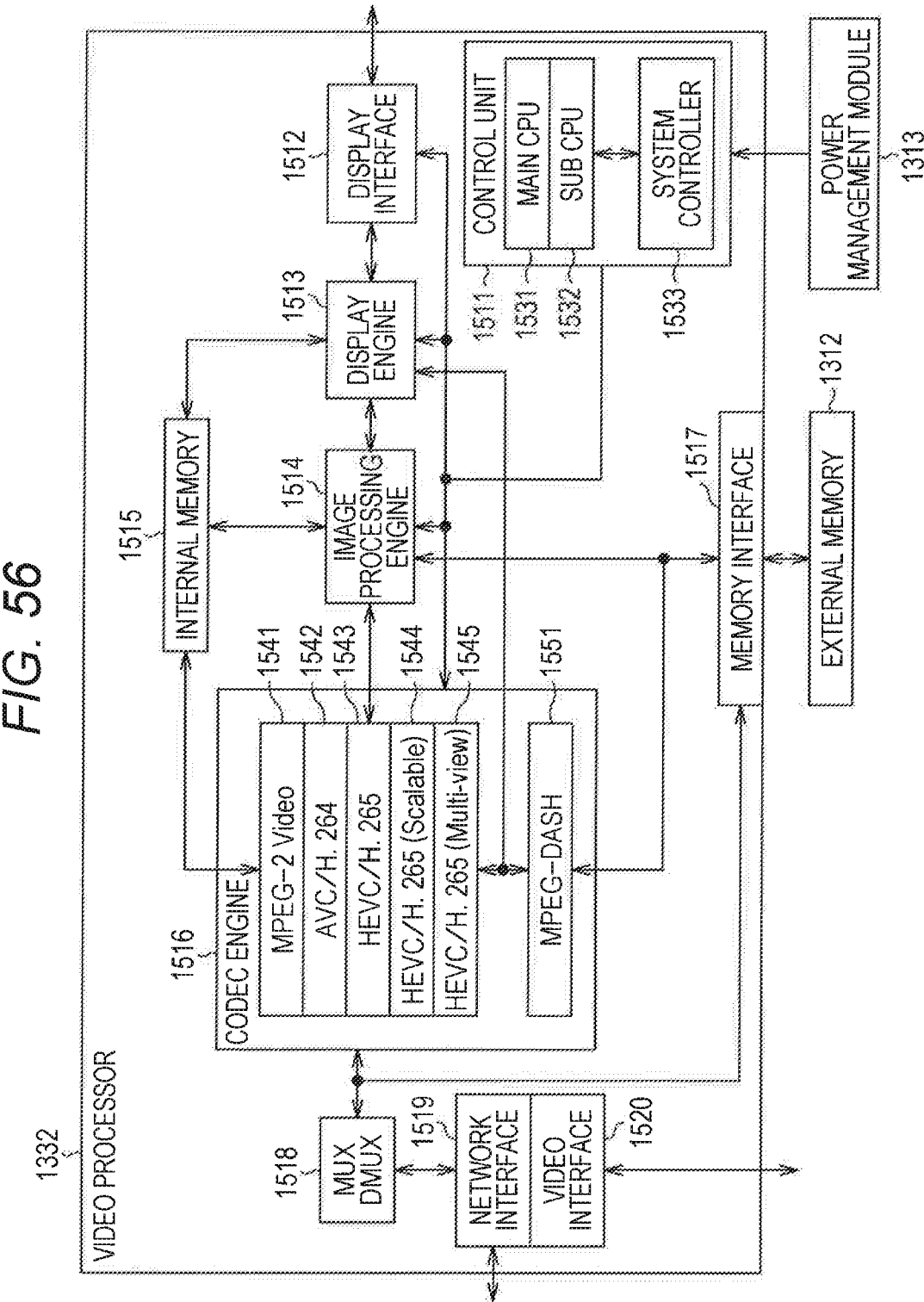
FIG. 56 is a block diagram that illustrates another example of the schematic configuration of a video processor.

FIG. 56 illustrates another example of the schematic configuration of a video processor 1332 to which the present technology is applied. In the case of the example illustrated in FIG. 56, the video processor 1332 has a function for coding and decoding video data according to a predetermined system.

More, specifically, as illustrated, in FIG. 56, the video processor 1333 includes: a control unit 1511; a display interface 1512; a display engine 1513; an image processing engine 1514; and an internal memory 1515. In addition, the video processor 1333 includes: a codec engine 1516; a memory interface 1517; a multiplexing/demultiplexing unit (MUX DMUX) 1518; a network interface 1519; and a video interface 1530.

The control unit 1511 controls the operations of each processing unit arranged inside the video processor 1333 such as the display interface 1512, the display engine 1513, the image processing engine 1514, and the codec engine 1516.

As illustrated in FIG. 56, the control unit 1511, for example, includes a main CPU 1531, a sub CPU 1533, and a system controller 1533. The main CPU 1531 executes a program used for controlling the operation of each processing unit arranged inside the video processor 1332 and the like. The main CPU 1531 generates a control signal according to the program or the like and supplies the control signal to each processing unit) in other words, controls the operation of each processing unit). The sub CPU 1532 achieves an auxiliary role of the main CPU 1531. For example, the sub CPU 1532 executes a child process, a subroutine, or the like of a program executed by the main CPU 1531. The system controller 1533 controls the operations of the main CPU 1531 and the sub CPU 1532 by performing designation of programs to be executed by the main CPU 1531 and the sub CPU 1532 and the like.

The display interface 1512 outputs image data, for example, to the connectivity 1321 and the like under the control of the control unit 1511. For example, the display interface 1512 converts image data that is digital data, into an analog signal and outputs the analog signal as a reproduced video signal or the image data that is the digital data to a monitor device of the connectivity 1321 or the like.

The display engine 1513, under the control, of the control unit 1511, performs various conversion processes such as a format conversion, a size conversion, and a color gamut conversion for the image data so as to match the hardware specification of a monitor device displaying the image and the like.

The image processing engine 1514 performs predetermined image processing such as a filter process used for improving she image quality and the like for the image data, under the control of the control unit 1511.

The internal memory 1515 is a memory that is shared by the display engine 1513, the image processing engine 1514, and the codec engine 1516 and is disposed inside the video processor 1332, The internal memory 1515, for example, is used for data transfer among the display engine 1513, the image processing engine 1514, and the codec engine 1516, For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, according to a request). This internal memory 1515 may be realized by using any kind of memory device. However, generally, the internal memory is frequently used for storing data having a small volume such as image data in units of blocks and parameters, and accordingly, it is preferable to realize the internal memory using a semiconductor memory having a relatively small capacity compared to the external memory 1312) and having nigh response speed such as a Static Random Access Memory (SRAM).

The codec engine 1516 performs processes relating to coding and decoding of image data. The coding/decoding system with which the codec engine 1516 is compliant is arbitrary, and the number of coding/decoding systems may be one or plural. For example, it may be configured such that the codec engine 1516 may have a codec function for a plurality of coding/decoding systems and be configured to perform coding of image data or decoding of coded data by using selected one of the coding/decoding systems.

In the example illustrated in FIG. 56, the codec engine 1516, for example, includes MPEG-2 Video 1541, AVC/H.264 1542, HEVC/H.265 1543, HEVC/H.265 (Scalable) 1544, HEvC/H.265 (Multi-view) 1545, and MPEG-DASR 1551 as functional blocks for the process relating to the codec.

The MPEG-2 Video 1541 is a functional, block that codes or decodes image data according to the MPEG-2 system. The AVC/H.264 1542 is a functional block that codes or decodes image data according to the AVC system. The HEVC/H.265 1543 is a functional clock that codes or decodes image data according to the HEVC system, like HEVC/H.265 (Scalable) 1544 is a functional block that performs scalable coding or scalable decoding of image data according to the HEVC system. The HEVC/H, 265 (Multi-view) 1545 is a functional block that performs multi-view coding or multi-view decoding of image data, according to the HEVC systems.

The MPEG-DASH 1551 is a functional block that transmits and receives image data according to a MPEG-Dynamic Adaptive Streaming over HTTP (MPEG-DASH) system, MPEG-DASH is a technology for performing video streaming using a HyperText Transfer Protocol (HTTP), and one of features thereof is that appropriate coded data among a plurality of pieces of coded data having mutually-different resolutions and the like, which is prepared in advance, is selected and transmitted in units of segments. The MPEG-DASH 1551 performs generation of a stream that is compliant with the standard, transmission control of the stream, and the like and uses the MPEG-2 Video 1541 to HEVC/H.265 (Multi-view) 1545 described above for coding and decoding image data.

The memory interface 1517 is an interface for the external memory 1312. The data supplied from the image processing engine 1514 or the codec engine 1516 is supplied to the external memory 1312 through the memory interface 1517. In addition, the data read, from the external memory 1313 is supplied to the video processor 1332 (the image processing engine 1514 or the codec engine 1513) through the memory interface 1517.

The multiplexing/demultiplexing unit (MAX DMUX) 1518 performs multiplexing and demultiplexing of various kinds of data relating to an image such as a bit stream of coded data, image data, and a video signal. A method of the multiplexing/demultiplexing is arbitrary. For example, at the time of performing the multiplexing, the multiplexing/demultiplexing unit (MUX DMUX) 1518 may not only arrange a plurality of pieces of data into one but also add predetermined trader information or the like to the data. In addition, at the time of performing the demultiplexing, the multiplexing/demultiplexing unit (MUX DMUX) 1518 may not only divide one piece of data into multiple parts but also add predetermined header information or the like to each divided data part. In other words, the multiplexing/demultiplexing unit (MUX DMUX) 1518 can convert the format or data through the multiplexing/demultiplexing process. For example, the multiplexing/demultiplexing unit (MUX DMUX) 1518 can convert a bit stream into a transport stream that is a bit stream of the transmission format or data (file data) of the recording file format, by multiplexing the bitstream. It is apparent, that an inverse conversion thereof can be performed by the demultiplexing process.

The network interface 1519 is an interface, for example, dedicated for the broadband modem 1333, the connectivity 1321, or the like. The video interface 1520 is an interface, for example, dedicated for the connectivity 1321, the camera 1322, or the like.

Next, an example of the operation of such a video processor 1332 wild, be described. For example, when a transport stream, is received from an external network through the connectivity 1321, the broadband modem 1333, or the like, the transport stream is supplied to the multiplexing/demultiplexing unit (MUX DMUX) 1518 through the network interface 1513, is demultiplexed, and is decoded by the codec engine 1516, For the image data acquired, by the decoding process performed by the codec engine 1516, predetermined image processing is performed, for example, by the image processing engine 1514, and a predetermined conversion is performed by the display engine 1513. Then, resultant image data, is supplied, for example, to the connectivity 1321 or the like through the display interface 1512, and an image thereof is displayed on a monitor. In addition, the image data, for example, acquired by the decoding process performed by the codec engine 1516 is recoded by the codec engine 1516, is multiplexed, by the multiplexing/demultiplexing unit (MUX DMUX) 1516, is converted into file date, is output, for example, to the connectivity 1321 or the like through the video interface 1520, and is recorded, on various recording media.

In addition, the file data or the coded data acquired by coding the image data, which is read from a recording medium not illustrated, for example, by the connectivity 1321 or the like is supplied to the multiplexing/demultiplexing unit (MUX DMUX) 1518 through the video interface 1550, is demultiplexed, and is decoded by the codec engine 1516, for the image data acquired, by the decoding process performed by the codec engine 1516, predetermined image processing is performed by the image processing engine 1514 and a predetermined conversion is performed by the display engine 1513. Then, resultant image data is supplied, for example, to the connectivity 1521 or the like through the display interface 1512, and an image thereof is displayed on the monitor. In addition, the image data, for example, acquired by the decoding process performed by the codec engine 1516 is recoded by the codec engine 1516, is multiplexed by the multiplexing/demultiplexing unit (MUX DMUX) 1518, is converted into a transport stream, is supplied, for example, to the connectivity 1321, the broadband modem 1333, or the like through the network interface 1519, and is transmitted to another apparatus not illustrated.

Here, the transmission/reception of the image data and the other data between each processing unit arranged inside the video processor 1332, for example, is performed using the internal, memory 1515 or the external memory 1312. In addition, the power management module 1313, for example, controls the supply of power to the control unit 1511.

In a case where the present technology is applied to the video processor 1332 configured as such, the present technology according to each embodiment described above tray be applied to the codec engine 1516. In other words, for example, the codec engine 1516 may be configured, to include the functional blocks realizing the image coding apparatus 100 and the image decoding apparatus 200 according to the embodiment described above. By configuring as such, the video processor 1332 can acquire advantages similar to the advantages described above with reference to FIGS. 1 to 39.

In addition, in the codec engine 1516, the present technology (in other words, the functions of the image coding-apparatus and the image decoding apparatus according to each embodiment described above) may be realised by hardware such as logic circuits or software such, as an embedded program or may be realised by both, the hardware and the software.

While two examples of the configuration of the video processor 1332 have been described as above, the configuration of the video processor 1332 is arbitrary and may be a configuration other than the two examples described above. Here, the video processor 1332 may be configured as either one semiconductor chip or a plurality of semiconductor chips. For example, the video processor may be configured as a three-dimensional stacked LSI. In addition, the video processor may be realised by a plurality of LSIs.

<Example of Application to Apparatus>

The video set 1300 may be built in various apparatuses that, process image data. For example, the video set 1380 may be built in the television apparatus 900 (FIG. 50), the mobile phone 980 (FIG. 51), the recording/reproducing apparatus 340 (FIG. 52), the imaging apparatus 360 (FIG. 53), and the like. By building the video set 1300 therein, the apparatus can acquire advantages similar to those described above with reference to FIGS. 1 to 39.

In addition, although a configuration is a part of each configurations of the video set 1300 described above, in a case where the configuration includes the video processor 1332, the configuration may be executed as a configuration to which the present technology is applied. For example, only the video processor 1333 may be executed as a video processor to which the present, technology is applied. In addition, for example, as described above, the processor denoted by the dotted line 1341, the video module 1311, and the like may be executed as a processor, a module, and the like to which the present technology is applied. Furthermore, for example, the video module 1311, the external memory 1312, the power management module 1313, and the front end module 1314 may be combined so as to be executed as a video unit 1361 to which the present technology is applied. According to any of the configurations, advantages similar to those described above with reference to FIGS. 1 to 39 can be acquired.

In other words, any configuration including the vided processor 1333, as in the case of the video set 1300, can be built in various apparatuses processing image data. For example, the video processor 1332, the processor represented by the dotted line 1341, the video module 1311, or the video unit 1361 may be built into the television apparatus 900 (FIG. 50), the mobile phone 920 (FIG. 51), the recording/reproducing apparatus 940 (FIG. 52), the imaging apparatus 960 (FIG. 53), and the like. Then, by building any configuration to which the present technology is applied into an apparatus, the apparatus, similarly to the case of the video set. 1300, can nave effects similar to the effects described above with reference to FIGS. 1 to 39.

In this specification, an example has been described in which various kinds of information is multiplexed in a coded stream and is transmitted from the coding side to the decoding side. However, a technique for transmitting such information, is not limited to such a technique. For example, such information may be transmitted or recorded as individual data associated with a coded bit stream without being multiplexed in the coded stream. Here, the term "associated" represents that an image (it may be a part of an image such as a slice, block, or the like) included in a bit stream and information corresponding to the image are acquired with being linked to each other at the time of decoding the image and the information. In other words, the information may be transmitted in a transmission line other than that of the image (or the bit stream). In addition, the information may be recorded on a re coding medium other than that for the image (or the bit stream) (or a different recording area of the same recording medium). Furthermore, the information and the image (or the bit stream), for example, may be associated with each other in units of arbitrary parts such as multiple frames, one frame, or a part of the frame.

The present technology may take a configuration as described below.

(1) An image processing apparatus including: a residual predicting unit that performs a prediction with bit depths of residual data arranged to be uniform among components when the prediction is performed among the components for the residual data between an input image configured by a plurality of the components and a predicted image; and a coding unit that codes predicted residual data generated through the prediction performed by the residual predicting unit.

(2) The image processing apparatus described in any one of (1) and (3) to (9), wherein the residual predicting unit arranges the bit depths of the residual data to be uniform through a bit shift.

(3) The image processing apparatus described in any one of (1), (2), and (4) to (9), wherein the residual predicting unit performs the prediction with the bit depths of the residual data arranged to be uniform among the components through the bit shift in a case where a difference between the bit depths of two components for which the prediction is performed is not zero.

(4) The image processing apparatus described in any one of (1) to (3) and (5) to (9), wherein the residual predicting unit performs the prediction with the bit depths of the residual data arranged to be uniform among the components through the bit shift in a case where the difference between the bit depths is positive and omits the prediction in a case where the difference between the bit depths is negative.

(5) The image processing apparatus described in any one of (1) to (4) and (6) to (9), wherein the residual predicting unit performs the prediction with, the bit depths of the residual data arranged to be uniform among the components through the bit shift, in a case where a color space of the input image is not an RGB space and omits the prediction in a case where the color space of the input image is the RGB space.

(6) The image processing apparatus described in any one of (1) to (5) and (7) to (9), wherein a color space of the input image is a YUV space, and the residual predicting unit performs the prediction with the bit depths of the residual data arranged to be uniform through, the bit shift between a luminance component and a color difference component.

(7) The image processing apparatus described in any one of (1) to (6), (8), and (9), wherein a color space of the input image is an RGB space, and the residual predicting unit performs the prediction with the bit depths of the residual data arranged to be uniform, through the bit shift between a G component and an R component or a B component.

(8) The image processing apparatus described in any one of (1) to (7) and (9), wherein the residual predicting unit performs the prediction by acquiring a difference between the bit depths of two components for which the prediction is performed, performing the bit shift of the residual data of one component out of the two components that corresponds to the difference between the bit depths, multiplying the bit-shifted residual data by a predetermined weighting coefficient, performing a bit shift of a result of the multiplication that corresponds to a predetermined number of bits, and acquiring a difference between the residual data of the other component and the bit-shifted result of the multiplication.

(9) The image processing apparatus described in any one of (1) to (8), wherein the residual predicting unit sets the weighting coefficient that is common to a plurality of components.

(10) An image processing method including: performing a prediction with bit depths of residual data arranged to be uniform among components when the prediction is performed among the components for the residual data between an input image configured by a plurality of the components and a predicted image; and coding predicted residual data generated through the prediction.

(11) An image processing apparatus including: a decoding unit that decodes coded data in which predicted residual data, which is a result of a prediction of residual data between an image configured by a plurality of components and a predicted image thereof among the components, is coded; and a residual restoring unit that performs restoration with bit depths of the residual data arranged to be uniform among the components when the restoration of the residual data is performed using the predicted residual data acquired by the decoding unit by decoding the coded data.

(12) The image processing apparatus described in any one of (11) and (13) to (19), wherein the residual restoring unit arranges the bit depths of the residual data to be uniform through a bit shift.

(13) The image processing apparatus described in any one of (11), (12), and (14) to (19), further including a reception unit that receives information relating to the bit depths, wherein the residual restoring unit arranges the bit depths of the residual data to be uniform by acquiring si difference between the bit depths of two components for which the prediction is performed based on information relating to the bit depths received by the reception unit and performing the bit shift based on the acquired difference between the bit depths.

(14) The image processing apparatus described in any one of (11) to (13) and (14) to (19), wherein, in a case where the acquired difference between the bit depths is not zero, the residual restoring unit arranges the bit depths of the residual data to be uniform through the bit shift.

(15) The image processing apparatus described in any one of (11) to (14) and (15) to (19), wherein the residual restoring unit performs restoration with the bit depths of the residual data arranged to be uniform through the bit shift in a case where the acquired difference between the bit depths is positive and omits the restoration in a case where the difference between the bit depths is negative.

(16) The image processing apparatus described in any one of (11) to (15) and (17) to (19), wherein the reception unit further receives information relating to a color space of the image, and the residual restoring unit performs the restoration with the bit depths of the residual data arranged to be uniform among the components through the bit shift in a case where the color space of the image is not an RGB space based on the information relating to the color space of the image received by the reception unit and omits the restoration in a case where the color space of the image is the RGB space.

(17) The image processing apparatus described, in any one of (11) to (16), (18), and (13), wherein a color space of the image is a YUV space, and the residual restoring unit performs the restoration with the bit depths of the residual data arranged to be uniform between a luminance component and a color difference component through the bit shift.

(18) The image processing apparatus described in any-one of (11) to (17) and (19), wherein a color space of the image is an RGB space, and the residual restoring unit performs the restoration with the bit depths of the residual data arranged to be uniform through the bit shift between a G component and an R component or a B component.

(19) The image processing apparatus described in any one of (11) to (18), wherein the residual restoring unit, by acquiring a difference between the bit depths of two components for which the restoration is performed, performing the bit shift of the restored residual data of one component out of the two components that corresponds to the difference between the bit depths, multiplying the bit-shifted residual data by a predetermined weighting coefficient, performing a bit shift of a result of the multiplication that corresponds to a predetermined number of bits, and adding the bit-shifted result of the multiplication and the predicted residual data, performs the restoration of the residual data of the other component.

(20) An image processing method including: decoding coded, data in which predicted residual data, which is a result of a prediction of residual data between an image configured by a plurality of components and a predicted image thereof among the components, is coded; and performing restoration with bit depths of the residual data arranged to be uniform among the components when the restoration of the residual data is performed using the predicted residual data acquired by decoding the coded data.

REFERENCE SIGNS LIST

100 Image coding apparatus
121 Reader processing unit
122 Residual predicting unit
123 Residual restoring unit
131 SPS processing unit
132 PPS processing unit
141 Control unit
142 Prediction unit
151 Bit depth difference calculating unit
152 Bit shift control unit
153 Weighting coefficient setting unit
161 Selection unit
162 Right shift unit
163 Left shift unit
164 Weighting coefficient multiplication unit
165 Right shift unit.
166 and 167 Calculation unit
200 Image decoding apparatus
221 Header acquiring unit
222 Residual restoring unit
231 SPS acquiring unit
232 PPS acquiring unit
233 Weighting coefficient acquiring unit
2 41 Control unit
242 Restoration unit
251 Bit depth difference calculating unit
252 Bit shift control unit 261 Selection unit
262 Right shift unit.
263 Left shift unit
264 Weighting coefficient multiplication unit
265 Right shift unit
266 and 267 Calculation unit
311 Control unit
312 Prediction unit
321 Bit depth difference calculating unit
322 Bit shift control unit
351 Control unit
352 Restoration unit
361 Bit depth difference calculating unit
362 Bit shift control unit
411 Control unit
412 Prediction unit
421 Bit depth difference calculating unit
422 Bit shift control unit
451 Control unit
452 Restoration unit
461 Bit depth difference calculating unit
462 Bit shift control unit
501 VUI processing unit
511 Control unit
512 Prediction unit
521 Bit depth difference calculating unit
522 Bit shift control unit
523 Color space determining unit
541 VUI acquiring unit
551 Control unit
561 Bit depth difference calculating unit
562 Bit shift control unit
563 Color space determining unit

The invention claimed is:

1. An image processing apparatus comprising:
a setting unit that arranges a bit depth of residual data of a color difference component and a bit depth of residual data of a luminance component to be uniform in a case where the bit depth of the residual data of the color difference component of an image and the bit depth of the residual data of the luminance component of the image are different from each other, wherein the bit depths of the residual data are arranged to be uniform only when the image is of a 4:4:4 format;
a residual predicting unit that predicts residual data of the color difference component in accordance with the bit depth set by the setting unit by using the residual data of the luminance component and generates predicted residual data; and
a coding unit that codes the predicted residual data generated by the residual predicting unit,
wherein the predicted residual data is generated by multiplying a weighting coefficient by bit-shifted residual data of the luminance component based on a value of a difference between the bit depth of the residual data of the luminance component and the bit depth of the residual data of the color difference component, and
wherein the setting unit, the residual predicting unit, and the coding unit are each implemented via at least one processor.

2. The image processing apparatus according to claim 1, wherein the setting unit performs a bit shift of the bit depth of the residual data of the luminance component such that the bit depth of the residual data of the color difference component and the bit depth of the residual data of the luminance component are the same.

3. The image processing apparatus according to claim 2, wherein the setting unit performs the bit shift of the bit depth of the residual data of the luminance component such that the bit depth of the residual data of the luminance component matches the bit depth of the residual data of the color difference component.

4. The image processing apparatus according to claim 3, wherein the setting unit performs the bit shift of the bit depth of the residual data of the luminance component such that the bit depth of the residual data of the luminance component matches the bit depth of the residual data of the color difference component in a case where the difference between the bit depth of the residual data of the luminance component and the bit depth of the residual data of the color difference component has a positive value.

5. The image processing apparatus according to claim 4, wherein a number of pixels of the luminance component of the image and a number of pixels of the color difference component of the image are the same.

6. The image processing apparatus according to claim 1, wherein the weighting coefficient is determined independently for each color difference component of a plurality of color difference components.

7. The image processing apparatus according to claim 1, wherein the residual predicting unit determines whether or not to perform the prediction of residual data of the color difference component according to information included in a picture parameter set (PPS).

8. The image processing apparatus according to claim 1, wherein the setting unit arranges a bit depth of residual data of each color difference component of a plurality of color difference components and the bit depth of the residual data of the luminance component to be uniform only when the image is of the 4:4:4 format.

9. An image processing method, implemented via at least one processor, the method comprising:
arranging a bit depth of residual data of a color difference component and a bit depth of residual data of a luminance component to be uniform in a case where the bit depth of the residual data of the color difference component of an image and the bit depth of the residual data of the luminance component of the image are different from each other, wherein the bit depths of the residual data are arranged to be uniform only when the image is of a 4:4:4 format;
predicting residual data of the color difference component in accordance with the set bit depth by using the residual data of the luminance component and generating predicted residual data; and
coding the generated predicted residual data,
wherein the predicted residual data is generated by multiplying a weighting coefficient by bit-shifted residual data of the luminance component based on a value of a difference between the bit depth of the residual data of the luminance component and the bit depth of the residual data of the color difference component.

10. An image processing apparatus comprising:
a decoding unit that decodes coded data of predicted residual data acquired by predicting residual data of a color difference component of an image by using residual data of a luminance component of the image;
a setting unit that arranges a bit depth of the residual data of the color difference component and a bit depth of the residual data of the luminance component to be uniform in a case where the bit depth of the residual data of the color difference component and the bit depth of the residual data of the luminance component are different from each other, wherein the bit depths of the residual data are arranged to be uniform only when the image is of a 4:4:4 format; and a residual restoring unit that restores the residual data of the color difference component in accordance with the bit depth set by the setting unit by using the residual data of the luminance component and the predicted residual data acquired by decoding the coded data using the decoding unit, wherein the predicted residual data is generated by multiplying a weighting coefficient by bit-shifted residual data of the luminance component based on a value of a difference between the bit depth of the residual data of the luminance component and the bit depth of the residual data of the color difference component, and wherein the decoding unit, the setting unit, and the residual restoring unit are each implemented via at least one processor.

11. The image processing apparatus according to claim 10, wherein the setting unit performs a bit shift of the bit depth of the residual data of the luminance component such that the bit depth of the residual data of the color difference component and the bit depth of the residual data of the luminance component are the same.

12. The image processing apparatus according to claim 11, wherein the setting unit performs the bit shift of the bit depth of the residual data of the luminance component such that the bit depth of the residual data of the luminance component matches the bit depth of the residual data of the color difference component.

13. An image processing apparatus according to claim 12, wherein the setting unit performs the bit shift of the bit depth of the residual data of the luminance component such that the bit depth of the residual data of the luminance component matches the bit depth of the residual data of the color difference component in a case where the difference between the bit depth of the residual data of the luminance component and the bit depth of the residual data of the color difference component has a positive value.

14. The image processing apparatus according to claim 13, wherein a number of pixels of the luminance component of the image and a number of pixels of the color difference component of the image are the same.

15. An image processing method, implemented via at least one processor, the method comprising:

decoding coded data of predicted residual data acquired by predicting residual data of a color difference component of an image by using residual data of a luminance component of the image;

arranging a bit depth of the residual data of the color difference component and a bit depth of the residual data of the luminance component to be uniform in a case where the bit depth of the residual data of the color difference component and the bit depth of the residual data of the luminance component are different from each other, wherein the bit depths of the residual data are arranged to be uniform only when the image is of a 4:4:4 format; and restoring the residual data of the color difference component in accordance with the set bit depth by using the residual data of the luminance component and the predicted residual data acquired by decoding the coded data, wherein the predicted residual data is generated by multiplying a weighting coefficient by bit-shifted residual data of the luminance component based on a value of a difference between the bit depth of the residual data of the luminance component and the bit depth of the residual data of the color difference component.

* * * * *